(12) United States Patent
Valentine

(10) Patent No.: US 11,714,298 B2
(45) Date of Patent: Aug. 1, 2023

(54) OPTICAL DEVICE FOR ENHANCING HUMAN COLOR VISION

(71) Applicant: HUE.AI, LLC, Jupiter, FL (US)

(72) Inventor: Keenan Valentine, Vienna, VA (US)

(73) Assignee: HUE.AI, LLC, Jupiter, FL (US)

( * ) Notice: Subject to any disclaimer, the term of this patent is extended or adjusted under 35 U.S.C. 154(b) by 302 days.

(21) Appl. No.: 17/107,751

(22) Filed: Nov. 30, 2020

(65) Prior Publication Data

US 2021/0080754 A1 Mar. 18, 2021

Related U.S. Application Data

(63) Continuation of application No. 16/329,563, filed as application No. PCT/US2017/049395 on Aug. 30, 2017, now Pat. No. 10,852,567.

(30) Foreign Application Priority Data

| Aug. 30, 2016 | (CN) | .......................... 201610756979.4 |
| Aug. 30, 2016 | (CN) | .......................... 201610758199.3 |

(Continued)

(51) Int. Cl.
*G02C 7/10* (2006.01)
*G02B 5/28* (2006.01)
(Continued)

(52) U.S. Cl.
CPC ............... *G02C 7/108* (2013.01); *B32B 3/06* (2013.01); *B42D 15/00* (2013.01); *G02B 5/223* (2013.01);
(Continued)

(58) Field of Classification Search
CPC ........ G02C 7/108; G02C 7/104; G02C 7/107; B32B 3/06; B32B 7/023;
(Continued)

(56) References Cited

U.S. PATENT DOCUMENTS

| 3,442,572 A | 5/1969 | Illsley et al. |
| 3,877,797 A | 4/1975 | Thornton, Jr. |

(Continued)

FOREIGN PATENT DOCUMENTS

| CN | 1086319 A | 5/1994 |
| JP | 2000-047146 A | 2/2000 |

(Continued)

OTHER PUBLICATIONS

Encyclopedia of Polymer Science and Technology by Mark, H. vol. 9, pp. 1-18, Wiley-Interscience, 2004, USA, ISBN-10: 0471287806.

(Continued)

*Primary Examiner* — James C. Jones
(74) *Attorney, Agent, or Firm* — Volpe Koenig

(57) ABSTRACT

A system, method for creating an optical device, and a device to enhance human color vision are disclosed. The system, method for creating the optical device, and device include a substrate, a plurality of thin film layers provided on the substrate, the plurality of thin film layers including materials creating thin film-specific reflectance spectra based on selected pluralities of materials each having their on respective refractive index, and a plurality of colorant layers applied to the plurality of thin film layers, the plurality of colorant layers including at least one colorant, the colorant created based on colorant-specific absorption spectra as defined by selected concentrations.

20 Claims, 26 Drawing Sheets

(30) Foreign Application Priority Data

| Aug. 30, 2016 | (CN) | 201610761686.5 |
| Aug. 30, 2016 | (CN) | 201610761687.X |
| Aug. 30, 2016 | (CN) | 201620978769.5 |
| Aug. 30, 2016 | (CN) | 201620980335.9 |

(51) Int. Cl.
  *B42D 15/00* (2006.01)
  *G02B 5/22* (2006.01)
  *B32B 3/06* (2006.01)

(52) U.S. Cl.
  CPC ............ *G02B 5/285* (2013.01); *G02C 7/104* (2013.01); *G02C 7/107* (2013.01)

(58) Field of Classification Search
  CPC ............ B32B 2307/4026; B42D 15/00; G02B 5/223; G02B 5/285; B29D 11/00923
  See application file for complete search history.

(56) References Cited

U.S. PATENT DOCUMENTS

| 4,824,246 | A | 4/1989 | Thornton, Jr. |
| 4,826,286 | A | 5/1989 | Thornton, Jr. |
| 5,218,386 | A | 6/1993 | Levien |
| 5,235,358 | A | 8/1993 | Mutzhas et al. |
| 5,408,278 | A | 4/1995 | Christman |
| 5,646,781 | A | 7/1997 | Johnson, Jr. |
| 5,774,202 | A | 6/1998 | Abraham et al. |
| 5,870,069 | A | 2/1999 | Choh et al. |
| 5,872,655 | A | 2/1999 | Seddon et al. |
| 5,969,868 | A | 10/1999 | Bomhorst et al. |
| 6,135,595 | A | 10/2000 | Katsuyoshi et al. |
| 6,145,984 | A | 11/2000 | Farwig |
| 6,811,258 | B1 | 11/2004 | Grant |
| 7,106,509 | B2 | 9/2006 | Sharp |
| 7,284,856 | B2 | 10/2007 | Duha et al. |
| 7,372,640 | B2 | 5/2008 | Fung |
| 7,393,100 | B2 | 7/2008 | Mertz |
| 8,210,678 | B1 | 7/2012 | Farwig |
| 8,733,929 | B2 | 5/2014 | Chiou et al. |
| 8,770,749 | B2 | 7/2014 | McCabe et al. |
| 8,845,095 | B2 | 9/2014 | Harding et al. |
| 9,134,547 | B2 | 9/2015 | McCabe et al. |
| 9,383,594 | B2 | 7/2016 | McCabe et al. |
| 2002/0012766 | A1 | 1/2002 | Faris et al. |
| 2006/0164663 | A1 | 7/2006 | Luo et al. |
| 2007/0030563 | A1 | 2/2007 | Zueger |
| 2007/0133088 | A1 | 6/2007 | Lippey et al. |
| 2008/0043200 | A1 | 2/2008 | Ishak |
| 2014/0233105 | A1* | 8/2014 | Schmeder ............ G01J 3/465 359/590 |
| 2014/0320806 | A1 | 10/2014 | Cohen-Tannoudji et al. |
| 2016/0077361 | A1 | 3/2016 | Wold et al. |
| 2017/0339301 | A1 | 11/2017 | Pjanic et al. |

FOREIGN PATENT DOCUMENTS

| JP | 2012-522270 A | 9/2012 |
| WO | 2010111499 A1 | 9/2010 |
| WO | 2014110101 A1 | 7/2014 |
| WO | 2016148984 A1 | 9/2016 |

OTHER PUBLICATIONS

Moreland et al., "Quantitative Assessment of Commercial Filter Aids for Red-Green Colour Defectives," Ophthalmic and Physiological Optics, the Journal of the College of Optometrists, Sep. 2010, vol. 30, No. 5, pp. 685-692.

Stockman and Sharpe, "The spectral sensitivities of the middle-and long-wavelength-sensitive cones derived from measurements in observers of known genotype," Vision Research 40, 2000, pp. 1711-1737.

* cited by examiner

OPTICAL DEVICE FOR ENHANCING HUMAN COLOR VISION

CROSS REFERENCE TO RELATED APPLICATIONS

This application is a Continuation of application Ser. No. 16/329,563 filed Feb. 28, 2019, which was a 371 National Phase of PCT/US2017/049395 filed Aug. 30, 2017, which claims the benefit of Chinese Patent Application Nos. 201610758199.3 filed Aug. 30, 2016 entitled Optical Device to Enhance Human Color Vision, its Method of Design, Transmission Spectra and Method of Lightness Evaluation, 201620978769.5 filed Aug. 30, 2016 entitled A Type of Transmission Spectra of Optical Devices that Optimizes Human Color Vision, 201610756979.4 filed Aug. 30, 2016 entitled A Type of Colorant-Based Optical Device and its Method of Design Using Artificial Intelligence, 201620980335.9 filed Aug. 30, 2016 entitled A Type of Optical Device with Colorants as Active Ingredients, 201610761687.X filed Aug. 30, 2016 entitled An Artificially-Intelligent Optical Device to Enhance Color Vision and Correct Color Vision Deficiency, and Its Method of Design, and 201610761686.5 filed Aug. 30, 2016 entitled A Type of Optical Device to Correct Blue-Yellow Color Vision Deficiency, and Its Method of Design, each naming inventor Keenan Valentine, the contents of each of which are incorporated herein by reference.

FIELD OF INVENTION

The present invention is directed to optical devices for enhancing human color vision, and more specifically provides a system, method for creating an optical device, and a device to enhance human color vision.

BACKGROUND

Hereditary color vision deficiency and acquired color vision deficiency (CVD) are defects of human color perception that currently the ophthalmic industry generally do not address well. Simple red-tinted or similarly tined lenses have been produced and sold. Such a solution creates a perceived color contrast by distorting the hues of colors which can be confusing to a CVD individual as those hues become confused with hues the person can distinguish. This type of product is generally unsatisfactory as they do not aid a CVD person to perceive original colors.

Other types of lenses work by increasing the saturation of confusing colors in an attempt to allow a CVD person to better distinguish these colors. The effectiveness of these lenses is not as high as the solution described above.

Due to the traditional methods of design and construction used for these types of lens solutions, performance characteristics are limited. Furthermore, these lens solutions are not designed to have substantially invariant or controllably variant performance characteristics under different types of lighting and color vision conditions.

Yellow color vision (YCV) from yellowed human natural crystalline lenses or yellow intraocular lenses (IOLs) cause color perception distortions. Current ophthalmic solutions do not address the use of color corrective lenses for YCV.

Therefore, a need exists for better quality solutions to these and other vision issues.

SUMMARY

A system, method for creating an optical device, and a device to enhance human color vision are disclosed. The system, method for creating the optical device, and device include a substrate, a plurality of thin film layers provided on the substrate, the plurality of thin film layers including materials creating thin film-specific reflectance spectra based on selected pluralities of materials each having their on respective refractive index, and a plurality of colorant layers applied to the plurality of thin film layers, the plurality of colorant layers including at least one colorant, the colorant created based on colorant-specific absorption spectra as defined by selected concentrations.

The method of creating the optical device includes creating colorant-specific absorption spectra by selecting colorants, creating concentrations of the selected colorants, and creating one or more layers to contain the colorant, creating thin film-specific reflectance spectra by selecting at plurality of materials each having their on respective refractive index, selecting the number of layers in the thin film, creating each film layer, and constructing an optical device including the created one or more layers containing the colorant and the created film layers.

BRIEF DESCRIPTION OF THE DRAWINGS

A more detailed understanding may be had from the following description, given by way of example in conjunction with the accompanying drawings wherein.

DETAILED DESCRIPTION

Figure 1:
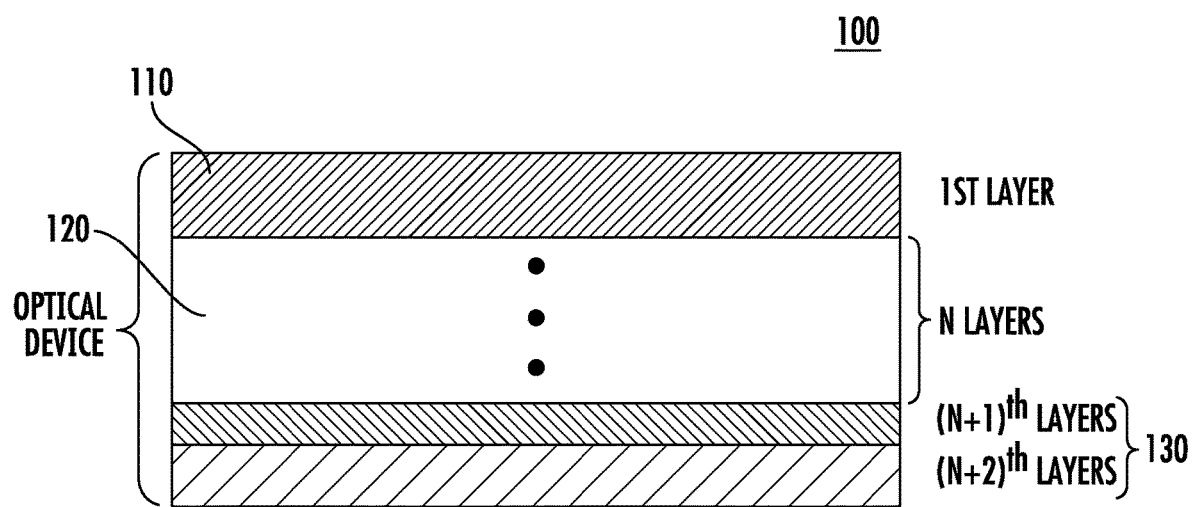
FIG. 1 illustrates a cross-sectional illustration of an optical device for enhancing human vision.

In the following description, numerous specific details are set forth, such as particular structures, components, materials, dimensions, processing steps, and techniques, in order to provide a thorough understanding of the present embodiments. However, it will be appreciated by one of ordinary skill of the art that the embodiments may be practiced without these specific details. In other instances, well-known structures or processing steps have not been described in detail in order to avoid obscuring the embodiments. It will be understood that when an element such as a layer, region, or substrate is referred to as being "on" or "over" another element, it can be directly on the other element or intervening elements may also be present. In contrast, when an element is referred to as being "directly on" or "directly" over another element, there are no intervening elements present. It will also be understood that when an element is referred to as being "beneath," "below," or "under" another element, it can be directly beneath or under the other element, or intervening elements may be present. In contrast, when an element is referred to as being "directly beneath" or "directly under" another element, there are no intervening elements present.

In the interest of not obscuring the presentation of embodiments in the following detailed description, some structures, components, materials, dimensions, processing steps, and techniques that are known in the art may have been combined together for presentation and for illustration purposes and in some instances may have not been described in detail. In other instances, some structures, components, materials, dimensions, processing steps and techniques that are known in the art may not be described at all. It should be understood that the following description is rather focused on the distinctive features or elements of various embodiments described herein.

Described herein are various designs and constructions of optical devices using absorptive colorants and/or reflective thin films to enhance human color vision, and to correct color visions deficiency (CVD) and yellow color vision (YCV). These optical devices provide transmission spectra to achieve the above affects while controlling metamerism, i.e. color shift, which affects the performance of the devices and the cosmetic-looks due to variable illumination, e.g. morning, noon and afternoon daylight, fluorescent lighting and light-emitting-diode (LED) lighting. In addition, the optical devices provide the proper transmission spectra to correct and/or reduce YCV due to causes such as yellowed natural crystalline lenses or yellow intraocular lenses (IOLs). Also described is radially-variable filter (RVF) that combines the above described affects and reduces device performance variance from variable angles of incidence (AOIs) of the illuminant. Also described are methods to provide the designs and constructions of the optical devices.

This invention provides devices and methods for constructing optical devices with the desired transmission spectra to enhance normal human color vision, correct red-green and blue-yellow color vision deficiency (CVD), and correct yellow color vision (YCV). The target transmission spectra of such optical devices are built by iteratively constructing the set of colorimetric performance indicators (CPIs), which include red-green color vision separation, blue-yellow color vision separation, and controlling metamerism. Metamerism control includes limiting the hues of the white points (WPs) of the cosmetics of the optical devices, WP shift (WPS) from neutral point of the optical device and lightness changes of the devices evaluated under different lighting conditions and observers with different color visions.

The present invention describes the design and manufacture of (1) an optical device with the constructed transmission spectrum suited to increase the red-green color separation in order to correct red-green color vision deficiency (CVD), (2) another optical device with the constructed transmission spectrum suited to increase the blue-yellow color separation in order to correct blue-yellow CVD, (3) another optical device with the constructed transmission spectrum suited to correct a person's yellowed color vision to a neutral or near-neutral white point (WP). Neutral embodies white and levels of grey. The optical devices described herein may also be designed and constructed to have a desired level of lightness, cosmetic tints, including no tint, control of metamerism among other spectral and colorimetric performance characteristics. An optical device may be a lens, glasses, sunglasses, spectacles, contact lens, optical filters, displays, windshields, intraocular lens, windows and any other optical or ophthalmic material suitable for the transmission and/or other forms of altering light. The optical device may have any optical power, curvature or other characteristics designed for optical devices.

The construction of optical device with transmission spectrum closest matching to a target transmission spectrum including (1) creating colorant-specific absorption spectra through selecting colorants with their molar extinction spectra, creating concentrations for each of the selected colorants, and creating one or more layers or whole substrate with thicknesses to contain the dyes concentrations, and/or (2) creating thin film-specific reflectance spectra by selecting material and their refractive indices, selecting total number of layers of the thin film, selecting material stacking order, such as an alternating stack order, and creating optical or physical thicknesses of each film layer, (3) constructing total transmission spectrum of optical device via combining the transmission spectra from absorptive colorants and reflective thin film coatings, and (4) if the constructed transmission spectrum reaches the target transmission spectrum, or maximum allowable iterations reached or no change in spectrum mismatch (between constructed and target) after some pre-defined iterations, or one or more other stopping criteria reached, then end iteration, and saved results. Resultant constructions of the optical device are comprised of the constructed transmission spectrum of the optical device closest matching a target transmission spectrum, colorant selection, colorant layer or whole substrate thicknesses, colorant concentrations, thin film materials with their refractive indices, film layers' optical or physical thicknesses, total number of film layers, and layer stacking order, and if the stopping criteria in (4) is not reached, then continue to iterate colorant and/or thin film construction in order to achieve the targeted transmission spectrum of the optical device.

The specific process for constructing the target transmission spectra of the optical devices is comprised of creating one or more illuminants, creating color matching functions, creating color spectra for color enhancement, CVD correction and/or yellowed color vision correction evaluation, creating a color space, creating a transmission spectrum for the optical device that satisfies minimum transmission requirements, evaluating CPIs of red-green color separation and/or blue-yellow color separation, lightness of optical device, white point shifts for illuminants, amount of metamerism and chroma value for color spectra, and if CPI targets are reached or maximum iterations on new transmission spectra reached or no change in CPIs after some iterations or other stopping criteria reached, then end iteration and save best output transmission spectrum of the optical device from 380 nm to 780 nm. However, if any of the stopping criteria is not reached, then continue to iterate to another transmission spectrum of the optical device. A suite of artificially intelligent methods are used to iterate to find transmission spectra of the optical device for color enhancement, CVD correction and/or yellowed color vision correction applications for each nanometer in wavelength between 380 nm and 780 nm.

Lastly, the design and construction of a radially-variable filter (RVF) as a specific type of thin film coating constructions is disclosed. As transmission spectra of optical devices should be as invariant as possible under different angles of incidence (AOIs) for the applications in this invention, the RVF is a solution that reduces or eliminates the changes in the transmission spectra of FCs, including wavelength shifts that occur from a variable AOI.

An illuminant is any light emanating source or medium that is not considered a transparent or semi-transparent optical body primarily used to allow for light transmission. Illuminants include primary sources, such as the sun or artificial lighting, and/or secondary sources, such as reflecting surfaces, and/or additional light sources such as fluorescing colorants. The optical devices described herein may employ the reflectance spectrum from reflective media, such as surfaces and bodies including natural, man-made, synthetic, simulated and blended combinations of such media. The optical devices may employs the fluorescent spectrum from fluorescent media, such as surfaces and bodies including natural, man-made, synthetic, simulated and blended combinations of such media, e.g. a fluorescent dye coated clothing. The optical devices may utilize spectral power distributions (SPDs) of various sources, e.g. CIE (Commission Internationale de L'éclairage) Standard Illuminant D55, D65, D75, F2, F7, F11 and L-series for light-emitting diodes (LEDs). Blended Illuminants may be suitable for environments with multiple illuminants. This invention describes multiple ways combining illuminants into a blended illuminant (BI). One example is provided in Equation 1.

$$BI = \Sigma c_i * \text{Illuminant}_i, i \in \text{selected Illuminants } 0 \leq c_i \leq 1 \quad \text{Equation 1.}$$

Another example of forming BI is provided in Equation 2.

$$BI = c_1 D55 + c_2 D65 + c_3 D75 + c_4 F2 + c_5 F7 + c_6 F11 + c_7 LED_1 \quad \text{Equation 2.}$$

The optical devices may employ color spaces, such as the CIE 1931 color spaces, CIE 1964 color spaces and CIE 1976 color spaces, as a basis to quantify color vision. The color perception is measured by the chromatic response of a target observer to different wavelengths of transmitted light onto human color cones. The response of human trichromatic color vision is quantified using three Color Matching Functions (CMFs), such as those in CIE 1931 2 Standard Observer (with normal color vision) with peak sensitivity of CMF for L-cone is at 599 nm, that for M-cone is at 555 nm and that for S-cone is at 446 nm. A deuteranomalous observer (deutan) may have a peak sensitivity of CMF for M-cone at a wavelength longer than that for a Standard Observer, e.g. 556 nm. In addition, the value of M-cone peak sensitivity for a deutan is equal to or less than 100% of that for a Standard Observer. For a protanomalous observer (protan), peak sensitivity of CMF for L-cone is at a wavelength shorter than that for a Standard Observer, e.g. 598 nm. In addition, the value of L-cone peak sensitivity for a protan is equal to or less than 100% of that for a Standard Observer. For a tritanomalous observer (tritan), peak sensitivity of CMF for S-cone is at a wavelength different than that for a Standard Observer, e.g. 447 nm or 445 nm. In addition, the value of S-cone peak sensitivity for a tritan is equal to or less than 100% of that for a Standard Observer. $\bar{x}(\lambda)$, $\bar{y}(\lambda)$, $\bar{z}(\lambda)$ denote CMFs as functions of wavelength for L-cone, M-cone and S-cone respectively. The $\bar{x}(\lambda)$, $\bar{y}(\lambda)$ $\bar{z}(\lambda)$ CMFs for a normal colored vision CIE 1931 2° Standard Observer with peak values at 599 nm, 555 nm and 446 nm, respectively. The $\bar{x}(\lambda)$ CMF is that for a protanomalous observer with the L-cone CMF peak value skewed to less-than-or-equal-to 599 nm and less-than-or-equal-to 100% sensitivity of the 1931 2° Standard Observer. The $\bar{y}(\lambda)$ CMF is that for a deteranomalous observer with the M-cone CMF peak value skewed to more-than-or-equal-to 555 nm and less-than-or-equal-to 100% sensitivity of the 1931 2° Standard Observer. The $\bar{z}(\lambda)$ CMF is that for a tritanomalous observer with the S-cone CMF peak value skewed to more than 446 nm and less-than-or-equal-to 100% sensitivity of the 1931 2° Standard Observer. The $\bar{z}(\lambda)$ CMF is that for a tritanomalous observer with the S-cone CMF peak value skewed to less-than-or-equal-to 446 nm and less-than-or-equal-to 100% sensitivity of the 1931 2° Standard Observer. The $\bar{x}(\lambda)$, $\bar{y}(\lambda)$, $\bar{z}(\lambda)$ CMFs are that for a normal colored vision CIE 1964 10° Standard Observer with peak values at 595 nm, 557 nm and 445 nm, respectively. The $\bar{x}(\lambda)$ CMF is that for a protanomalous observer with the L-cone CMF peak value skewed to less-than-or-equal-to 595 nm and less-than-or-equal-to 100% sensitivity of the 1964 10° Standard Observer. The $\bar{y}(\lambda)$ CMF is that for a deteranomalous observer with the M-cone CMF peak value skewed to more-than-or-equal-to 557 nm and less-than-or-equal-to 100% sensitivity of the 1964 10° Standard Observer. The $\bar{z}(\lambda)$ CMF is that for a tritanomalous observer with the S-cone CMF peak value skewed to more than 445 nm and less-than-or-equal-to 100% sensitivity of the 1964 10° Standard Observer. The $\bar{z}(\lambda)$ CMF is that for a tritanomalous observer with the S-cone CMF peak value skewed to less-than-or-equal-to 445 nm and less-than-or-equal-to 100% sensitivity of the 1964 10° Standard Observer. The $\bar{x}(\lambda)$ CMF is that for a protanomalous observer with the L-cone CMF peak value skewed to 585 nm and 100% sensitivity of the 1931 2° Standard Observer. The $\bar{x}(\lambda)$ CMF is that for a protanomalous observer with the L-cone CMF peak value skewed to 580 nm and 90% sensitivity of the 1964 10° Standard Observer. The $\bar{y}(\lambda)$ CMF is that for a deuteranomalous observer with the M-cone CMF peak value skewed to 565 nm and 100% sensitivity of the 1964 10° Standard Observer. The $\bar{y}(\lambda)$ CMF is that for a deuteranomalous observer with the M-cone CMF peak value skewed to 562 nm and 85% sensitivity of the 1931 2° Standard Observer. The $\bar{z}(\lambda)$ CMF is that for a tritanomalous observer with the S-cone CMF peak value decreased to 80% sensitivity of the 1964 10° Standard Observer. The $\bar{z}(\lambda)$ CMF is that for a tritanomalous observer with the S-cone CMF peak value skewed to 450 nm and 90% sensitivity of the 1931 2° Standard Observer. The $\bar{z}(\lambda)$ CMF is that for a tritanomalous observer with the S-cone CMF peak value skewed to 440 nm and 70% sensitivity of the 1931 2° Standard Observer.

Representative reflectance spectra for red and green colors and blue and yellow colors may be used to measure red-green color separation, and blue-yellow color separation. For example, reflectance spectra for Ishihara red colors and green colors are obtained from scanning the reflectance spectra in Ishihara Isochromatic Plates Test, and similarly for Ishihara blue colors and yellow colors. Representative reflectance spectra for red and green colors and blue and yellow colors come from the Munsell color system. Representative reflectance spectra for red colors are one or more of the Munsell Colors: 2.5YR 5/4, 7.5R 5/4, 2.5R 5/4, 5RP 5/4, 10P 5/4, 10YR 5/4, 10R 5/4, 10RP 5/4. Representative reflectance spectra for green colors are one or more of the Munsell Colors: 5BG 5/4, 10G 5/4, 5G 5/4, 10GY 5/4, 5GY 5/4, 10BG 5/4. Representative reflectance spectra for blue colors are one or more of the Munsell Colors: 5B 5/4, 10BG 5/4, 5BG 5/4, 5P 5/4, 10B 5/4, 10P 5/4, 10PB 5/4. Representative reflectance spectra for yellow colors are one or more of the Munsell Colors: 10GY 5/4, 5GY 5/4, 5Y 5/4, 10YR 5/4, 2.5YR 5/4, 10Y 5/4, 10YR 5/4. Reflectance spectra for red, green, blue and yellow colors come from reflectance scans of natural colors, such as leafs, flowers and woods.

Tristimulus values may be used in the process for determining the color space coordinates of the selected colors and White Point (WP) for evaluation. Color space coordinates may be used to evaluate colorimetric performance indicators, CPIs, such as color separation. Tristimulus values may be determined using Equations 3-6.

$$X_i = \sum_{\lambda=380\,nm}^{\lambda=780\,nm}[M_i(\lambda)\bar{x}(\lambda)]. \qquad \text{Equation 3}$$

$$Y_i = \sum_{\lambda=380\,nm}^{\lambda=780\,nm}[M_i(\lambda)\bar{y}(\lambda)]. \qquad \text{Equation 4}$$

$$Z_i = \sum_{\lambda=380\,nm}^{\lambda=780\,nm}[M_i(\lambda)\bar{z}(\lambda)]. \qquad \text{Equation 5}$$

$$M_i(\lambda) = \begin{cases} \text{Illuminant}(\lambda)*\text{Color}_i(\lambda), \text{ for Color } i \\ \quad \text{viewed without Optical Device} \\ \text{Illuminant}(\lambda)*\text{Color}_i(\lambda)*T(\lambda), \text{ for Color } i \\ \quad \text{viewed with Optical Device} \end{cases} \quad \text{Equation 6}$$

where $\text{Color}_i(\lambda)$ is the reflectance spectrum for the $i^{th}$ selected color. The optical device with a transmission spectrum $T(\lambda)$. The illuminant may be any singular illuminant or a blended illuminant. $M_i(\lambda)$ is the Spectral Admittance of Color i, with a specific illuminant or blended illuminant, and a specific transmittance of the optical device and $\lambda$ denotes wavelength.

The illuminant may be CIE D65 Standard Illuminant, CIE D55 Standard Illuminant, CIE D75 Standard Illuminant, CIE F2 Standard Illuminant, CIE F7 Standard Illuminant, CIE F11 Standard Illuminant, CIE L-series LED Standard Illuminant, a blended illuminant obtained by adding 20% of the SPD of CIE D65 Standard Illuminant to 80% of the SPD of CIE F7 for a daylight and fluorescent light lit indoor space, a blended illuminant obtained by adding 20% of the SPD of CIE D55 Standard Illuminant to 80% of the SPD of CIE F11 for a second daylight and fluorescent light lit indoor space, a blended illuminant obtained by adding 50% of the SPD of CIE D75 Standard Illuminant to 50% of the SPD of CIE F11 for daylight and fluorescent light lit indoor space, a blended illuminant obtained by adding 50% of the SPD of CIE D75 Standard Illuminant to 50% of the SPD of a CIE L-series LED for daylight and LED lit indoor space, a blended illuminant obtained by adding 50% of the SPD of CIE D65 Standard Illuminant to 50% of the SPD of CIE D55 Standard Illuminant for an average daylight source.

Color Spaces are well-known tools created to position colors, and evaluate important colorimetric performance indicators, CPIs, such as color-separation, White Point (WP), lightness, and metamerism under a variety of practical cases. The parameters that affect color positioning include illuminants, reflectance spectra of evaluation colors, CMFs, transmission spectra of optical devices, and the specific type of color space itself. Sample illuminants, CMFs, reflectance spectra of evaluation colors are stated above. Typical color spaces from CIE are the xyY, XYZ, LUV, LAB, Hunter and many others. However, the most useful color spaces have Perceptual Uniformity.

The CIE XYZ color space, the CIE xyY color space, the CIE LAB color space and/or the CIE LUV color space may be used. At any Lightness, L, color space coordinates of a particular evaluation color i is designated, $u_i$, $v_i$. Specifically, the color space coordinates are defined in Equations 7-8.

$$u_i = \frac{4X_i}{X_i + 15Y_i + 3Z_i}. \qquad \text{Equation 7}$$

$$v_i = \frac{9X_i}{X_i + 15Y_i + 3Z_i}. \qquad \text{Equation 8}$$

Red-Green color separation is a target colorimetric performance indicator (CPI) for the optical devices described herein to achieve. In fact, the larger the red-green color separation the better Red-Green CVD people are able to distinguish red, green and derivative colors, as red/green become much more differentiated in chroma, hue and/or lightness. The color separation between red color i and green color j may be formulated as in Equation 9.

$$i\text{-}j\text{Separation} = \sqrt{(u_{\text{redi}} - u_{\text{greenj}})^2 + (v_{\text{redi}} - v_{\text{greenj}})^2} \qquad \text{Equation 9.}$$

or may be Munsell Red, Green colors.

As $M(\lambda)$ is the Spectral Admittance of any selected color, the color space coordinates of the color, <u, v> depends on Spectral Admittance and therefore changes with illuminant or blended illuminant and the transmission spectrum of the optical device. Thus Red-Green Color Separation changes with the constructed transmittance of the optical device. Different transmission spectrums may produce different red-green color separations.

As the red-green color separation is evaluated for any and evaluation red and green colors, example designs and constructions of transmission spectra of optical devices and corresponding constructions that achieve Red-Green color separation is disclosed. Red-Green Color Separation Percentage is formulated in Equation 10.

$$\text{Red Color } i - \text{Green Color } j \text{ Separation \%} =$$
$$\frac{\text{Red Color } i - \text{Green Color } j \text{ Separation With Optical Device}}{\text{Red Color } i - \text{Green Color } j \text{ Separation With Naked Eye}} - 1 =$$

$$\frac{\sqrt{(u^*_{red\ i} - u^*_{green\ j})^2 + (v^*_{red\ i} - v^*_{green\ j})^2}}{\sqrt{(u^+_{red\ i} - u^+_{green\ j})^2 + (v^+_{red\ i} - v^+_{green\ j})^2}} - 1$$

Equation 10 where <u*,v*> and <u+,v+> denote color space coordinates with and without optical device, respectively.

Color separation % may be a key CPI and at least 10%. CIE LAB color space may be used to determine Red-Green Color Separation %, with formulations using "a" to replace "u" and "b" to replace "v". CIE xyY color space may be used to determine Red-Green Color Separation %, with formulations using "x" to replace "u" and "y" to replace "v".

Blue-Yellow color separation is another target CPI for the optical devices described herein. The larger the blue-yellow color separation the better Blue-Yellow CVD people are able to distinguish blue and yellow colors, as they become much more differentiated in chroma, hue and/or lightness. The color separation between blue color i and yellow color j is formulated as Equation 11.

Blue Color *i*–Yellow Color *j* Separation=
$$\sqrt{(u_{bluei} - u_{yellowj})^2 + (v_{bluei} - v_{yellowj})^2}$$

Equation 11.

The blue and yellow colors may be Munsell Blue and Yellow colors.

As is the case with Red and Green Color Separation, Blue-Yellow Color Separation changes with the optical devices designed transmittance. Different transmission spectrums may produce different blue-yellow color separations while applying the optical device.

As the blue-yellow color separation is evaluated for any and evaluation blue and yellow colors, example designs and constructions of transmission spectra of optical devices and their corresponding construction that achieve Blue-Yellow color separation are disclosed.

A Blue-Yellow Color Separation Percentage is formulated in Equation 12.

Equation 12

$$\text{Blue Color } i - \text{Yellow Color } j \text{ Separation \%} =$$
$$\frac{\text{Blue Color } i - \text{Yellow Color } j \text{ Separation With Optical Device}}{\text{Blue Color } i - \text{Yellow Color } j \text{ Separation With Naked Eye}} - 1 =$$

-continued $$\frac{\sqrt{(u^*_{blue\ i} - u^*_{yellow\ j})^2 + (v^*_{blue\ i} - v^*_{yellow\ j})^2}}{(u^+_{blue\ i} - u^+_{yellow\ j})^2 + (v^+_{blue\ i} - v^+_{yellow\ j})^2} - 1.$$

where <u*,v*> and <u+,v+> denote color space coordinates with and without optical device, respectively.

This color separation % may be a key CPI and at least 1%. CIE LAB color space may be used to determine Blue-Yellow Color Separation %, with formulations using "a" to replace "u" and "b" to replace "v". CIE xyY color space may be used to determine Blue-Yellow Color Separation %, with formulations using "x" to replace "u" and "y" to replace "v".

The position in color space of the white point (WP) of the optical device and the shift in position of this WP from a neutral WP for any desirable illuminant are key CPIs may be factors in the cosmetics and performance of lenses. The WP of an observer's color vision may be a key CPI. The WP of a target may be evaluated by eliminating any specific color in the Spectral Admittance determination, i.e. setting Color$_i$ ($\lambda$)=1. The WP of the optical device may be evaluated with CIE Standard Illuminants D55, D65, D75, F2, F7, F11 or L-series. The WP of the optical device may be evaluated with a blended illuminant comprised of any combination of CIE Standard Illuminants D55, D65, D75, F2, F7, F11 or L-series. In a color space with a single illuminant or blended illuminant, with the observer having normal colored vision or CVD, White Point Shift (WPS) is the color distance between the WP position of the optical device and the WP position of the color vision with only the naked eye. Specifically, WPS of the user's color vision is evaluated in Equation 13.

White Point Shift$_{color\ vision}=$
$$\sqrt{(u^*_{wp} - u^+_{wp})^2 + (v^*_{wp} - v^+_{wp})^2}$$

Equation 13.

where <u*$_{wp}$,v*$_{wp}$> and <u+$_{wp}$,v+$_{wp}$> denote WP coordinates with and without optical device, respectively. Specifically, <u*$_{wp}$,v*$_{wp}$> and <u+$_{wp}$,v+$_{wp}$> simultaneously denotes the WP of any user's color vision, including a user that has normal color vision, CVD, yellowed color vision, or any other type of color vision.

WPS of the cosmetic look of the optical device is evaluated in Equation 14.

White Point Shift$_{optical\ device}=$
$$\sqrt{(u^\#_{wp} - u^-_{wp})^2 + (v^\#_{wp} - v^-_{wp})^2}$$

Equation 14.

where <u$^\#_{wp}$,v$^\#_{wp}$> and <u$^-_{wp}$,v$^-_{wp}$> denote WP coordinates with and without an optical device, respectively, specifically for any user having normal color vision.

CIE LAB color space may be used to determine WPSs, with formulations using "a" to replace "u" and "b" to replace "v". CIE xyY color space may be used to determine WPSs, with formulations using "x" to replace "u" and "y" to replace "v".

Metamerism is the set of lightness, WP hue and WPS values corresponding to transmission spectrum of an optical device or system, targeting both the device cosmetics and the color visions of observers, including normal, deutan, protan and tritan, viewed under different lighting conditions. Controlling metamerism requires the setting of lightness, WP hue and WPS values to be limited. To evaluate metamerism (color shift) of the optical device, WPS of the optical device is evaluated separately with single CIE Standard Illuminants D55, D65, D75, F2, F7, F11, L-series and/or blended illuminants via any combination of these Standard Illuminants. WP hues and lightnesses may be recorded.

Metamerism can be defined as any statistic on the set of WPS of the optical device under the evaluated single illuminants or blended illuminants and the associated WP hues. Such statistic can comprise mean, mean, mode, max, min and the range.

Chroma is the saturation of a particular hue and is used to evaluate for colors against the WP, with and without the optical device. Primary color targets comprised of red, green, blue and yellow, and derivative color targets including purple, turquoise, brown, orange and pink are evaluated for their Chroma value using Equation 15.

$$\text{Chroma}_{color\ i} = \sqrt{(u_i - u_{wp})^2 + (v_i - v_{wp})^2}$$ Equation 15.

Chroma Percent Change is evaluated using Equation 16.

$$\text{Chroma Change \%}_{color\ i} = \frac{\sqrt{(u_i^* - u_{wp}^*)^2 + (v_i^* - v_{wp}^*)^2}}{\sqrt{(u_i^+ - u_{wp}^+)^2 + (v_i^+ - v_{wp}^+)^2}} - 1.$$ Equation 16 where <u*,v*> and <u+,v+> denote color space coordinates with and without the optical device, respectively. The color separation % may be a key CPI and at least 1%. CIE LAB color space may be used to determine Chroma Percent Change of the optical device, with formulations using "a" to replace "u" and "b" to replace "v". CIE xyY color space may be used to determine Chroma Percent Change of the optical device, with formulations using "x" to replace "u" and "y" to replace "v".

Lightness of the optical device may be a key CPI. The Lightness may be defined by Equations 17-19.

$$Y_{wp} = \sum_{\lambda=380\ nm}^{\lambda=780\ nm} [M(\lambda)\bar{y}(\lambda)].$$ Equation 17

$$f(Y_{wp}) = \begin{cases} \left(\frac{Y_{wp}}{100}\right)^{\frac{1}{3}}, Y_{wp} > 100 * \left(\frac{6}{29}\right)^3 \\ \frac{1}{3}\left(\frac{29}{6}\right)^2\left(\frac{Y_{wp}}{100}\right) + \frac{4}{29}, \text{otherwise} \end{cases}$$ Equation 18

$$\text{Lightness} = 116 f(Y_{wp}) - 16.$$ Equation 19 where the Spectral Admittance is $M(\lambda) = \text{Illuminant}(\lambda) * T(\lambda)$. The illuminant may a CIE Standard Illuminants or any blended combination of CIE Standard Illuminants or other constructed illuminants. A minimum transmission value of the optical device of at least 0.2% is manufactured to ensure minimal transmittance at visible wavelengths for safety or other reasons. A minimum transmission value of the optical device with at least 0.2% is manufactured to ensure that minimal transmittance from any portion of wavelengths within 500 nm to 650 nm for safety or other reasons. A minimum transmission value of the optical device with at least 0.2% is manufactured to ensure that minimal transmittance from any portion of wavelengths within 400 nm to 500 nm for safety or other reasons.

FIG. 1 illustrates a cross-sectional illustration of an optical device 100 for enhancing human vision. The optical device includes a substrate 110, a plurality of thin film layers 130 provided on the substrate 110, and a plurality of colorant layers 120 applied to the plurality of thin film layers 130. The plurality of thin film layers 130 include materials creating thin film-specific reflectance spectra based on selected pluralities of materials each having their on respective refractive index as will be described herein. The plurality of colorant layers 120 include at least one colorant, the colorant created based on colorant-specific absorption spectra as defined by selected concentrations.

Colorants, such as dyes and pigments may be used to absorb incident light in the desired wavelengths, and thereby create the desired stop-bands and pass-bands in the transmission spectrum of the optical device. Colorants may be mixed and infused with the optical substrate, such as polycarbonate, PMMA, CR-39, Trivex or other material in one layer. Colorants may be mixed and infused with the optical substrate, such as polycarbonate, PMMA, CR-39, Trivex or other material in more than one layer. Colorants may be coated onto the optical substrate through clipping, spraying, spinning, physical vapor deposition (PVD), chemical vapor deposition (CVD), any other coating method or combination of methods. Such coating methods may be applied to devices with or without variations in thickness, such as in the application to produce optical power. Subsets of colorants may be mixed and infused with the optical substrate in various layers, which when combined to form a single optical system or substrate, produces the desired stop-bands and pass-bands in the effective transmission spectrum of the optical system. Such a construction may have dyes in layers of the optical system, or in some layers and not in other layers. The colorants may be incorporated into or onto the optical device in order to produce the desired transmission spectrum through any combination of mixing, infusing into substrate, coating onto substrate and layering into the substrate. The colorants may be coated onto the surface of the optical device or surface of one or more of the optical layers within the device. The physical thickness of each of these colorant coatings are less than 2 mm, such that varying the concentration of these dyes produces the desired overall transmission spectrum of the optical device.

Thin films, such as interference films, may be coated on the surface of the optical substrate in order to reflect the incident light in the desired wavelengths, and thereby create the desired stop-bands and pass-bands in the transmission spectrum of the optical device. The thin film may be formed in alternating layers of higher and lower refractive indices coated on the surface of the optical device in order to reflect the desired wavelengths. The desired transmission spectrum may be created via a combination of colorants and thin films such that their combined effects on the transmission spectrum are desirable. One or more interference thin films may be coated on the surface of the optical device in order to construct the desired visible transmission spectrum. The optical transmission spectrum of the thin film is due to refractive indices of the film material, layer physical thickness, number of layers, and layer stacking order. Varying these parameters may produce the desired overall transmission spectrum of the optical device within a desired range of Angles of Incidences (AOIs).

As colorants have absorption spectra, which can be described by their peak absorbance and Full-Width-At-Half-Maximum (FWHM), their absorptive impact on the transmission spectrum is well known and described by the Beer-Lambert Law. Absorption spectra are dependent on molar extinction of the colorant for every wavelength, concentration in the optical medium and physical thickness of the optical medium that carries the colorant. Absorptive dyes of known molar extinction may be used within a substrate with a physical thickness of more than 0.5 mm, such as an optical lens, such that varying the concentration of these dyes produces the desired transmission spectrum of the optical device. Absorptive dyes of known molar extinction may be used within one or more substrate layers, each with a physical thickness of less than 4 mm, such as a layer of an optical lens, such that varying the concentration of these dyes produces the desired transmission spectrum of one or more optical layers within the optical device. Using the layers together creates the desired effective transmission spectrum of the entire optical device. Such combination use of the optical layers may include physically combining the layers into one solid optical device, such as through the lamination process, or using the optical layers in a physically separate manner in order to produce the desired transmission spectrum.

The target transmission spectrum output from the design process described herein below in FIG. 3 may be substantially matched in the construction of the optical device with its transmission spectrum using one or more colorants and/or thin films. Any mismatch between the target transmission spectrum and the constructed transmission spectrum is iteratively reduced or minimized. With colorants pre-selected and thickness of the optical medium (e.g. substrate or coating) pre-determined, the concentrations of the dyes may be iteratively varied and recorded such that the difference between the target and constructed transmission spectra of the optical device, totaled over wavelengths between 380 nm and 780 nm, is minimized. The optical device may contain the pre-selected dyes, with their final concentrations, in a coating on or mixed into the optical substrate with the pre-determined physical thickness.

With colorants iteratively chosen (not pre-determined), thickness of the physical carrier (e.g. substrate or coating) pre-determined, and the concentrations of iteratively chosen dyes also iteratively varied and recorded, such that the difference between the target and constructed transmission spectra of the optical device, totaled over wavelengths between 380 nm and 780 nm, may be minimized or reduced. The optical device may contain the final selection of dyes, with their final concentrations, in a coating form on or mixed into the optical substrate with the pre-determined physical thickness.

The physical thickness of the optical device may be iteratively varied to minimize or reduce the difference between target and constructed transmission spectra of the optical device, totaled over wavelengths between 380 nm and 780 nm.

The thin film material, material stacking order and refractive indices may be pre-determined, and may iteratively vary the thickness of each film layer between 100 nm and 1200 nm, and the total number of layers to be less than 21 layers, such that the difference between the target and constructed transmission spectra of the optical device, totaled over wavelengths between 380 nm and 780 nm, is minimized or reduced.

A combination of colorants and thin films may be used to create the effective transmission spectrum of the optical device by selectively varying dyes used, their concentration, and physical thickness of each thin film layer, such that the difference between the target and constructed transmission spectra of the optical device, totaled over wavelengths between 380 nm and 780 nm, is minimized or reduced.

A variable weight for each wavelength between 380 nm and 780 nm may be applied, such that the total difference between the target and constructed transmission spectra of the optical device is weighted towards those wavelengths with higher weights applied. This weighting may be applied to give particular attention to certain wavelengths, such as between 500 nm and 650 nm for adherence to minimum transmission requirements.

Figure 2:
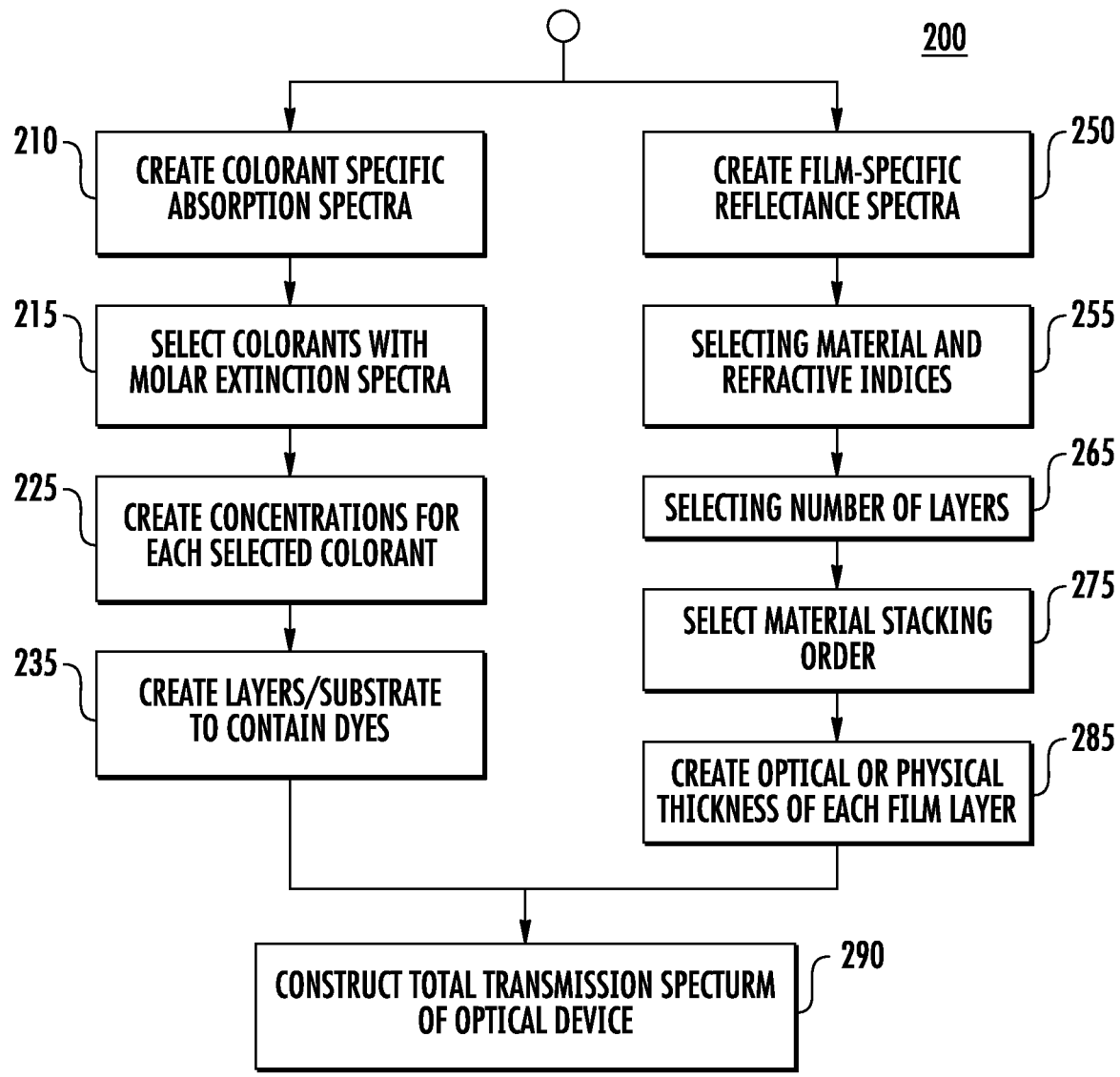
FIG. 2 is a method of constructing the optical device of FIG. 1 to achieve the desired transmission spectrum by using colorants and/or thin films.

FIG. 2 is a method 200 of constructing the optical device of FIG. 1 to achieve the desired transmission spectrum by using colorants and/or thin films. Method 200 is designed to construct a desired output transmission spectrum of the optical devices. Method 200 includes creating colorant-specific absorption spectra at step 210 and/or creating thin film-specific reflectance spectra at step 250. The color-specific absorption spectra is created by selecting colorants with their molar extinction spectra at step 215, creating concentrations for each of the selected colorants at step 225, creating one or more layers or whole substrate with thicknesses to contain the dyes concentrations at step 235. The thin film-specific reflectance spectra is created by selecting material and their refractive indices at step 255, selecting total number of layers of the thin film at step 265, selecting material stacking order, such as an alternating stack order, at step 275, and creating optical or physical thicknesses of each film layer at step 285.

Method 200 includes constructing total transmission spectrum of optical device at step 290. The constructed transmission spectrum (CTS) is defined using total absorption spectrum (TAS) and total reflectance spectrum (TRS) in Equation 20.

$$CTS = (1 - TAS_{Colorant}) - *(1 - TRS_{Thin\ Film})$$ Equation 20.

Method 200 is complete for the situation where the constructed transmission spectrum reaches the target transmission spectrum or other end point. Other end points include that maximum allowable iterations were reached or no change in spectrum mismatch (between constructed and target) after some pre-defined iterations.

The results of method 200 provide the optimal constructed transmission spectrum of the optical device, colorant selection, colorant layer or whole substrate thicknesses, colorant concentrations, thin film materials with their refractive indices, film layers optical or physical thicknesses, total number of film layers, and layer stacking order, and if the stopping criteria was not reached, then further iterations of the colorant and thin film construction may be performed in order to construct the target transmission spectrum of the optical device.

There are more than 820 colorants (dyes, pigments and other coloring agents) in the database to select in construction in the optical device of FIG. 1. The colorants encompass a wide variety of chemical forms and derivatives, such as cyanine, triarylmethane, coumarin, rhodamine, xanthene, oxazine, pryrene, fluorescein, metal-based and perylene. Additional colorants in the database include metal oxide rich inorganic pigments: manganese violet, cobalt violet, Han purple, Prussian blue, cobalt aluminum blue, Egyptian blue, Han blue, Azurite, YInMn Blue, Nickel antimony titanate, chrome antimony titanium buff, chrome yellow, Goethite, Akaganeite, Lepidochrocite, yellow iron oxide, aureolin-cobalt yellow, nickel antimony titanium yellow. Other colorants include metal Sulfide rich inorganic pigments: orpiment, cadmium yellow, and Mosaic gold. Other colorants include synthetic organics: (PY=Pigment Yellow), Monoarylide yellows: PY1 (Hansa G), PY3 (Hansa 10G), PY65, PY73, PY74, PY75, PY97, PY98, PY116; diarylide yellows: AAA Yellow, MX Yellow, OT Yellow, Yellow NCG, OA Yellow, PT Yellow, Yellow H10G, Yellow HR, Yellow GGR, Yellow H19GL, Yellow G3R, Yellow DGR, Yellow GRL, Yellow YR; benzimidazolone yellows: Yellow H2G, Yellow H4G, Yellow H3G, Yellow HLR, Yellow H6G; heterocyclic yellows and azo condensation yellows: tetrachloro Isoindolinone Yellow, Tetrachloroisoindolinone yellow, azomethine yellow, Quinophthalone Yellow, Nickel Dioxine Yellow, Azo Condensation Yellow, Isoindolone Yellow, Triazinyl yellow; and copper Phthalocyanine blue: Phthalocyanine Blue BN. The database contains broad-spectrum and notch-absorbing colorants with peak absorption at nearly every visible wavelength from 380 nm to 780 nm and FWHM ranging from less than 10 nm to more than 200 nm.

The numbers of colorant layers in an optical device include 1 to 60 layers, with the thickness of each layer between 0.01 mm and 40 mm, and concentration of each colorant between 0.001 and 1000 micro-mol.

Pre- and/or post-treatments of the optical device are applied before the first layer of spectrally-active colorant and/or thin film layer, after the last layer or between any number of layers. Such treatments comprise of anti-reflection (AR), anti-scratch (AS), hydrophobic and others. The transmission spectra of these treatments are incorporated into the construction of the optical device by applying the treatments spectra to the Spectral Admittance according to Equation 21.

$$M_{treatment}(\lambda) = M_{no\ treatment}(\lambda) * \Pi_{k=1}^{n} Treatment_k(\lambda)$$ Equation 21.

where n is the number of treatment spectra incorporated. $M_{treatment}(\lambda)$ may supersede $M_{no\ treatment}(\lambda)$ in formulations where pre- and post-treatments are present.

Colorants and/or thin film coatings that alter the transmission spectrum of the optical device at different wavelengths work together in order to increase red-green and/or blue-yellow color vision separation, and for both the optical device cosmetics and observer's color vision: maintain lightness, control white points, control metamerism under different lighting conditions, for observers with different color visions, including normal, deutan, protan and tritan. The various colorants and thin film constructions that absorb green-yellow, yellow, and yellow-red spectrum regions (550 nm to 610 nm) are used to increase human red-green and/or blue-yellow color vision separation. However, as these dyes also significantly impact metamerism (lightness, WP hue and WPS) of the optical device and observer's color vision, the dyes' selection and their concentrations are carefully designed and constructed to satisfy CPIs. The various colorants and thin film constructions that absorb blue, cyan, green and red, i.e. the remaining spectral regions outside of yellow (570 nm to 585 nm), are used to control metamerism of the device cosmetics and different observer's color vision under various lighting environments.

Figure 3:
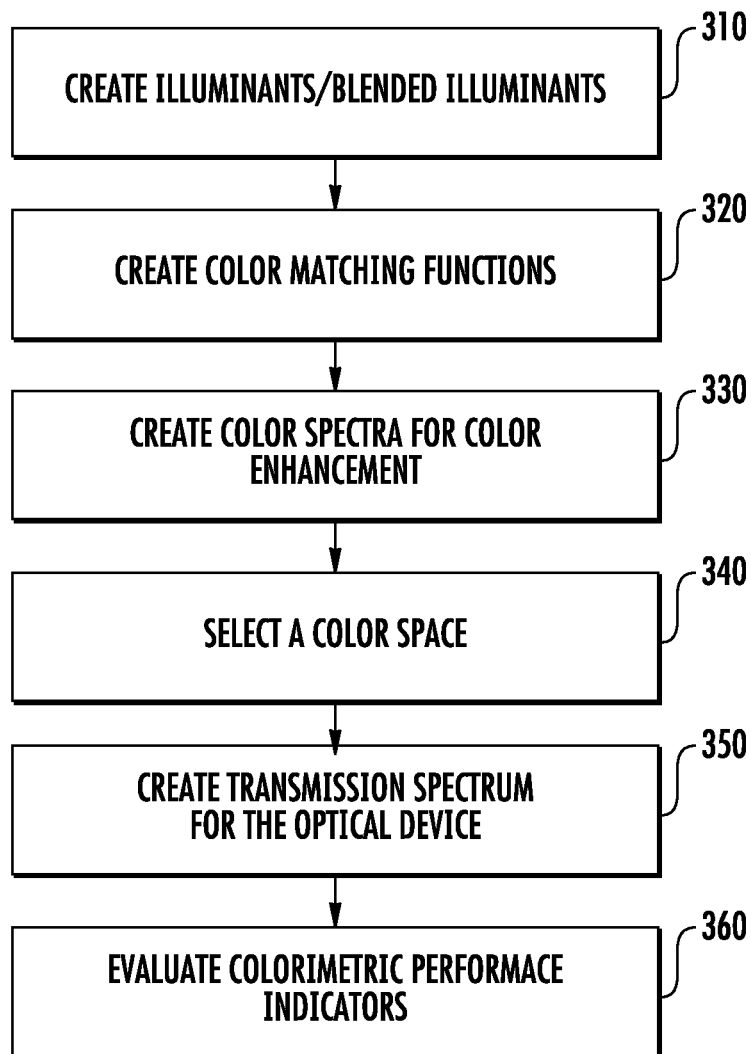
FIG. 3 illustrates a method for designing the transmission spectra of the optical device of FIG. 1 to satisfy minimum transmission constraints and achieve CPI targets.

FIG. 3 illustrates a method 300 for designing the transmission spectra of the optical device of FIG. 1 to satisfy minimum transmission constraints and achieve CPI targets. Method 300 includes creating and/or selecting one or more illuminants and/or blended illuminants at step 310. At step 320, method 300 includes creating and/or selecting CMFs. At step 330, method 300 includes creating and/or selecting color spectra for color enhancement, CVD correction and/or yellowed color vision correction evaluation. At step 340, method 300 includes selecting or creating a color space. At step 350, method 300 includes creating a transmission spectrum for the optical device that satisfies minimum transmission requirements. At step 360, method 300 includes evaluating CPIs of red-green color separation and/or blue-yellow color separation, lightness of optical device, white point shifts for illuminants, and amount of metamerism and chroma value for color spectra.

If the CPI targets are reached or another end point is achieved, method 300 may conclude and the output transmission spectrum of the optical device from 380 nm to 780 nm may be saved. Other end points include such things as maximum iterations on new transmission spectra reached or no change in CPIs after a certain amount of iterations or other stopping criteria reached.

Artificially intelligent methods may be used to iterate to find transmission spectra of the optical device for color enhancement, CVD correction and/or yellowed color vision correction applications for each nanometer in wavelength between 380 nm and 780 nm. Nanometer resolution more coarse than 1 nm may also be used. The artificial intelligent methods include linear programming, nonlinear programming, mixed integer programming, quadratic programming, gradient-descent and random search, for example.

The transmission spectra of the optical device may be designed via maximizing the red-green color difference, maintaining light of the optical device above 70%, maintaining control of metamerism by keeping WPS of the optical device illuminated by CIE D65 within 0.02 and that illuminated by CIE F11 within 0.018, using the CIE LUV color space as evaluation space. The transmission spectra of the optical device may be designed via maximizing the blue-yellow color difference, maintaining light of the optical device above 75%, maintaining control of metamerism by keeping WPS of the optical device illuminated by CIE D55 within 0.025 and that illuminated by CIE F2 within 0.022, using the CIE LUV color space as evaluation space. The transmission spectra of the optical device may be designed via maximizing the lightness of the optical device, maintaining red-green color separation % above 10%, satisfying the minimum transmission requirement of 0.5% for wavelengths, and maintaining control of metamerism by keeping WPS of optical device illuminated by D11 within 0.02, and range of WPS metamerism (color vision and optical device) for listed illuminants, including blended illuminants, to be within 0.009 using CIE LUV as evaluation space.

Figure 4:
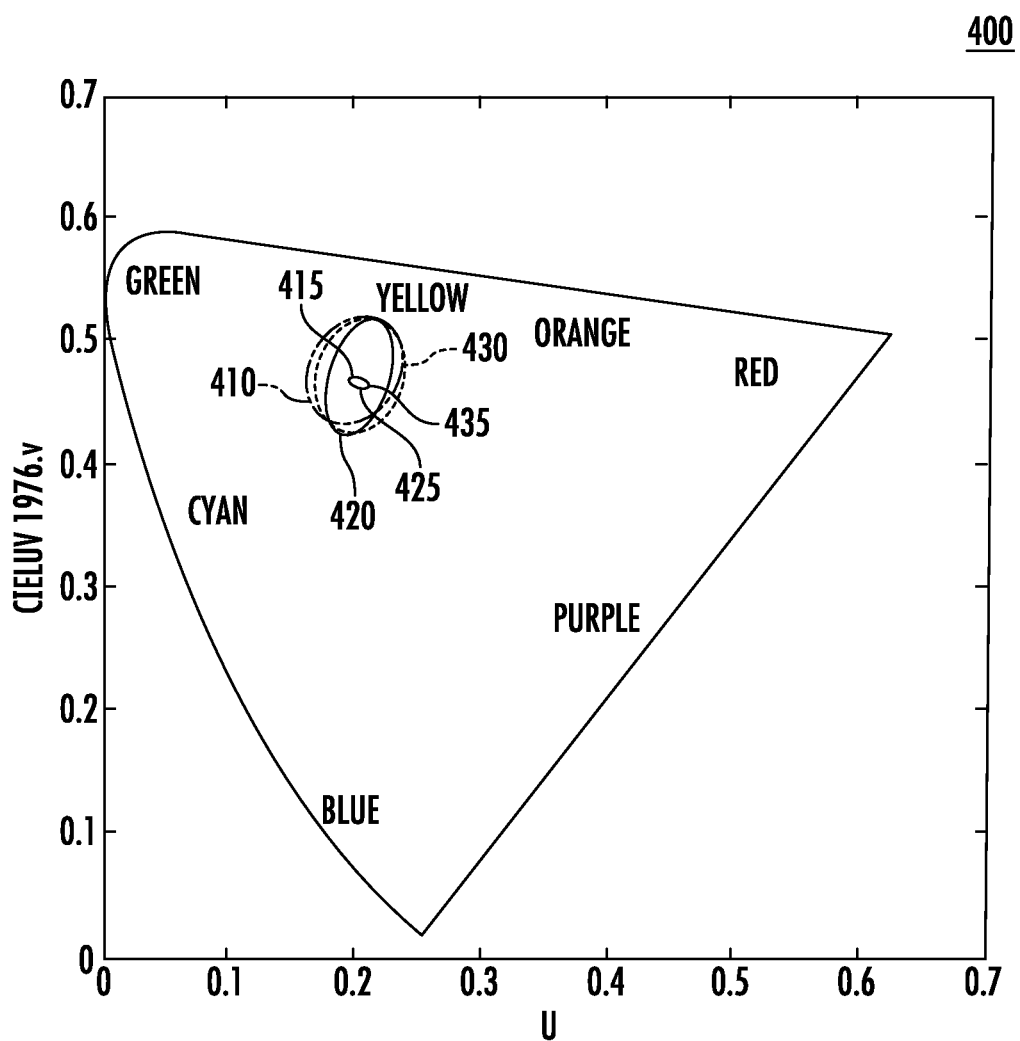
FIG. 4 illustrates a plot of three gamuts using CIE D65 illuminant for noon daylight lighting conditions.

By way of example, FIG. 4 illustrates a plot 400 of three gamuts using CIE D65 illuminant for noon daylight lighting conditions. Plot 400 is generated using one set of Munsell colors of red, green, blue, yellow, cyan, purple and other derivative colors as shown around the outside of the plot 400. Gamut 410 (thin solid line) illustrates Munsell colors perceived by a person with standard or normal color vision. The white point (WP) 415 of normal color vision is also shown. Gamut 420 (thick solid line) illustrates the same Munsell colors perceived by a typical person with uncorrected deuteranomalous color vision deficiency (CVD). WP 425 of the color vision of the uncorrected person is shown. Gamut 430 (dotted line) illustrates the same Munsell colors perceived by the same person as gamut 420 using an optical device described herein to provide correction of the CVD. WP 435 of the corrected color vision is shown.

Plot 400 illustrates that the correct (may also be referred to as enhanced) color vision matches the normal color vision better than the uncorrected color vision. The optical device used for correction increases the CPI of red-green color separation. The derivative colors, including purple, cyan and orange are also corrected. The CPI of the white point shift is well controlled and close to the WP of normal color vision. Further, the optical device used for correction is designed to not noticeably decrease saturation (Chroma) of any color group, such as the blue colors, for example.

Figure 5:
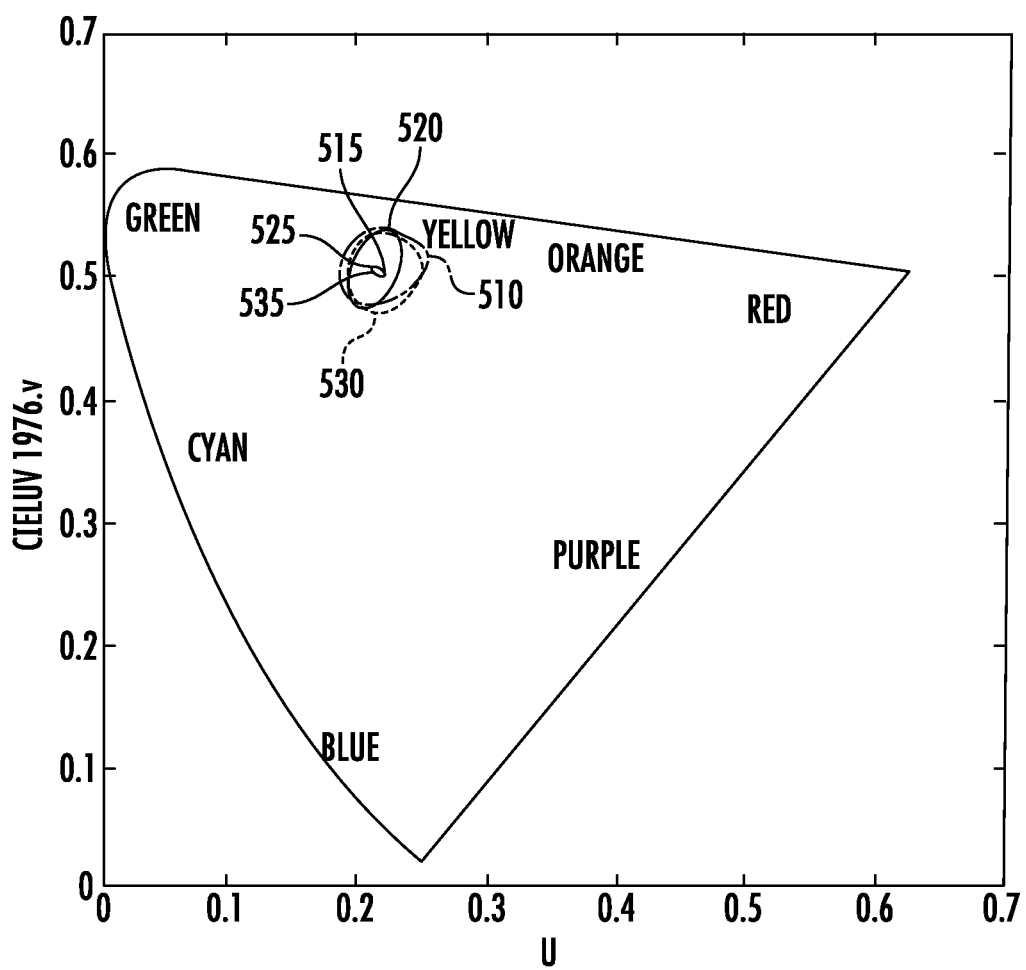
FIG. 5 illustrates a plot of three gamuts using CIE F2 illuminant for the optical device used in FIG. 4.

FIG. 5 illustrates a plot 500 of three gamuts using CIE F2 illuminant for the optical device used in FIG. 4. Plot 500 is generated using one set of Munsell colors of red, green, blue, yellow, cyan, purple and other derivative colors as shown around the outside of the plot 500. The optical device tested in FIG. 5, while the same as that in FIG. 4, the CPIs in FIG. 5 are determined with CIE F2 as a different illuminant representing common fluorescent lighting conditions. Gamut 510 (thin solid line) illustrates Munsell colors perceived by a person with standard or normal color vision. The white point (WP) 515 of normal color vision is also shown. Gamut 520 (thick solid line) illustrates the same Munsell colors perceived by a typical person with uncorrected deuteranomalous color vision deficiency (CVD). WP 525 of the color vision of the uncorrected person is shown. Gamut 530 (dotted line) illustrates the same Munsell colors perceived by the same person as gamut 520 using an optical device described herein to provide correction of the CVD. WP 535 of the corrected color vision is shown.

Plot 500, as was the case for plot 400, illustrates that the correct (may also be referred to as enhanced) color vision matches the normal color vision better than the uncorrected color vision. The optical device used for correction increases the CPI of red-green color separation. The derivative colors, including purple, cyan and orange are also corrected. The CPI of the white point shift is well controlled and close to the WP of normal color vision. Further, the optical device used for correction is designed to not noticeably decrease saturation (Chroma) of any color group, such as the blue colors, for example.

Figure 6:
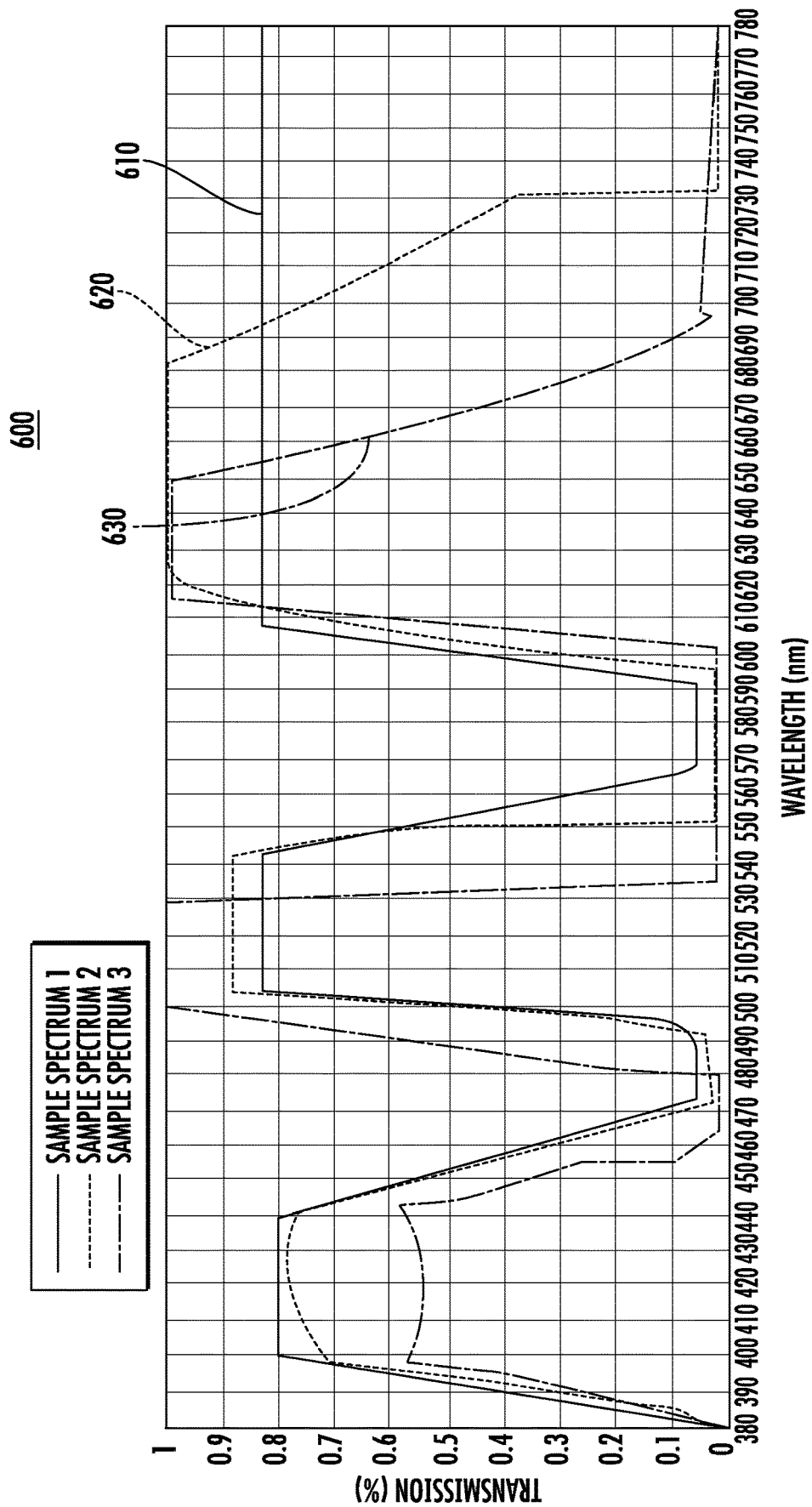
FIG. 6 illustrates an additional sample target transmission spectra for Red-Green CVD correction.

FIG. 6 illustrates a plot 600 of additional sample target transmission spectra for Red-Green CVD correction. These spectra 610, 620, 630 are three representative results of the optical device design process in FIG. 3, which creates transmission spectra of optical devices to achieve CPI targets. The CPI targets for spectrum 610 include achieving achieve red-green color separation between 20%-35%, WPS of less than 0.02, an optical device lightness of more than 70 (normalized by lightness of illuminant), all under CIE D65, D55, D75, F2 and F7 illuminants in order to control metamerism of the cosmetic-look, colorimetric performance and/or human color vision of or while using the optical device.

The CPI targets for spectrum 620 include achieving red-green color separation between 25%-40%, WPS of less than 0.02, an optical device lightness of more than 65 (normalized by lightness of illuminant), all under CIE D65, D55, D75, F2 and F7 lighting conditions in order to control metamerism.

The CPI targets for spectrum 630 include achieving achieve red-green color separation between 30%-60%, WPS of less than 0.03, an optical device lightness of more than 60 (normalized by lightness of illuminant), all under CIE D65, D55, D75, F2 and F7 lighting conditions, and having the CPIs with color matching functions (CMFs) typical of deutans and/or protans, such as those in Tables 1-9 below.

Figure 7:
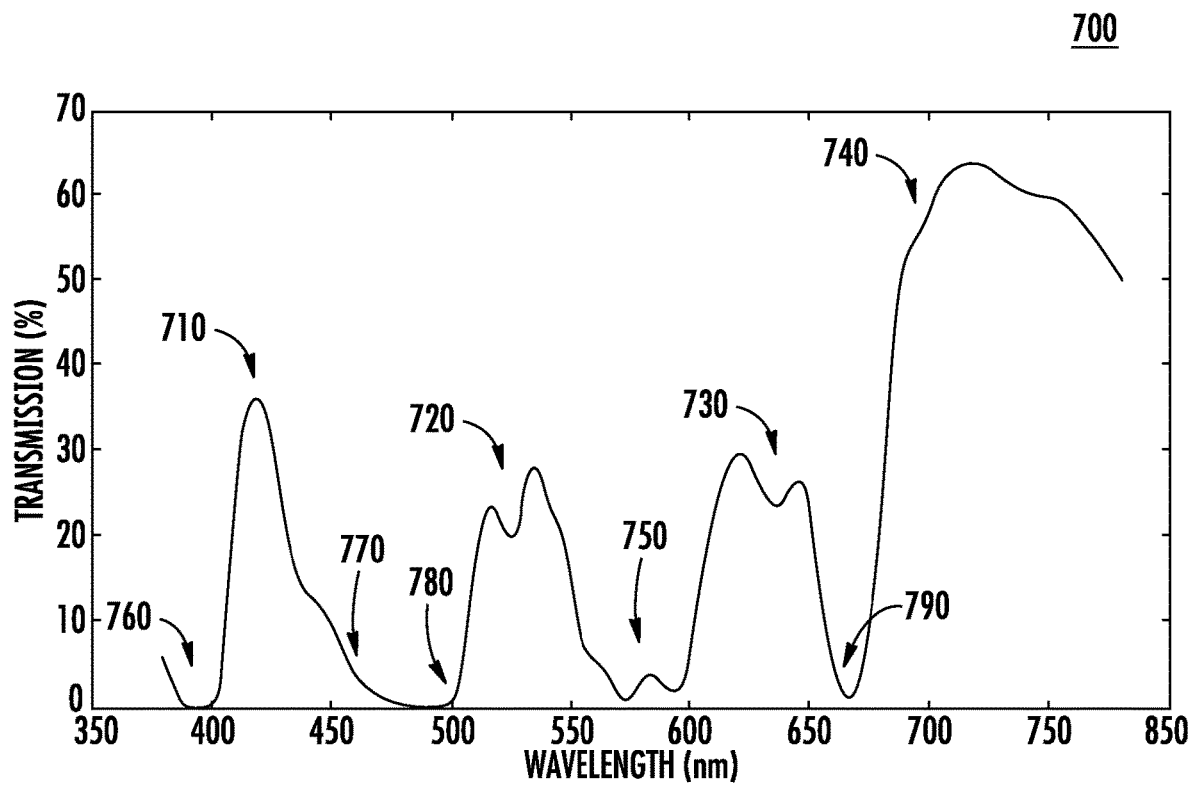
FIG. 7 illustrates a plot of transmission spectrum versus wavelength for a configuration of the device of FIG. 1.

FIG. 7 illustrates a plot 700 of transmission spectrum versus wavelength for a configuration of the present invention. In the configuration illustrated in FIG. 7, polymethyl methacrylate (PMMA) may be used as the substrate of the optical device of FIG. 1. PMMA is a synthetic resin produced from the polymerization of methyl methacrylate and is generally a transparent and rigid plastic. The PMMA may be formed as the substrate of the optical device with a thickness of 3 mm and a diameter of 65 mm. In this configuration normal color vision may be enhanced and red-green CVD may be corrected. Plot 700 illustrates a transmission spectrum of the optical device with at least three passbands 710, 720, 730 between 380 nm and 780 nm. Passband 740 may also be a passband. However, passband 740 may provide little impact to colorimetric performance because of its proximity to the near-infrared that is generally beyond human vision. The stopband 790 has the purpose of reducing a red white point (WP).

Plot 700 may illustrate a curve exhibiting a minimum transmission constraint of 1% between 540 nm and 610 nm. A double-peak absorbing dye with peak absorptions at both 390 nm (760) and 590 nm (750) is used, along with two dyes with peak absorptions at 465 nm (770) and 490 nm (780), another dye for 570 nm (750) and a final dye at 665 nm (790). The concentrations of these dyes range between 3 micro-mol to 70 micro-mol. [These spectral absorptions 750, 760, 770, 780, 790 may be selected to create the specific passbands and stopbands, and other spectral difference from a uniform 100% transmission in order to generate the colorimetric performance shown in Table 1 below. For example, to increase red-green separation, while constraining the optical device lightness, controlling optical device WP hue and shift, and controlling metamerism (performance differences under different illuminants). In an imprecise, heuristic or high-level manner, stopband 750 increases RG separation, passbands 710, 720, 730 allow blue/green/red colors to show through with more contrast. The actual amount of transmission of the passbands and stopbands, and their spectral placements may be determined using real dyes in order to generate the colorimetric performance shown in Table 1. As real dyes have "noise absorption" in addition to their target notch (sharp) absorption (meaning a 550 nm absorption dye may also absorb other wavelengths, although usually to a lesser degree), selection of a dye may account for this "noise absorption" of each dye, in order to determine the best combination of dyes and their concentrations for colorimetric performance.

Figure 8:
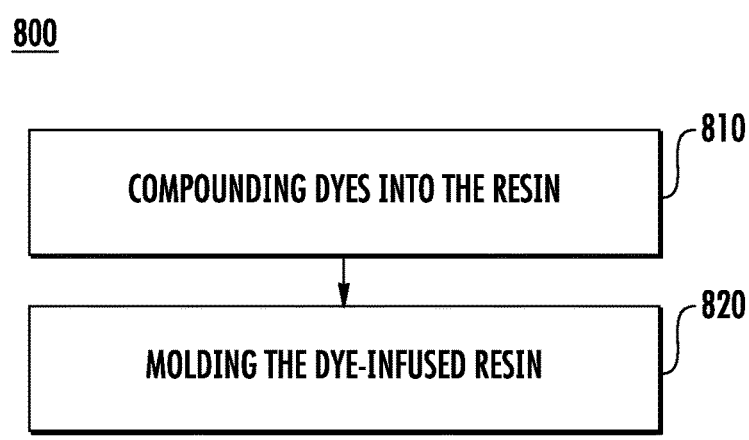
FIG. 8 illustrates the manufacturing process for the device illustrated by the transmission plot of FIG. 7.

For the device of FIG. 1 with the transmission properties shown in FIG. 7, the CPIs, tabulated in Table 1, are evaluated using CIE LUV color space. The manufacturing process 800 illustrated in FIG. 8 starts with compounding the necessary dyes into the PMMA resin using an extruder to achieve proper concentrations at step 810. At step 820, the dye-infused resin is molded at working temperatures below 230 Celsius into the product geometry via a mold-injection.

Table 1 represents the colorimetric performance for the device of FIG. 1 with the transmission properties shown in FIG. 7.

TABLE 1

Colorimetric Performance for the Optical Device of FIG. 1 with the Transmission Properties Shown In FIG. 7

| Color Vision Type | Illuminant | Color Vision Red-Green Color Separation Enhancement (%) | Optical Device Lightness | Metamerism Optical Device White Point Hue | Optical Device Cosmetic White Point Shift | CMF Shift From Normal | CMF Peak Sensitivity |
|---|---|---|---|---|---|---|---|
| Normal | CIE D65 | 47.2 | 40.8 | Yellow-Red | 0.022 | None | Normal |

TABLE 1-continued

Colorimetric Performance for the Optical Device of FIG. 1 with the
Transmission Properties Shown In FIG. 7

| Color Vision Type | Illuminant | Color Vision Red-Green Color Separation Enhancement (%) | Optical Device Lightness | Metamerism | | CMF Shift From Normal | CMF Peak Sensitivity |
|---|---|---|---|---|---|---|---|
| | | | | Optical Device White Point Hue | Optical Device Cosmetic White Point Shift | | |
| Deutan | CIE D65 | 42.4 | 40.5 | Yellow-Red | 0.023 | M-cone, 10 nm red shift | Normal |
| Protan | CIE D65 | 27.4 | 40.8 | Yellow | 0.022 | L-cone, 10 nm blue shift | Normal |
| Deutan | CIE D55 | 43.5 | 43.1 | Yellow | 0.023 | M-cone, more than 3 nm red shift | Normal |
| Protan | CIE D55 | 28.5 | 43.2 | Yellow | 0.022 | L-cone, more than 3 nm blue shift | Normal |
| Deutan | CIE D75 | 41.4 | 38.2 | Yellow-Red | 0.022 | M-cone, more than 15 nm red shift | Normal |
| Deutan | 60% CIE D55, 40% CIE D65 | 43.1 | 42.1 | Yellow-Red | 0.023 | M-cone, more than 1 nm red shift | Normal |
| Protan | 60% CIE D55, 40% CIE D65 | 28.1 | 42.2 | Yellow | 0.022 | L-cone, more than 1 nm blue shift | Normal |
| Deutan | 60% CIE D55, 40% CIE D65 | 42.4 | 40.1 | Yellow-Red | 0.025 | M-cone, 10 nm red shift | 90% of normal |
| Protan | 60% CIE D55, 40% CIE D65 | 27.5 | 42.2 | Yellow | 0.022 | L-cone, 10 nm blue shift | 80% of normal |

Red- and blue-shifts of wavelength correspond to colorimetric and/or spectral shifts to the longer and shorter wavelengths, respectively. Under various conditions of color vision types and illuminants, this creates a red-green color separation enhancement of more than 20% consistently. The optical device of FIG. 1 with transmission properties shown in FIG. 7 controls metamerism well with a lightness variation of less than 10, WP hue maintained between yellow and yellow-red, and WPS range of less than 0.005. The yellow and yellow-red colored WP (tint) of the device of FIG. 1 with transmission properties of FIG. 7 moves the CVD confusion colors used in CVD tests, e.g. Ishihara test colors and/or Farnsworth D15 test colors, and colors used in evaluating CPIs off of the color confusion lines for deutans and protans. This tint further improves the ability to distinguish confusing colors for a CVD person.

The optical device of FIG. 1 with transmission properties shown in FIG. 7 provides the effect of increasing color distance and contrast among natural and artificial blue and non-blue colors. Less saturated blues, cyan, purple and white colors are more easily shifted to yellow and other warmer colors by the yellow and/or yellow-red WP of the optical device. The additional color enhancement further separates the resultant warmer colors and blue colors. The optical device construction combining effects of warm-colored tinting and color enhancement via the device's transmission spectrum creates a superior contrast of blue and non-blue colors. The specialty applications of this type of optical device may include driving, fishing, where increased color contrast between various blue and other colors may be beneficial for contrast and depth perception.

Figure 9:
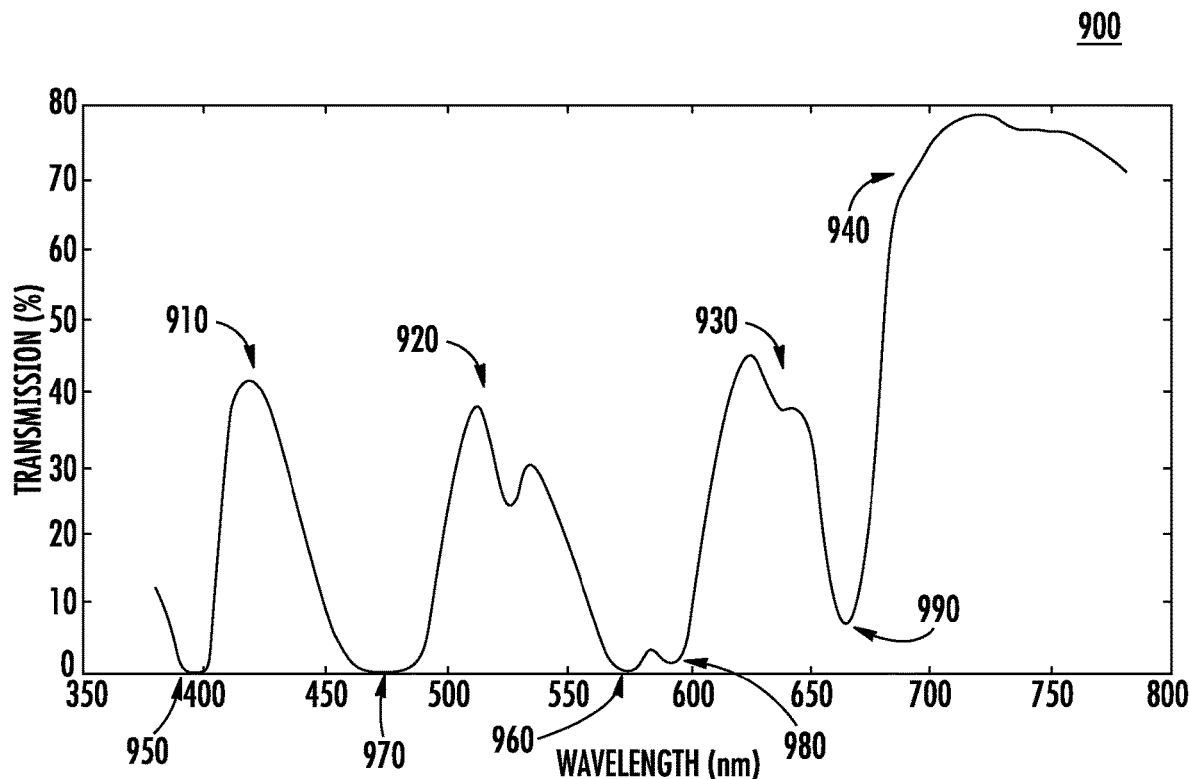
FIG. 9 illustrates a plot of transmission spectrum versus wavelength for a configuration of the device of FIG. 1.

FIG. 9 illustrates a plot 900 of transmission spectrum versus wavelength for a configuration of the present invention. In the configuration illustrated by FIG. 9, Trivex may be used as the substrate of the optical device of FIG. 1. Trivex is a urethane based pre-polymer used for superior impact resistance. An example Trivex substrate may be made with a thickness of 1.5 mm and a diameter of 75 mm and a device of this configuration may be used for the purpose of enhancing normal color vision and/or correcting red-green CVD. Plot 900 illustrates the transmission spectrum of the optical device with at least three passbands 910, 920, 930 between 380 nm and 780 nm. Plot 900 may illustrate a curve exhibiting a minimum transmission constraint of 1% between 555 nm and 610 nm. A double-peak absorbing dye with peak absorptions at both 395 nm (950) and 570 nm (960) is used, along with one dye with peak absorptions at 470 nm (970), another dye for 595 nm (980) and a final dye at 660 nm (990). The concentrations of these dyes range between 20 micro-mol to 110 micro-mol. Again as described above with respect to FIG. 7, these absorptions increase red-green separation, while constraining the optical device lightness, controlling optical device WP hue and shift, and controlling metamerism (performance differences under different illuminants). As the illuminant and/or CMFs change, the dyes used may change in order to achieve similar or better colorimetric performance indicators (CPIs)]

Figure 10:
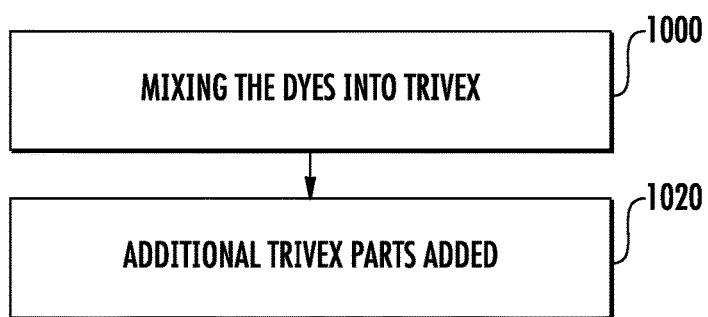
FIG. 10 illustrates the manufacturing process for the device illustrated by the transmission plot of FIG. 9.

For the device of FIG. 1 with the transmission properties shown in FIG. 9, the CPIs, tabulated in Table 2, are evaluated using CIE LUV color space. The manufacturing process 1000, illustrated in FIG. 10, starts with mechanically mixing the dyes into at least one unpolymerized part of Trivex, e.g. monomer at step 1010. At step 1020, process 1000 includes mixing two or more parts of Trivex together for polymerization into the desired geometry. Such geometry may then be cut and/or polished into final desired specifications.

Table 2 represents the colorimetric performance for the device of FIG. 1 with the transmission properties shown in FIG. 9.

TABLE 2

Colorimetric Performance for the Optical Device of FIG. 1 with the Transmission Properties Shown In FIG. 9

| Color Vision Type | Illuminant | Color Vision Red-Green Color Separation Enhancement (%) | Optical Device Lightness | Metamerism Optical Device White Point Hue | Optical Device Cosmetic White Point Shift | CMS Shift From Normal | CMF Peak Sensitivity |
|---|---|---|---|---|---|---|---|
| Normal | CIE D55 | 60.6 | 49.2 | Yellow-Red | 0.022 | None | Normal |
| Normal | CIE F2 | 75.8 | 34.2 | Purple | 0.008 | None | Normal |
| Deutan | CIE D55 | 46.1 | 46.8 | Red-Yellow | 0.024 | M-cone, 15 nm red shift | 90% of normal |
| Protan | CIE D55 | 50.3 | 49.2 | Yellow | 0.021 | L-cone, 5 nm blue shift | 80% of normal |
| Deutan | CIE F2 | 67.3 | 32.6 | Red | 0.012 | M-cone, 15 nm red shift | 90% of normal |
| Protan | CIE F2 | 63.3 | 34.2 | Purple | 0.007 | L-cone, 5 nm blue shift | 80% of normal |
| Deutan | 70% CIE F2, 30% CIE D55 | 57.4 | 37.7 | Red | 0.010 | M-cone, 15 nm red shift | 90% of normal |
| Protan | 70% CIE F2, 30% CIE D55 | 56.9 | 39.6 | Yellow-Red | 0.005 | L-cone, 5 nm blue shift | 80% of normal |

An optical of this configuration creates a red-green color separation enhancement of more than 40% consistently. The optical device of FIG. 1 with transmission properties shown in FIG. 9 controls metamerism by restricting a lightness variation of less than 20, WP hue maintained within warm colors, and WPS range of less than 0.025. The consistent warm colored WPs (tints) of the optical device of FIG. 1 with transmission properties in FIG. 9 moves the CVD confusion colors used in CVD tests, and colors used in evaluating CPIs off of the color confusion lines for deutans and protans. These tints further improve a CVD ability to distinguish confusing colors.

Figure 11:
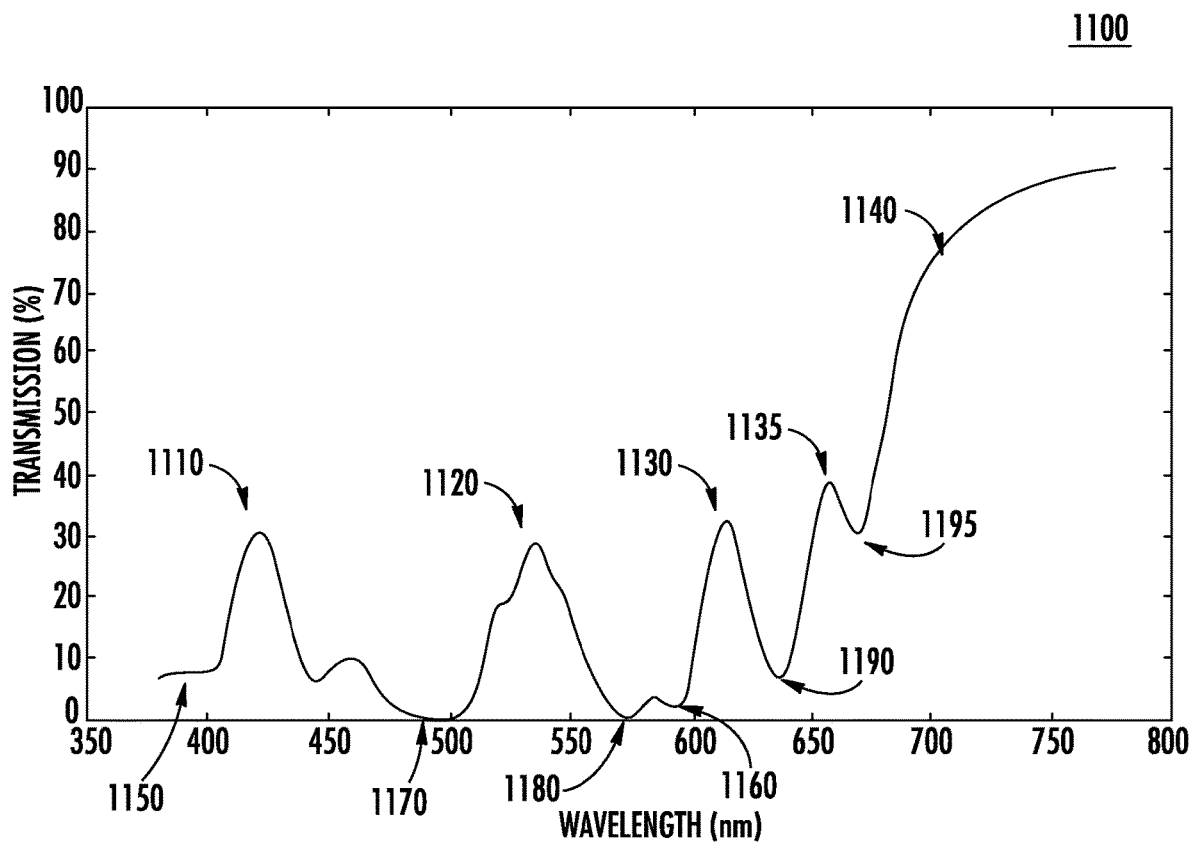
FIG. 11 illustrates a plot of transmission spectrum versus wavelength for a configuration of the present invention.

FIG. 11 illustrates a plot 1100 of transmission spectrum versus wavelength for a configuration of the present invention. In the configuration illustrated by FIG. 11, polycarbonate (PC) may be used as the substrate of the optical device of FIG. 1. PC represents a group of thermoplastic polymers containing carbonate groups in their chemical structures. An example PC substrate may be made with a thickness of 2 mm and a diameter of 72 mm and a device of this configuration may be used for the purpose of enhancing normal color vision and/or correcting red-green CVD. Plot 1100 illustrates the transmission spectrum of the optical device with at least three passbands 1110, 1120, 1130 between 380 nm and 780 nm. Plot 1100 may illustrate a curve exhibiting a minimum transmission constraint of 1% between 565 nm and 610 nm. A double-peak absorbing dye with peak absorptions at both 400 nm (1150) and 595 nm (1160) is used, along with one dye with peak absorptions at 498 nm (1170), two other dyes at 570 nm (1180) and 640 nm (1190), and a final dye at 665 nm (1195). The concentrations of these dyes range between 28 micro-mol to 150 micro-mol.

Figure 12:
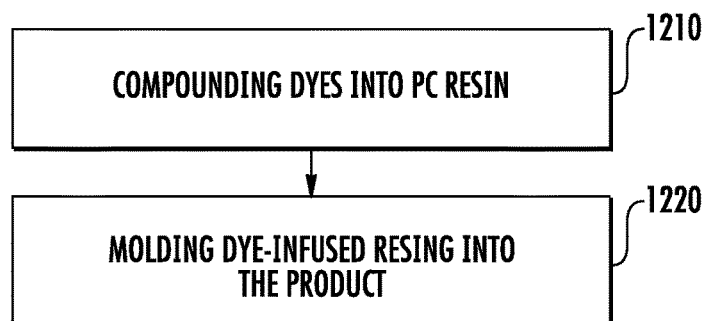
FIG. 12 illustrates the manufacturing process for the device illustrated by the transmission plot of FIG. 11.

For the device of FIG. 1 with transmission properties shown in FIG. 11, the CPIs, tabulated in Table 3, are evaluated using CIE LUV color space. The manufacturing process 1200 illustrated in FIG. 12 starts with compounding the necessary dyes into the PC resin using an extruder to achieve proper concentrations at step 1210. At step 1220, the dye-infused resin is molded at working temperatures above 230 Celsius into the product geometry via a mold-injection.

Table 3 represents colorimetric performance for the optical device of FIG. 1 with the transmission properties shown in FIG. 11

TABLE 3

Colorimetric Performance for the Optical Device of FIG. 1 with the Transmission Properties Shown In FIG. 11

| Color Vision Type | Illuminant | Color Vision Red-Green Color Separation Enhancement (%) | Optical Device Lightness | Metamerism Optical Device White Point Hue | Optical Device Cosmetic White Point Shift | CMF Shift From Normal | CMF Peak Sensitivity |
|---|---|---|---|---|---|---|---|
| Normal | 25% CIE A, 75% CIE D75 | 37.0 | 35.7 | Yellow-Red | 0.020 | None | Normal |
| Deutan | 25% CIE A, 75% CIE D75 | 34.2 | 34.9 | Yellow-Red | 0.021 | M-cone, 5 nm red shift | 95% of normal |

TABLE 3-continued

Colorimetric Performance for the Optical Device of FIG. 1 with the Transmission Properties Shown In FIG. 11

| Color Vision Type | Illuminant | Color Vision Red-Green Color Separation Enhancement (%) | Optical Device Lightness | Metamerism Optical Device White Point Hue | Optical Device Cosmetic White Point Shift | CMF Shift From Normal | CMF Peak Sensitivity |
|---|---|---|---|---|---|---|---|
| Protan | 25% CIE A, 75% CIE D75 | 20.1 | 35.7 | Yellow-Red | 0.019 | L-cone, 8 nm blue shift | Normal |
| Deutan | 25% CIE F7, 75% CIE D75 | 13.8 | 34.8 | Yellow | 0.020 | M-cone, 5 nm red shift; L-cone, 8 nm blue shift | M-cone 95% of normal, L-cone normal |
| Protan | 25% CIE F7, 75% CIE D75 | 18.6 | 35.6 | Yellow-Red | 0.019 | L-cone, 8 nm blue shift | Normal |
| Normal | 35% CIE F11, 65% CIE D65 | 35.0 | 35.8 | Yellow-Red | 0.023 | None | Normal |
| Deutan | 35% CIE F11, 65% CIE D65 | 32.9 | 35.1 | Yellow | 0.024 | M-cone, 5 nm red shift | 95% of normal |
| Protan | 35% CIE F11, 65% CIE D65 | 19.9 | 35.7 | Yellow-Red | 0.022 | L-cone, 8 nm blue shift | Normal |

An optical device in this configuration creates a red-green color separation enhancement of more than 12% consistently. The optical device controls metamerism by restricting a lightness variation of less than 5, WP hue maintained between yellow and yellow-red, and WPS range of less than 0.01.

Figure 13:
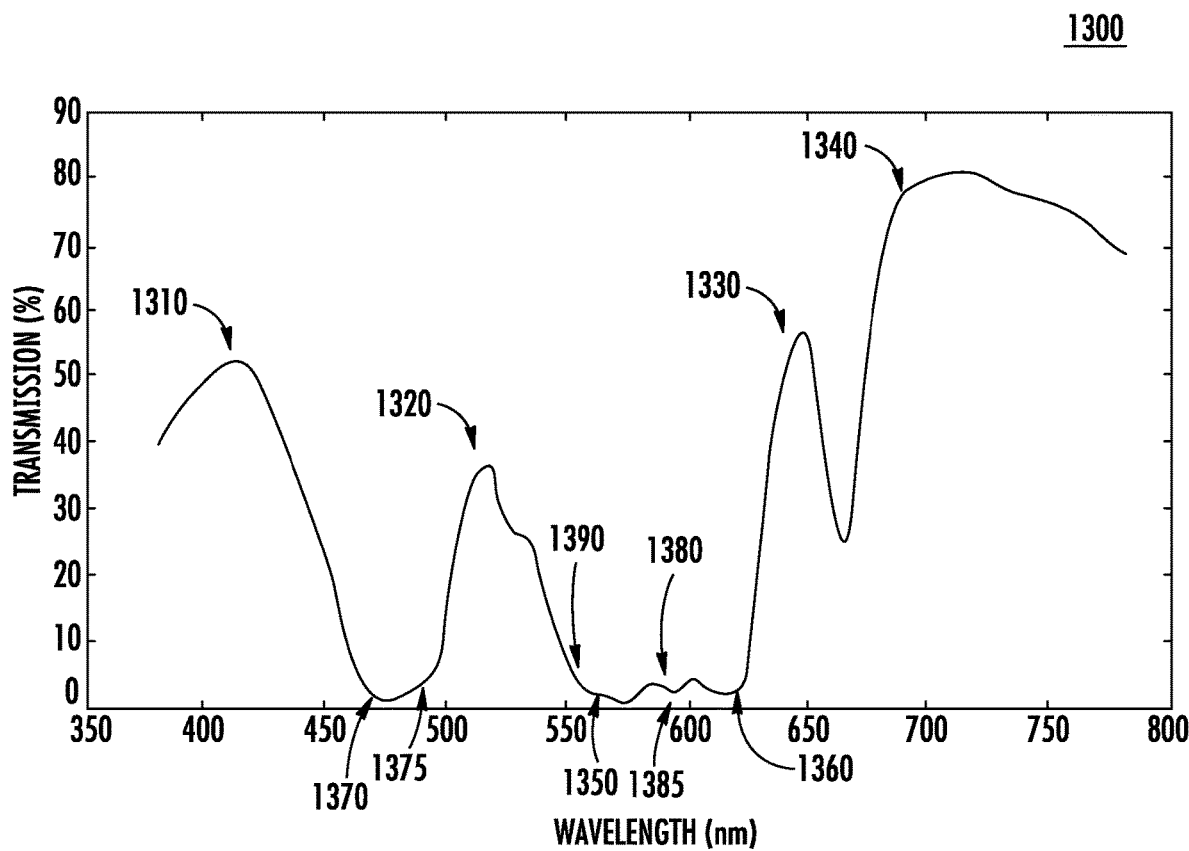
FIG. 13 illustrates a plot of the transmission spectrum versus wavelength for a configuration of the device of FIG. 1.

FIG. 13 illustrates a plot 1300 of the transmission spectrum versus wavelength for a configuration of the present invention. In the configuration illustrated in FIG. 13, PC may be used as the substrate of the optical device of FIG. 1. The PC may be formed as the substrate of the optical device with a thickness of 2 mm and a diameter of 68 mm. In this configuration normal color vision may be enhanced and/or red-green and blue-yellow CVD correction. Plot 1300 illustrates a transmission spectrum of the optical device with at least three passbands 1310, 1320, 1330 between 380 nm and 780 nm. Plot 1300 may illustrate a curve exhibiting a minimum transmission constraint of 1% between 550 nm and 625 nm, and a stop-band centered between 560 nm (1350) and 610 nm (1360) with an absorptive full-width-at-half-maximum (FWHM) of more than 40 nm. A dye with twin peak absorptions at 560 nm (1350) and 660 nm is used, along with two dyes with peak absorptions at 470 nm (1370) and 500 nm (1375), two other dyes at 575 nm (1380) and 595 nm (1385), two additional dyes at 550 nm (1390) and 610 nm, and a final dye at 620 nm. The absorptions between 550 nm and 620 nm shift WP and color gamut to cool colors, increase RG color separation/contrast, and increase blue-yellow color separation/contrast. Absorptions between 450 nm and 500 nm ensure that the color shift to blue is controlled. Absorption at 660 nm (from a dye with twin peaks) ensures that the blue shift does not become purple, which is perceived as "blue+red" colors.

Figure 14:
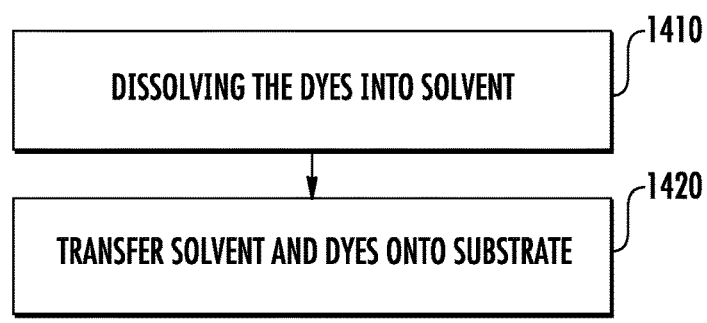
FIG. 14 illustrates the manufacturing process for the device illustrated by the transmission plot of FIG. 13.

For the device of FIG. 1 with the transmission properties shown in FIG. 13, the CPIs, tabulated in Table 4, are evaluated using CIE LUV color space. The manufacturing process 1400 illustrated in FIG. 14 starts with dissolving the dyes into a solvent at step 1410. The solvent with the dyes are transferred onto the PC optical substrate via clipping, spinning and/or spraying at step 1420. The thickness of the dye-infused coating is between 20 microns to 50 microns, and may vary in range as large as 3 micron to 70 micron. The concentrations of these dyes can range between 20 micro-mol to 20,000 micro-mol due to the thin dye coating.

Table 4 represents colorimetric performance for the optical device of FIG. 1 with the transmission Properties shown in FIG. 13.

TABLE 4

Colorimetric Performance for the Optical Device of FIG. 1 with the Transmission Properties Shown In FIG. 13.

| Color Vision Type | Illuminant | Color Vision Red-Green Color Separation Enhancement (%) | Blue-Yellow Color Separation Enhancement (%) | Optical Device Lightness | Metamerism Optical Device White Point Hue | Optical Device Cosmetic White Point Shift | CMF Shift From Normal | CMF Peak Sensitivity |
|---|---|---|---|---|---|---|---|---|
| Normal | CIE D65 | 36.0 | 9.9 | 40.0 | Blue | 0.050 | None | Normal |
| Normal | CIE D55 | 41.3 | 11.5 | 42.0 | Blue | 0.043 | None | Normal |

TABLE 4-continued

Colorimetric Performance for the Optical Device of FIG. 1 with the Transmission Properties Shown In FIG. 13.

| Color Vision Type | Illuminant | Color Vision | | Optical Device Lightness | Metamerism | | CMF Shift From Normal | CMF Peak Sensitivity |
|---|---|---|---|---|---|---|---|---|
| | | Red-Green Color Separation Enhancement (%) | Blue-Yellow Color Separation Enhancement (%) | | Optical Device White Point Hue | Optical Device Cosmetic White Point Shift | | |
| Normal | CIE D75 | 33.0 | 8.8 | 38.1 | Blue | 0.054 | None | Normal |
| Deutan | CIE D65 | 19.5 | 17.7 | 35.3 | Blue | 0.062 | M-cone, 15 nm red shift | 85% of normal |
| Deutan | CIE D55 | 25.9 | 19.8 | 37.8 | Blue | 0.052 | M-cone, 15 nm red shift | 85% of normal |
| Deutan | CIE D75 | 14.7 | 15.5 | 33.1 | Blue | 0.069 | M-cone, 15 nm red shift | 85% of normal |
| Protan | CIE D65 | 16.0 | 10.7 | 40.0 | Blue | 0.049 | L-cone, 10 nm blue shift | 85% of normal |
| Protan | CIE D55 | 16.0 | 10.2 | 42.0 | Blue | 0.044 | L-cone, 10 nm blue shift | 85% of normal |
| Protan | CIE D75 | 17.5 | 10.5 | 38.1 | Blue | 0.053 | L-cone, 10 nm blue shift | 85% of normal |
| Tritan | CIE D65 | 35.1 | 10.1 | 39.5 | Blue | 0.048 | S-cone, 5 nm blue shift | 95% of normal |
| Tritan | CIE D55 | 39.8 | 13.5 | 41.7 | Blue | 0.052 | S-cone, 5 nm blue shift | 95% of normal |
| Tritan | CIE D75 | 31.6 | 10.8 | 37.7 | Blue | 0.057 | S-cone, 5 nm red shift | 95% of normal |

The optical device of FIG. 1 with the transmission properties shown in FIG. 13 creates a red-green color separation enhancement of more than 14% consistently, and a blue-yellow color separation enhancement of more than 8% consistently. The optical device controls metamerism by restricting a lightness variation of less than 10, WP hue maintained at blue and WPS between 0.043 and 0.069. The consistent blue WP (tint) of the optical device may be specifically constructed to move the CVD confusion colors used in CVD tests, and colors used in evaluating CPIs off of the color confusion lines for deutans, protans and tritans. This tint improves the ability of a CVD person to distinguish confusing colors. The optical device may increase color distance and contrast among natural and artificial warm and cool colors. Less saturated yellow, orange, red and white colors are more easily shifted to blue and other cool colors by the blue or cool-colored WP of the optical device. The additional color enhancement further separates the resultant cooler colors and remaining warm colors. The optical device construction combining effects of cool-colored tinting and color enhancement via the transmission spectrum of the optical device creates a superior contrast of warm and cool colors. Additionally, the blue or other cool colored tints of the optical device helps to color balance warm colors to a more neutral color. The specialty applications of this type of optical device may include driving at sunrise and/or sunset where the illuminant is warm colored and increased color contrast and/or depth perception and/or color vision with a more neutral WP are desired.

Figure 15:
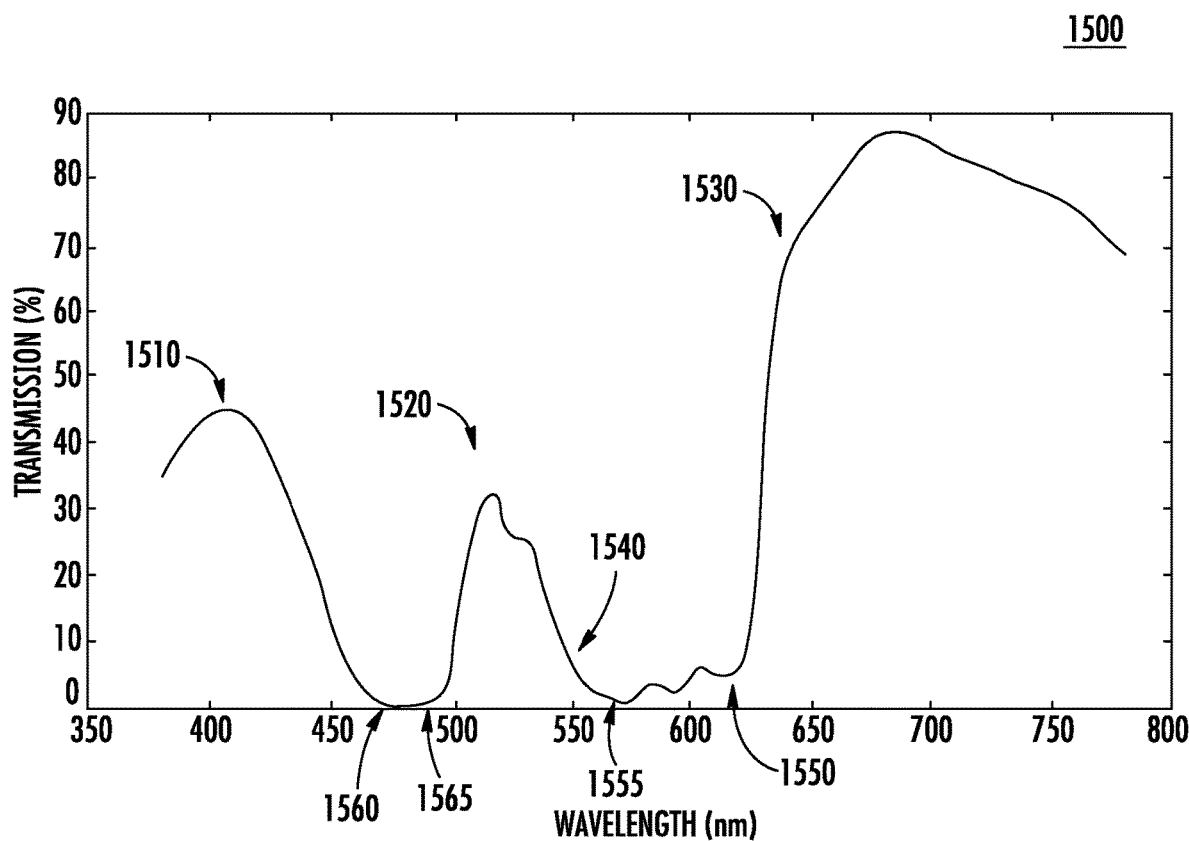
FIG. 15 illustrates a plot of transmission spectrum versus wavelength for a configuration of the device of FIG. 1.

FIG. 15 illustrates a plot 1500 of transmission spectrum versus wavelength for a configuration of the present invention. In the configuration illustrated in FIG. 15, CR39 may be used as the substrate of the optical device of FIG. 1. CR39 is a common plastic used to manufacture optical lenses. CR39 formed as a substrate of the optical device with a thickness of 2.5 mm and a diameter of 72 mm. In this configuration normal color vision may be enhanced and/or red-green CVD corrected. Plot 1500 illustrates the transmission spectrum of the optical device with at least three passbands 1510, 1520, 1530 between 380 nm and 780 nm. Plot 1500 may illustrate a curve exhibiting a minimum transmission constraint of 1% between 550 nm and 630 nm, and a stop-band centered between 560 nm (1540) and 615 nm (1550) with an absorptive FWHM of more than 40 nm. A dye with peak absorption at 558 nm (1555) may be used, along with two dyes with peak absorptions at 470 nm (1560) and 500 nm (1565), two other dyes at 575 nm and 595 nm, two additional dyes at 550 nm and 610 nm, and a final dye at 620 nm.

Figure 16:
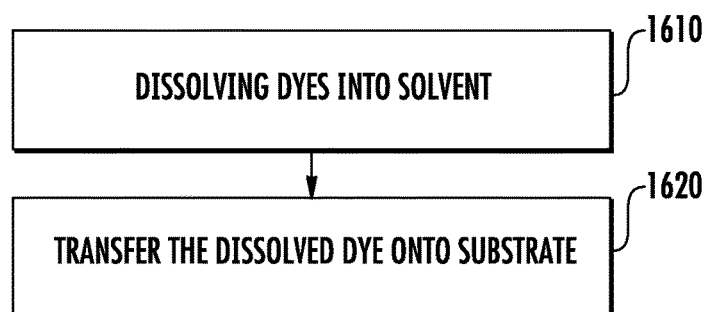
FIG. 16 illustrates the manufacturing process for the device illustrated by the transmission plot of FIG. 15.

For the device of FIG. 1 with the transmission properties shown in FIG. 15, the CPIs, tabulated in Table 5, are evaluated using CIE LUV color space. The manufacturing process 1600 illustrated in FIG. 16 starts with dissolving the dyes into a solvent at step 1610. At step 1620, the dissolved dye is transferred onto the CR39 optical substrate via dipping, spinning and/or spraying. The thickness of the dye-infused coating is between 20 microns to 50 microns, and may vary in range as large as 3 micron to 70 micron. The concentrations of these dyes may range between 20 micro-mol to 20,000 micro-mol due to the thin dye coating.

Table 5 represents the colorimetric performance for the optical device of FIG. 1 with the transmission properties shown in FIG. 15.

TABLE 5

Colorimetric Performance for the Optical Device of FIG. 1 with the Transmission Properties Shown In FIG. 15.

| Color Vision Type | Illuminant | Color Vision Red-Green Color Separation Enhancement (%) | Optical Device Lightness | Metamerism Optical Device White Point Hue | Optical Device Cosmetic White Point Shift | CMF Shift From Normal | CMF Peak Sensitivity |
|---|---|---|---|---|---|---|---|
| Normal | CIE D65 | 74.5 | 40.3 | Magenta | 0.030 | None | Normal |
| Normal | CIE D55 | 78.4 | 42.7 | Pink | 0.034 | None | Normal |
| Normal | CIE D75 | 71.5 | 38.2 | Magenta | 0.029 | None | Normal |
| Deutan | CIE D65 | 35.2 | 38.1 | Magenta | 0.018 | M-cone, 15 nm red shift | 85% of normal |
| Deutan | CIE D55 | 35.7 | 41.1 | Pink | 0.018 | M-cone, 15 nm red shift | 85% of normal |
| Deutan | CIE D75 | 33.9 | 35.6 | Magenta | 0.020 | M-cone, 15 nm red shift | 85% of normal |
| Protan | CIE D65 | 33.0 | 40.3 | Magenta | 0.015 | L-cone, 10 nm blue shift | 85% of normal |
| Protan | CIE D55 | 35.2 | 42.7 | Magenta | 0.010 | L-cone, 10 nm blue shift | 85% of normal |
| Protan | CIE D75 | 32.0 | 38.2 | Magenta | 0.020 | L-cone, 10 nm blue shift | 85% of normal |

The optical device of FIG. 1 with transmission properties shown in FIG. 15 creates a red-green color separation enhancement of more than 30% consistently. The optical device controls metamerism by restricting a lightness variation of less than 10, WP hue maintained between magenta and pink, and WPS between 0.01 and 0.034. The consistent magenta or pink WPs (tint) of the optical device may be constructed to move the CVD confusion colors used in CVD tests, and colors used in evaluating CPIs off of the color confusion lines for deutans and protans. This tint improves a CVD person's ability to distinguish confusing colors. This optical device may increase color distance and contrast among natural and artificial green, yellow-green, yellow and white colors. Less saturated green, yellow-green, yellow and white colors are more easily shifted to warmer colors by the magenta and/or pink WP of the optical device. The additional color enhancement further separates the resultant warmer colors and green colors. The optical device construction combining effects of warm-colored tinting and red-green color enhancement via the transmission spectrum of the device may create a superior contrast of green, yellow-green, yellow and white colors. The specialty applications of this type of optical device may include golf, baseball, tennis, where increased color contrast between various green and other colors may be beneficial.

Figure 17:
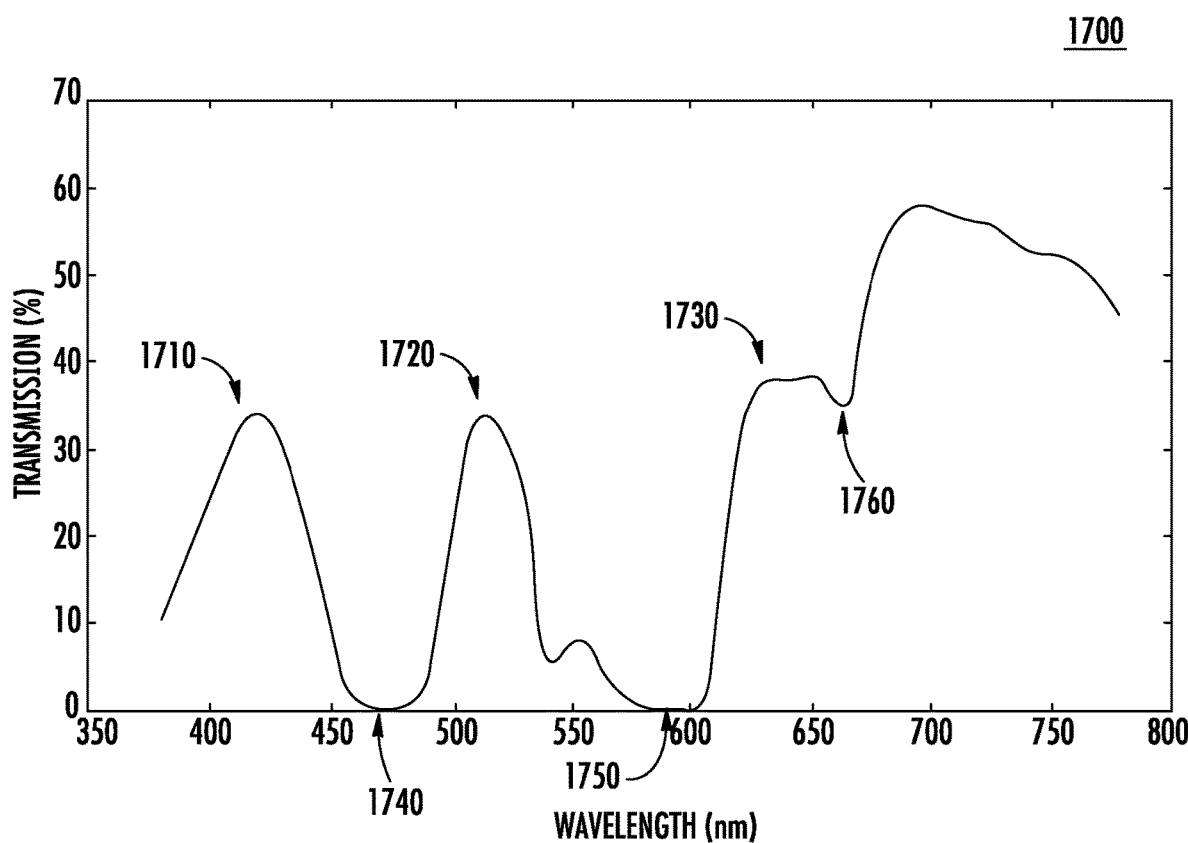
FIG. 17 illustrates a plot of transmission spectrum versus wavelength for a configuration of the device of FIG. 1.

FIG. 17 illustrates a plot 1700 of transmission spectrum versus wavelength for a configuration of the present invention. In the configuration illustrated in FIG. 17, Trivex may be the substrate of the optical device of FIG. 1. The Trivex may provide for superior impact resistance, and may be formed as the substrate of the optical device with a thickness of 2 mm and a diameter of 75 mm. In this configuration normal color vision may be enhanced and/or red-green CVD corrected. Plot 1700 illustrates a transmission spectrum of the optical device with at least three passbands 1710, 1720, 1730 between 380 nm and 780 nm. An absorbing dye with peak absorptions at 475 nm (1740) may be used, another dye at 590 nm (1750) peak absorption, and a final dye at 658 nm (1760) are fully mixed into the optical substrate. The concentrations of these dyes range between 5 micro-mol to 95 micro-mol.

Figure 18:
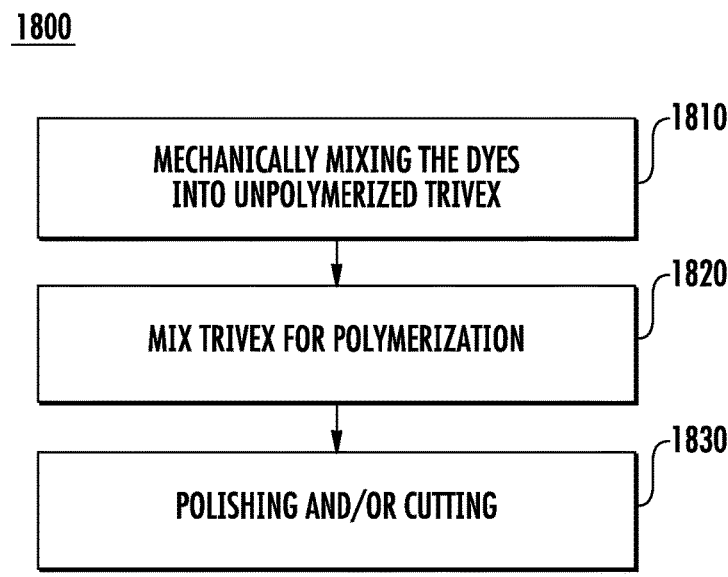
FIG. 18 illustrates the manufacturing process for the device illustrated by the transmission plot of FIG. 17.

For the device of FIG. 1 with the transmission properties shown in FIG. 17, the CPIs, tabulated in Table 6, are evaluated using CIE LUV color space. The manufacturing process 1800 illustrated in FIG. 18 starts with mechanically mixing the dyes into at least one unpolymerized part of Trivex, such as a monomer, for example, at step 1810. At step 1820, two or more parts of Trivex are mixed together for polymerization into the desired geometry with cutting and/or polishing as step 1830.

Table 6 represents colorimetric performance for the optical device of FIG. 1 with the transmission properties shown in FIG. 17.

TABLE 6

Colorimetric Performance for the Optical Device of FIG. 1 with the Transmission Properties Shown In FIG. 17.

| Color Vision Type | Illuminant | Color Vision Red-Green Color Separation Enhancement (%) | Optical Device Lightness | Metamerism Optical Device White Point Hue | Optical Device Cosmetic White Point Shift | CMF Shift From Normal | CMF Peak Sensitivity |
|---|---|---|---|---|---|---|---|
| Normal | CIE D65 | 68.8 | 39.9 | Neutral | 0.004 | None | Normal |
| Normal | CIE D75 | 66.4 | 37.8 | Neutral | 0.001 | None | Normal |
| Deutan | CIE D65 | 65.9 | 37.5 | Neutral | 0.005 | M-cone, 5 nm red shift | 90% of normal |

TABLE 6-continued

Colorimetric Performance for the Optical Device of FIG. 1 with the
Transmission Properties Shown In FIG. 17.

| | | Color Vision | | Metamerism | | | |
|---|---|---|---|---|---|---|---|
| Color Vision Type | Illuminant | Red-Green Color Separation Enhancement (%) | Optical Device Lightness | Optical Device White Point Hue | Optical Device Cosmetic White Point Shift | CMF Shift From Normal | CMF Peak Sensitivity |
| Deutan | CIE D75 | 63.7 | 35.4 | Neutral | 0.004 | M-cone, 5 nm red shift | 90% of normal |
| Protan | CIE D65 | 53.7 | 39.9 | Neutral | 0.004 | L-cone, 5 nm blue shift | 90% of normal |
| Protan | CIE D75 | 51.7 | 37.8 | Neutral | 0.003 | L-cone, 5 nm blue shift | 90% of normal |

The optical device of FIG. 1 with transmission properties shown in FIG. 17 provides a red-green color separation enhancement of more than 50% consistently. The optical device controls metamerism by restricting a lightness variation of less than 5, WP hue maintained neutral, and a maximum WPS of 0.005 (nearly imperceptible chroma) is achieved. The optical device provides a construction with very significant red-green color separation performance while eliminating or minimizing metamerism, i.e. variations in WP hue, WPS and lightness due to different plausible vision and lighting cases. The optical device maybe constructed to achieve a neutral tint of the optical device with little to zero metamerism for people with normal and CVD color visions.

Figure 19:
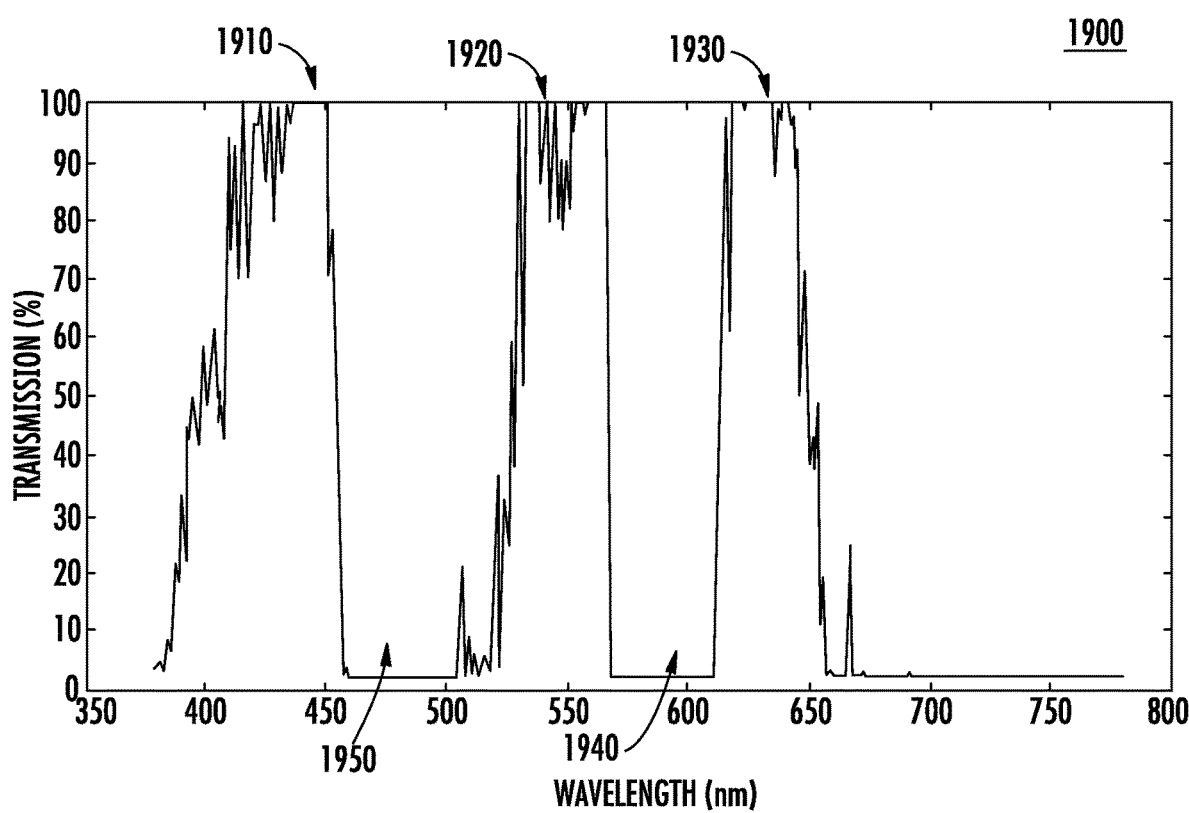
FIG. 19 illustrates a plot of transmission spectrum versus wavelength for a configuration of the device of FIG. 1.

FIG. 19 illustrates a plot 1900 of transmission spectrum versus wavelength for a configuration of the present invention. In the configuration illustrated in FIG. 19, optical glass or plastic may be used as the substrate of the optical device of FIG. 1. The optical glass or plastic may be formed as the substrate of the optical device with a thickness of 2 mm and a diameter of 68 mm. In this configuration normal color vision may be enhanced and/or red-green and/or blue-yellow CVD corrected. Plot 1900 illustrates a transmission spectrum of the optical device, produced by a thin film coating, with at least three passbands 1910, 1920, 1930 between 380 nm and 780 nm. Plot 1900 may illustrate a curve exhibiting a minimum transmission of at least 1% in the entire visible spectrum range, a stop-band 1940 centered between 560 nm and 620 nm with a FWHM reflectance of at least 25 nm, and another stop-band 1950 centered between 450 nm and 555 nm with a FWHM reflectance of at least 35 nm.

A film coating may be applied to the substrate. The film coating may be constructed of high and low refractive index materials in alternating stacking order, to produce a total number of layers, such as for a total of 21 layers. The high refractive index material may be ZnS and/or TiO2. The low refractive index material may be SiO2 and/or Cryolite. The physical thickness of any layer of film coating material is between 100 nm and 1500 nm, e.g. 280 nm for the low refractive index material and 440 nm for the high refractive index material. The film coating may be deposited onto the optical substrate using physical vapor deposition (PVD). When using Cryolite, two or more sealant layers may be used to keep moisture away.

For the device of FIG. 1 with transmission properties shown in FIG. 19, the CPIs, tabulated in Table 7, are evaluated using CIE LUV color space.

Table 7 represents colorimetric performance for the optical device of FIG. 1 with the transmission properties shown in FIG. 19.

TABLE 7

Colorimetric Performance for the Optical Device of FIG. 1 with the
Transmission Properties Shown In FIG. 19.

| | | Color Vision | | Metamerism | | | |
|---|---|---|---|---|---|---|---|
| Color Vision Type | Illuminant | Blue-Yellow Color Separation Enhancement (%) | Optical Device Lightness | Optical Device White Point Hue | Optical Device Cosmetic White Point Shift | CMF Shift From Normal | CMF Peak Sensitivity |
| Normal | CIE D65 | 11.1 | 69.9 | Blue | 0.011 | None | Normal |
| Normal | CIE D55 | 5.8 | 73.4 | Blue | 0.007 | None | Normal |
| Deutan | CIE D65 | 8.9 | 67.0 | Blue | 0.011 | M-cone, 5 nm red shift | 90% of normal |
| Deutan | CIE D55 | 5.1 | 70.6 | Cyan | 0.008 | M-cone, 5 nm red shift | 90% of normal |
| Protan | CIE D65 | 12.9 | 69.9 | Blue | 0.012 | L-cone, 5 nm blue shift | 90% of normal |
| Protan | CIE D55 | 7.7 | 73.1 | Blue | 0.007 | L-cone, 5 nm blue shift | 90% of normal |
| Tritan | CIE D65 | 13.9 | 69.6 | Blue | 0.009 | S-cone, 5 nm blue shift | 90% of normal |
| Tritan | CIE D55 | 10.2 | 73.0 | Blue | 0.010 | S-cone, 5 nm red shift | 90% of normal |

The optical device of FIG. 1 with transmission properties shown in FIG. 19 provides a blue-yellow color separation enhancement of more than 5% consistently. The optical device controls metamerism by restricting a lightness variation of less than 7, WP hues maintained at blue or cyan, and WPS between 0.007 and 0.012. The consistent blue/cyan WPs (tint) of the optical device may constructed to move the CVD confusion colors used in CVD tests, and colors used in evaluating CPIs off of the color confusion lines for tritans. This tint further improves an ability of a tritan to distinguish confusing colors.

Figure 20:
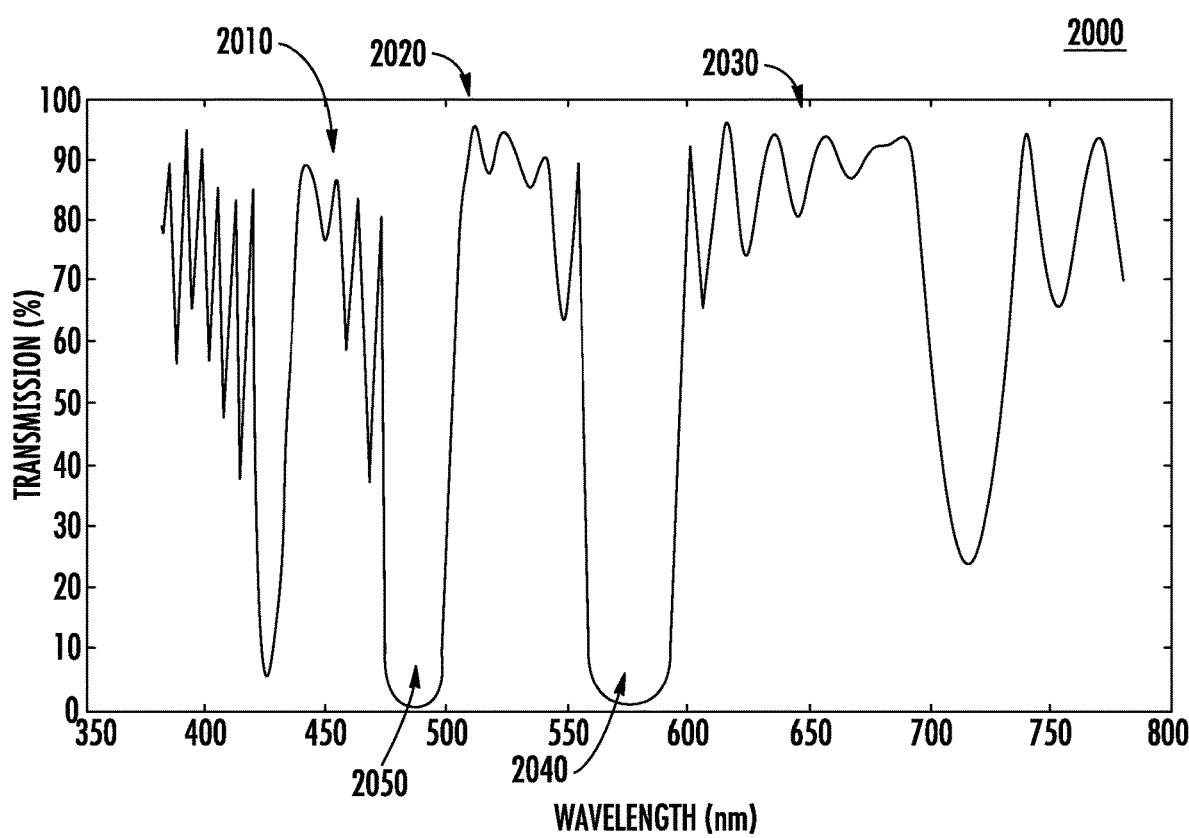
FIG. 20 illustrates a plot of transmission spectrum versus wavelength for a configuration of the device of FIG. 1.

FIG. 20 illustrates a plot 2000 of transmission spectrum versus wavelength for a configuration of the present invention. In the configuration illustrated in FIG. 20, optical glass or plastic may be used as the substrate of the optical device of FIG. 1. The optical glass or plastic may be formed as the substrate of the optical device with a thickness of 3 mm and a diameter of 75 mm. In this configuration normal color vision may be enhanced and/or red-green CVD corrected. Plot 2000 illustrates a transmission spectrum of the optical device, produced by a thin film coating, with at least three passbands 2010, 2020, 2030 between 380 nm and 780 nm. Plot 2000 may illustrate a curve exhibiting a minimum transmission of at least 0.5% in the entire visible spectrum range, a stop-band 2040 centered between 560 nm and 590 nm with a FWHM reflectance of at least 10 nm, and another stop-band 2050 centered between 465 nm and 500 nm with FWHM reflectance of at least 8 nm.

A film coating may be applied to the substrate. The film coating may include high and low refractive index materials in alternating stacking order to produce a number of total layers, such as a total of 11 layers, for example. The high refractive index material may be ZnS. The low refractive index material may be Cryolite. The physical thickness of any layer of film coating material is between 150 nm and 1000 nm, e.g. 290 nm for the low refractive index material and 445 nm for the high refractive index material. The film coating may be deposited onto the substrate using physical vapor deposition (PVD). When using Cryolite, two or more sealant layers are used to keep moisture away.

For the device of FIG. 1 with the transmission properties shown in FIG. 20, the CPIs, tabulated in Table 8, are evaluated using CIE LUV color space.

Table 8 represents colorimetric performance for the optical device of FIG. 1 with the transmission properties shown in FIG. 20.

TABLE 8

Colorimetric Performance for the Optical Device of FIG.1 with the Transmission Properties Shown In FIG. 20.

| Color Vision Type | Illuminant | Color Vision Red-Green Color Separation Enhancement (%) | Optical Device Lightness | Metamerism Optical Device White Point Hue | Optical Device Cosmetic White Point Shift | CMF Shift From Normal | CMF Peak Sensitivity |
|---|---|---|---|---|---|---|---|
| Normal | CIE D65 | 39.9 | 74.3 | Neutral | 0.003 | None | Normal |
| Normal | CIE D55 | 41.7 | 77.1 | Neutral | 0.003 | None | Normal |
| Normal | CIE F7 | 39.1 | 71.7 | Cyan | 0.006 | None | Normal |
| Deutan | CIE D65 | 39.0 | 70.6 | Neutral | 0.004 | M-cone, 5 nm red shift | 90% of normal |
| Deutan | CIE D55 | 40.9 | 74.3 | Neutral | 0.004 | M-cone, 5 nm red shift | 90% of normal |
| Deutan | CIE F7 | 38.5 | 68.1 | Blue | 0.007 | M-cone, 5 nm red shift | 90% of normal |
| Protan | CIE D65 | 32.1 | 74.3 | Neutral | 0.005 | L-cone, 5 nm blue shift | 90% of normal |
| Protan | CIE D55 | 34.3 | 77.2 | Neutral | 0.005 | L-cone, 5 nm blue shift | 90% of normal |
| Protan | CIE F7 | 31.4 | 72.0 | Cyan | 0.007 | L-cone, 5 nm blue shift | 90% of normal |

The optical device of FIG. 1 with transmission properties shown in FIG. 20 provides a red-green color separation enhancement of more than 30% consistently. The optical device controls metamerism by restricting a lightness variation of less than 10, WP hues maintained mostly at neutral under CIE daylight illuminants or at pastel blue/cyan colors under CIE F7 illuminant, and WPS between 0.003 and 0.007. The consistent neutral or light blue/cyan WPs (tints) of the optical device may be constructed to maintain a mostly neutral cosmetic look of the optical device or a pleasant cool-colored aesthetic. This construction produces an optical device with a lightness of 68 or more, which is for both indoor and outdoor use. Other constructions that produce an optical device with a lightness of less than 65 are generally used in luminous environments, such as outdoors or brightly-lit indoors.

Figure 21:
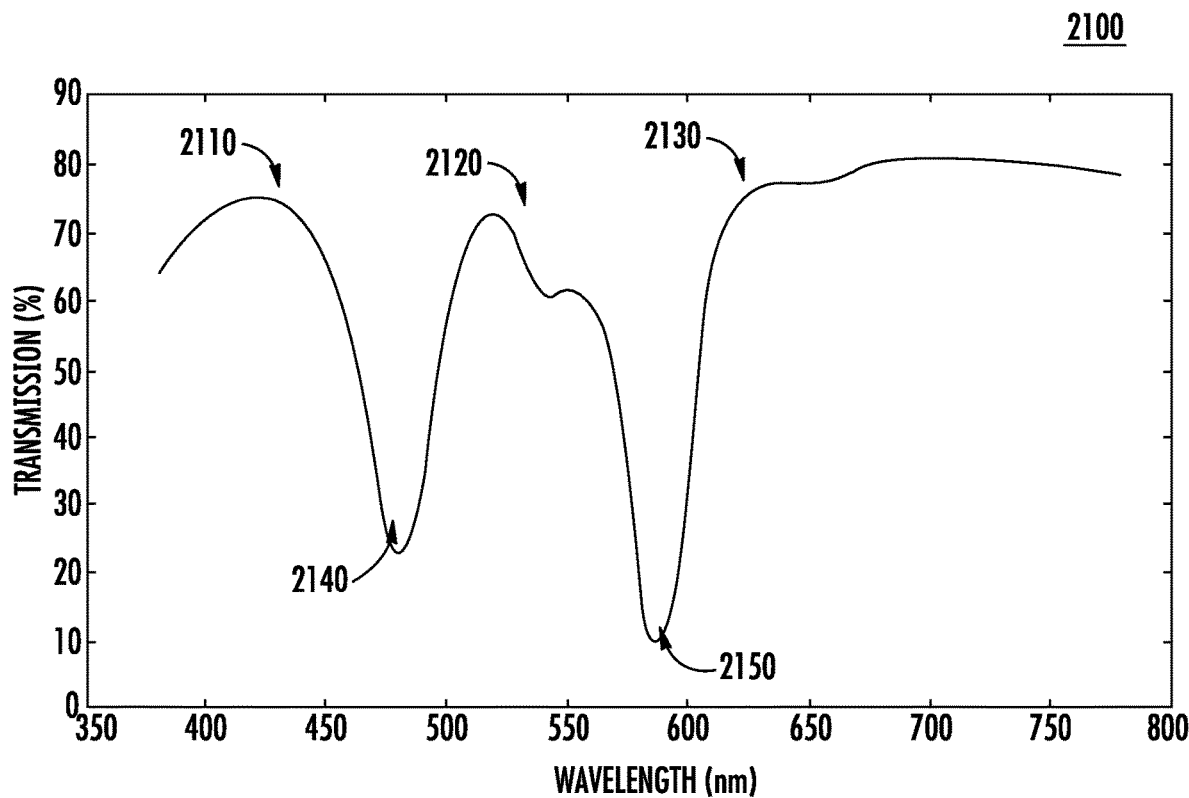
FIG. 21 illustrates a plot of transmission spectrum versus wavelength for a configuration of the device of FIG. 1.

FIG. 21 illustrates a plot 2100 of transmission spectrum versus wavelength for a configuration of the present invention. In the configuration illustrated in FIG. 21, PMMA may be used as the substrate of the optical device of FIG. 1. The PMMA may be formed as the substrate of the optical device with a thickness of 2 mm and a diameter of 70 mm. In this configuration normal color vision may be enhanced and/or red-green CVD corrected. Plot 2100 illustrates a transmission spectrum of the optical device with at least three passbands 2110, 2120, 2130 between 380 nm and 780 nm. An absorbing dye with peak absorptions at 478 nm (2140) and a dye at 588 nm peak absorption (2150) may be used. The concentrations of these dyes range between 0.5 micro-mol to 35 micro-mol.

For the device of FIG. 1 with the transmission properties shown in FIG. 21, the CPIs tabulated in Table 9, are evaluated using CIE LUV color space.

Figure 22:
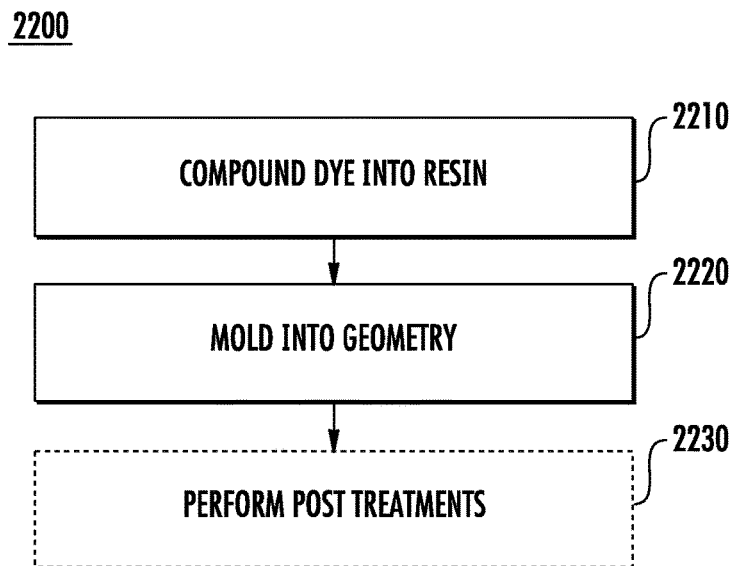
FIG. 22 illustrates the manufacturing process for the device illustrated by the transmission plot of FIG. 21.

The method of manufacturing 2200 the substrate is illustrated in FIG. 22. At step 2210, the dyes are compounded into resin. At step 2220 the resin with the compounded dye is molded into desired geometry such that the dyes are fully infused into the optical substrate. At step 2230, any post-treatments including anti-abrasion, anti-reflection and UV coatings may be performed.

Table 9 represents colorimetric performance for the optical device of FIG. 1 with the transmission properties shown in FIG. 21.

TABLE 9

Colorimetric Performance for the Optical Device of FIG. 1 with the Transmission Properties Shown In FIG. 21.

| Color Vision Type | Illuminant | Red-Green Color Separation Enhancement (%) | Optical Device Lightnses | Metamerism | | CMF Shift From Normal | CMF Peak Sensitivity |
| --- | --- | --- | --- | --- | --- | --- | --- |
| | | | | Optical Device White Point Hue | Optical Device Cosmetic White Point Shift | | |
| Normal | CIE D65 | 11.2 | 81.0 | Neutral | 0.005 | None | Normal |
| Normal | CIE F2 | 14.2 | 79.8 | Blue | 0.010 | None | Normal |
| Normal | CIE F11 | 10.5 | 78.3 | Neutral | 0.005 | None | Normal |
| Deutan | CIE D65 | 10.7 | 76.2 | Blue | 0.006 | M-cone, 5 nm red shift | 90% of normal |
| Deutan | CIE F2 | 14.7 | 79.6 | Blue | 0.012 | M-cone, 5 nm red shift | 90% of normal |
| Deutan | CIE F11 | 10.1 | 78.2 | Blue | 0.006 | M-cone, 5 nm red shift | 90% of normal |
| Protan | CIE D65 | 7.1 | 81.9 | Blue | 0.006 | L-cone, 5 nm blue shift | 90% of normal |
| Protan | CIE F2 | 9.8 | 79.9 | Blue | 0.011 | L-cone, 5 nm blue shift | 90% of normal |
| Protan | CIE F11 | 7.9 | 78.5 | Neutral | 0.005 | L-cone, 5 nm blue shift | 90% of normal |

The optical device of FIG. 1 with transmission properties shown in FIG. 21 provides a red-green color separation enhancement of more than 7% consistently. The optical device controls metamerism by restricting a lightness variation of less than 6 with a minimum lightness of 76, WP hue maintained at neutral or pastel blue, and a White Point Shift (WPS) range of 0.007. The optical device may be constructed with very high lightness and good red-green color separation performance while controlling and/or minimizing metamerism due to different color visions and illuminant cases of daylights and fluorescent lights.

The yellowing and/or yellowed human crystalline lenses and yellow replacement IOLs shift the WP of human color vision to a yellow hue. In short, this is referred to as yellow color vision (YCV). YCV shifts the perception of other primary and derivative colors away from their normal perceptions. The Spectral Admittances for any color i viewed with YCV, with and without corrective optical devices are defined by Equation 22.

$$M_{i,YCV}(\lambda) = \begin{cases} \text{Illuminant}(\lambda) * \text{Color}_i(\lambda) * YCV(\lambda), \\ \quad \text{w/o corrective Optical Device} \\ \text{Illuminant}(\lambda) * \text{Color}_i(\lambda) * YCV(\lambda) * \\ \quad T(\lambda), \text{with corrective Optical Device} \end{cases} \quad \text{Equation 22}$$

$M_{YCV}(\lambda)$ is used as the Spectral Admittance in formulations where YCV is involved.

Colors for use in the YCV Spectral Admittance may include the representative Munsell colors for reds (2.5YR 5/4, 7.5R 5/4, 2.5R 5/4, 5RP 5/4, 10P 5/4, 10YR 5/4, 10R 5/4, 10RP 5/4), greens (5BG 5/4, 10G 5/4, 5G 5/4, 10GY 5/4, 5GY 5/4, 10BG 5/4), blues (5B 5/4, 10BG 5/4, 5BG 5/4, 5P 5/4, 10B 5/4, 10P 5/4, 10PB 5/4), and yellows (10GY 5/4, 5GY 5/4, 5Y 5/4, 10YR 5/4, 2.5YR 5/4, 10Y 5/4, 10YR 5/4). Colors for use in the YCV Spectral Admittance may include the representative Ishihara CVD test colors. Colors for use in the YCV Spectral Admittance may include the representative colors in nature, e.g. leafs, flowers, wood.

The transmission spectra of yellowed crystalline lenses between 380 nm and 780 nm may be $YCV_{crystalline}(\lambda)$, and may be measured in situ of the functioning eye or are statistically tabulated from data. The transmission spectra of yellow IOLs between 380 nm and 780 nm may be $YCV_{IOL}(\lambda)$, and may be measured directly via spectrophotometry or are statistically tabulated from data.

A minimum transmission value of the optical device of at least 0.5% may be constructed to ensure that minimal transmittance at visible wavelengths for safety or other reasons. A minimum transmission value of the optical device with at least 0.5% may be constructed to ensure that minimal transmittance from any portion of wavelengths within 500 nm to 650 nm for safety or other reasons. A minimum transmission value of the optical device with at least 0.5% may be constructed to ensure that minimal transmittance from any portion of wavelengths within 400 nm to 500 nm for safety or other reasons.

The key CPI for the optical device may be to correct or attempt to correct the YCV of the observer by reducing the White Point Shift (WPS) of the observer's color vision after applying the optical device. The key CPI for the optical device may be to correct or attempt to correct the YCV of the observer by reducing the mismatch between representative colors as viewed by the observer with YCV after applying the optical device and those colors as viewed by another observer with normal color vision. Mismatch measurements comprise of totaling the color distance, over representative colors, between the two observers' color perceptions.

Under various illuminants or blended illuminants, metamerism in the observer's corrected color vision (previously having YCV) may be a key CPI to control and/or minimize using the constructed transmission spectra of the optical device. Under various illuminants or blended illuminants, metamerism of the cosmetic look of optical device may be a CPI to control and/or minimize using its own constructed transmission spectra. Under various illuminants or blended illuminants, Lightness of the observer's corrected color vision may be a key CPI to control and/or maximize using the target and constructed transmission spectra of the optical device. Under various illuminants or blended illuminants, Lightness of the optical device may be a CPI to control and/or maximize using its own target and constructed transmission spectra.

Figure 23:
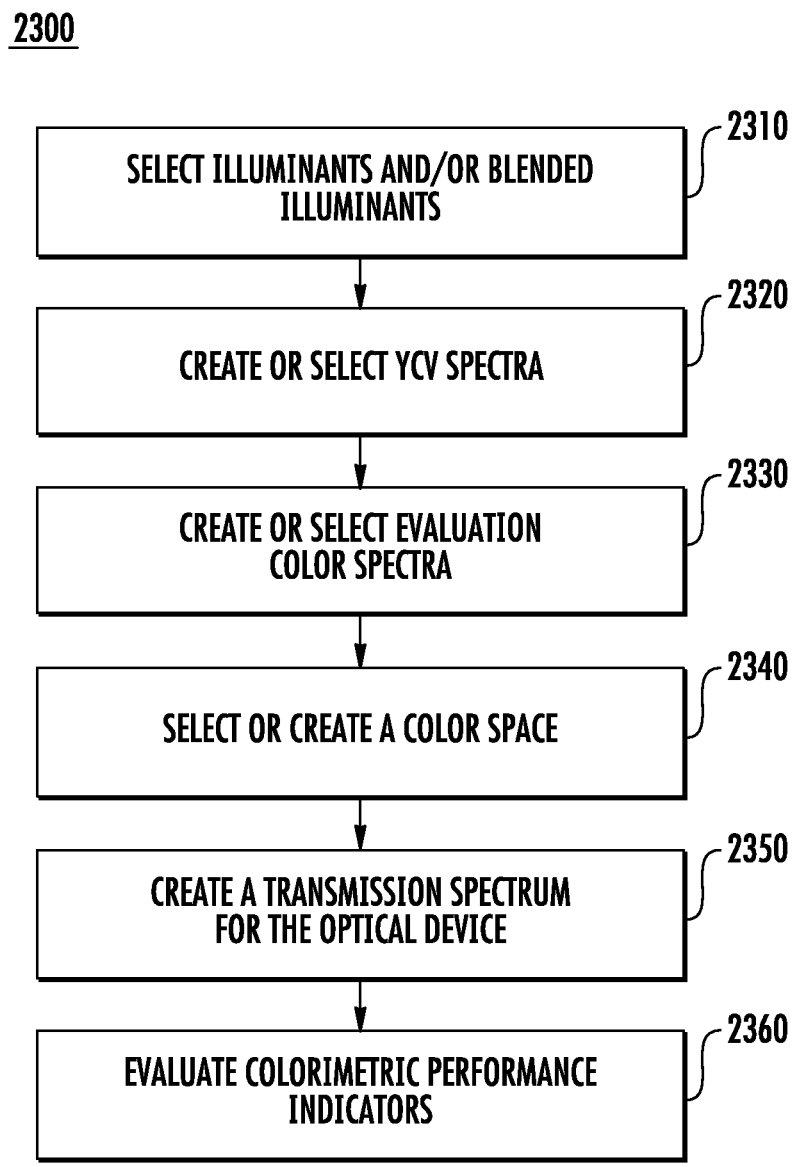
FIG. 23 illustrates a method for finding the transmission spectra of the optical device that satisfies minimum transmission constraints and achieves CPI targets or achieves the best CPIs within allotted iterations of search or a predetermined time for the Yellow Color Vision (YCV) correction application.

FIG. 23 illustrates a method 2300 for finding the transmission spectra of the optical device that satisfies minimum transmission constraints and achieves CPI targets or achieves the best CPIs within allotted iterations of search or a pre-determined time for the Yellow Color Vision (YCV) correction application. Method 2300 is similar to method 300 described herein above.

Method 2300 includes creating and/or selecting one or more illuminants and/or blended illuminants at step 2310. At step 2320, method 2300 includes creating and/or selecting YCV spectra, e.g. transmission spectra of yellowed crystalline lenses and yellow IOLs. At step 2330, method 2300 includes creating and/or selecting evaluation color spectra for YCV correction determination. Method 2300 includes selecting or creating a color space at step 2340. At step 2350, method 2300 includes creating a transmission spectrum for the optical device that satisfies minimum transmission requirements. Method 2300 includes evaluating CPIs of White Point Shift (WPS) of corrected color vision, color distance between evaluation colors as perceived by corrected color vision and the same colors as perceived by another person with normal color vision, metamerism of corrected color vision, metamerism of optical device, lightness of corrected color vision, and lightness of optical device at step 2360.

Method 2300 ends if CPI targets reached or maximum iterations on new transmission spectra reached or no change in CPIs after some iteration or other stopping criteria reached. Once completed the best output transmission spectrum of the optical device from 380 nm to 780 nm may be saved.

Color enhancement, red-green CVD and blue-yellow CVD correction along with YCV correction may be CPIs for a single optical device or system. The design of an optical device with such transmittance is comprised of two steps. First step is to design an optical device with the transmission spectrum such that YCV is completely or partially corrected. This step can be performed using the method 2300 of FIG. 23. The second step is to design another optical device with a different transmission spectrum such that the transmitted spectra from first step is used as the effective illuminant input, and color enhancement and/or CVD correction are targeted as CPIs, e.g. to maximize red-green color separation. This second step can be performed using the method 300 of FIG. 3. The multiplicative product of two transmission spectra from the two steps is the effective target transmission spectrum of a single optical device or system that completely or partially corrects YCV and enhances color and/or completely or partially corrects CVD. These steps may be reversed in order. That is, a reverse order of color enhancement and/or CVD correction first, and then YCV correction is equally acceptable.

The method 200 of FIG. 2 may be used to construct optical devices with the target transmission spectra resulting from the combination of the two methods, namely spectrum absorption method using colorants and spectrum reflection method using thin films. For example, colorants mixed into and/or coated onto, and/or thin films coated onto the optical substrate may be used to construct the optical device with the target transmission spectrum that corrects YCV and/or enhances color and/or completely or partially corrects CVD.

The transmission spectrum of a natural yellowed crystalline lens or similarly yellowed intraocular lens (IOL) is illustrated in FIG. 2400 along with the transmission spectrum of an optical device used to correct the YCV. The curve represented by 2410 shown in dashed is the transmission spectrum of a natural yellowed crystalline lens or similarly yellowed IOL. The curve represented by 2420 shown in solid is the transmission spectrum of an optical device that corrects the YCV.

Figure 24:
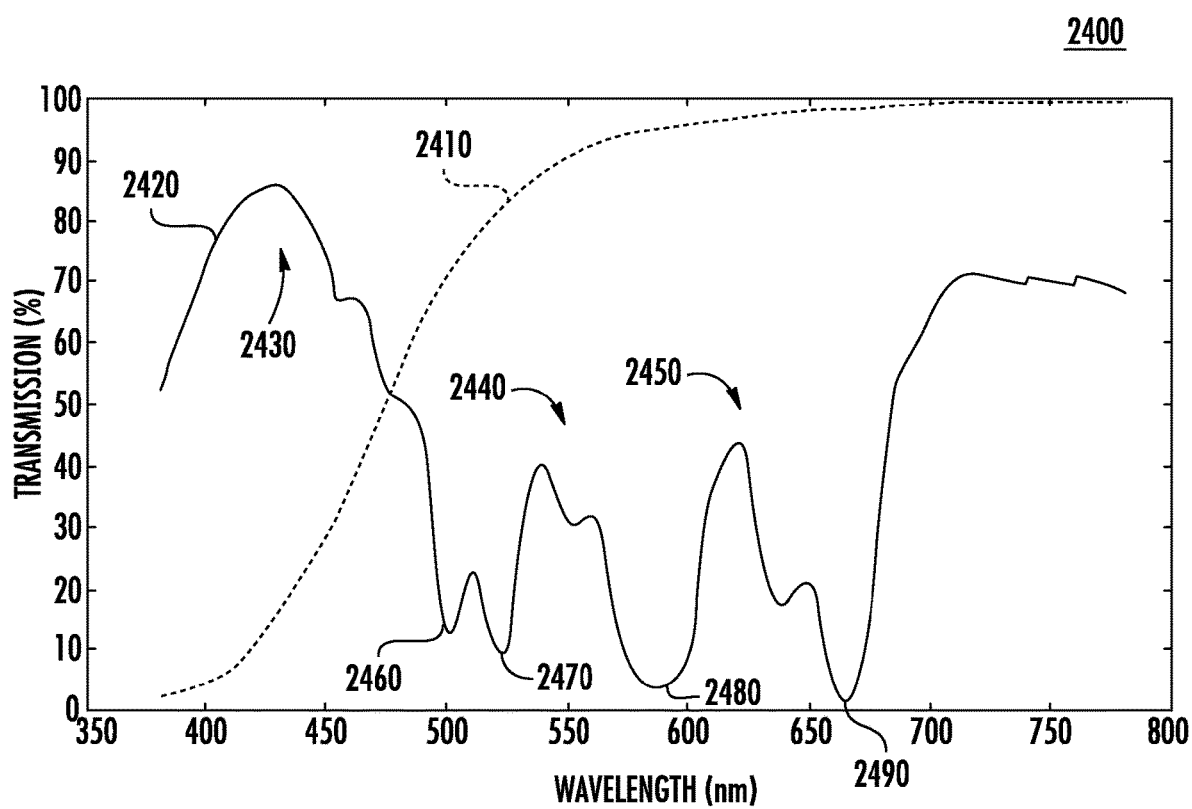
FIG. 24 illustrates the transmission spectrum of a natural yellowed crystalline lens or similarly yellowed intraocular lens (IOL) along with the transmission spectrum of an optical device used to correct the YCV.
Figure 25:
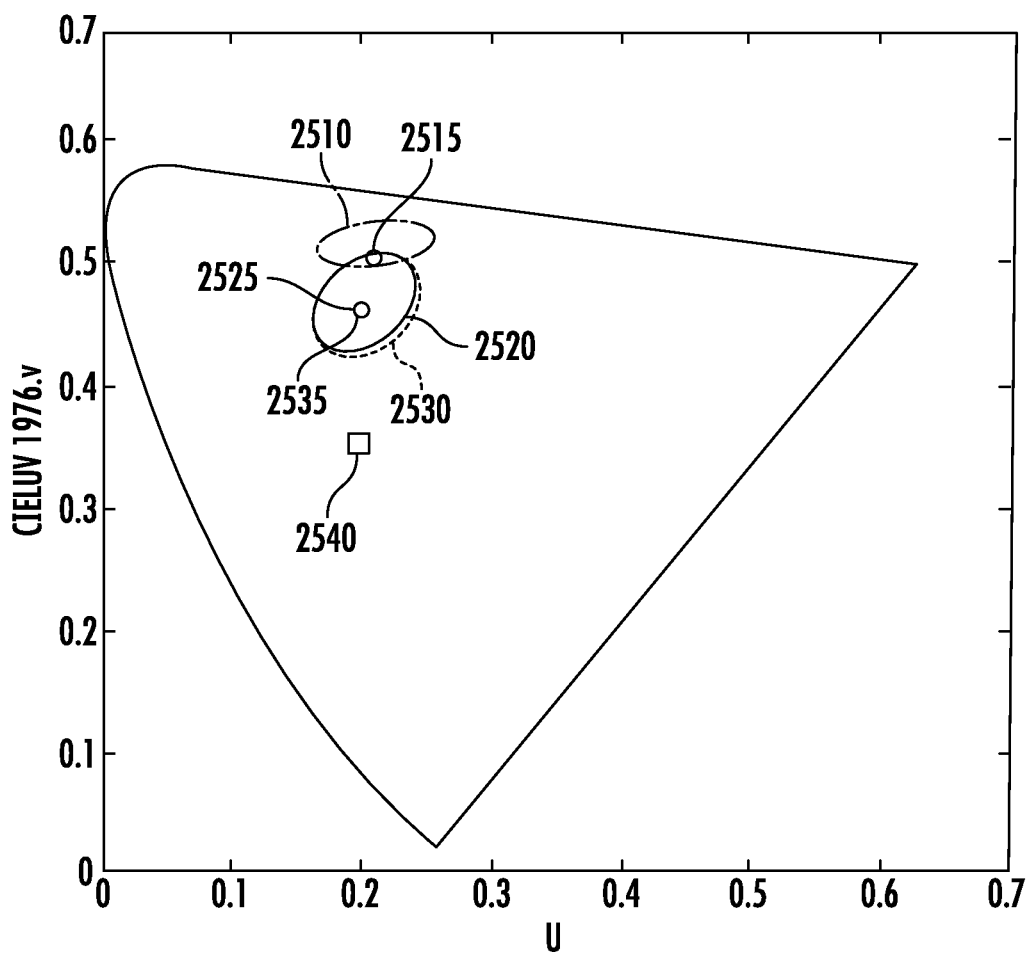
FIG. 25 illustrates the color vision gamuts present.

FIG. 25 illustrates the color vision gamuts present in plot 2500. The color vision gamut is a complete subset of colors, such as the subset of colors which can be accurately represented within the color space or by the optical device. Plot 2500 illustrates the color vision gamuts, encircled by selected Munsell colors of reds, greens, blues, yellows and derivative colors in CIE LUV color space with CIE D65 illuminant. The YCV 2510 due to yellowed crystalline lens or IOL including the corresponding yellow WP of YCV 2515 is shown. The normal color vision 2520 with the corresponding neutral WP of color vision 2525 is shown. The corrected color vision 2530 due to the fitting of an optical device with the corresponding transmission spectrum 2420 of FIG. 24, with the corresponding neutral WP 2535 of the corrected color vision is shown. The cosmetic blue WP of the optical device 2540 is also shown.

Referring also to FIG. 24, the transmission spectrum 2420 of the optical device has at least three passbands 2430, 2440, 2450 between 380 nm and 780 nm. Plot 2420 may illustrate a minimum transmission constraint of 1% between 560 nm and 610 nm, and has a peak transmission value between 380 nm and 510 nm or between 650 nm and 780 nm. A double-peak absorbing dye with peak absorptions at both 500 nm (2460) and 520 nm (2470) is used, along with one dye with peak absorptions at 590 nm (2480), and a final dye at 663 nm (2490). The blue or cool-colored WP (tint) of the optical device and along with its set of pass-bands and stop-bands in transmission spectrum corrects both the WP of the YCV and/or eliminates or reduces the mismatch between colors and/or color gamuts illustrated in FIG. 25 as viewed by the observer with YCV after applying the optical device and those colors as viewed by another observer with normal color vision. The construction of the corrective optical device can be in any ophthalmic form, including spectacles, sunglasses and contact lenses.

Optical glass or plastic may form the substrate for constructing spectacles or sunglasses, with a thickness of 2 mm and a diameter of 68 mm. The concentrations of these dyes range between 1 micro-mol to 90 micro-mol for dye-infused optical substrate.

For this device with the transmission properties of spectrum 2420 shown in FIG. 24, the CPIs, tabulated in Table 10, are evaluated using CIE LUV color space. The dyes may be infused into the optical substrate or coated onto the surface of the substrate using well-known compounding/molding or coating processes, such as dip, spin, spray or vapor deposition. The transmission spectrum of the optical device may be constructed using thin film coatings that substantially matches spectrum 2420 and coated/deposited onto an optical substrate. With YCV and various illuminants, correction of YCV may be achieved for a normal observer. The optical device controls metamerism of corrected color vision by restricting a lightness variation of less than 6, WP hue maintained at neutral, and WPS range of less than 0.002 (imperceptible chroma). The optical device is a blue WP/tinted sunglass or optical device with a darkened lightness. The device controls metamerism by restricting a lightness variation of less than 5, WP hue maintained at blue, and WPS range of less than 0.015 (equivalent to 13.6% of mean WPS).

Table 10 represents colorimetric performance for the optical device with the transmission properties shown in FIG. 24.

TABLE 10

Colorimetric Performance for the Optical Device with the Transmission Properties Shown In FIG. 24.

| Color Vision Type | Illuminant | Corrected Color Vision Lightness | Corrected Color Vision White Point Hue | Corrected Color Vision White Point Shift | Optical Device Lightness | Optical Device White Point Hue | Optical Device Cosmetic White Point Shift |
|---|---|---|---|---|---|---|---|
| Yellow Color Vision | CIE D65 | 50 | Neutral | 0.002 | 53.7 | Blue | 0.111 |
| Yellow Color Vision | CIE D55 | 52.6 | Neutral | 0.002 | 56.2 | Blue | 0.102 |
| Yellow Color Vision | CIE F11 | 47.5 | Neutral | 0.002 | 51.3 | Blue | 0.117 |

Figure 26:
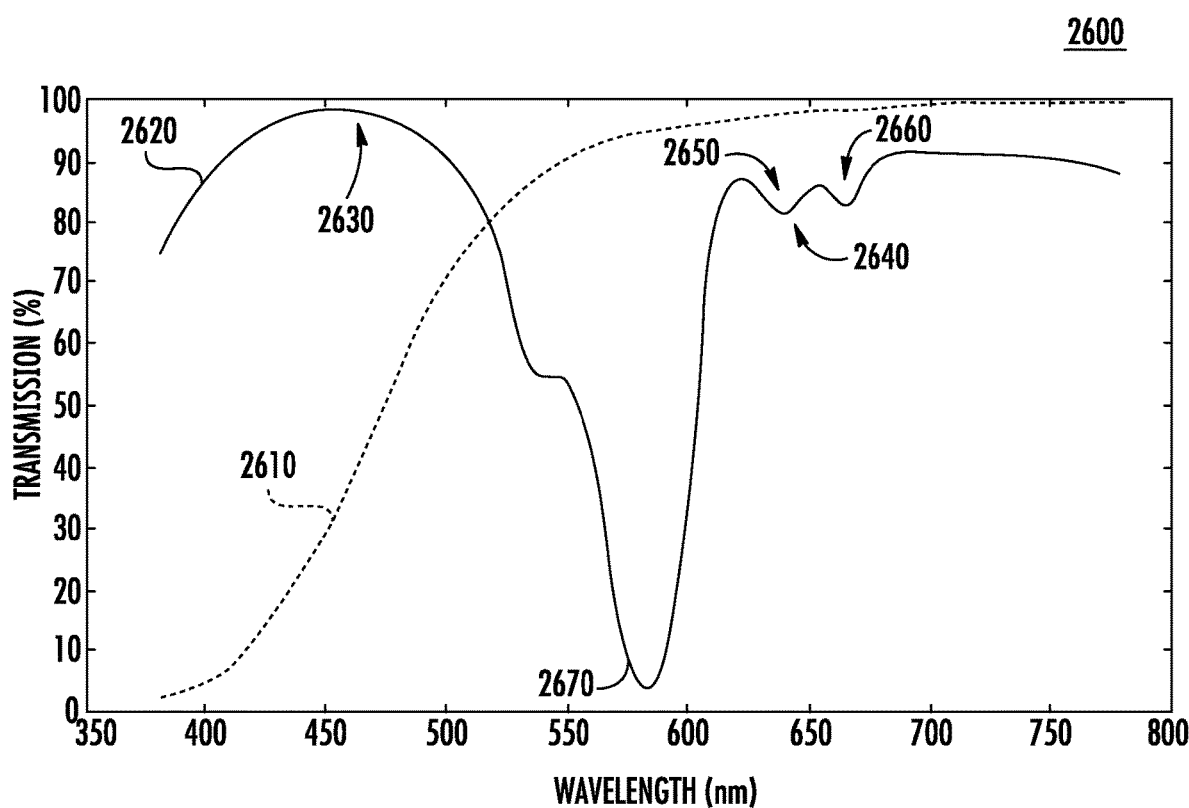
FIG. 26 illustrates a plot transmission versus wavelength for a configuration of the present invention.

FIG. 26 illustrates a plot 2600 of transmission versus wavelength for a configuration of the present invention. In this configuration, the transmission spectrum of a natural yellowed crystalline lens or similarly yellowed IOL 2610 (dashed line) along with the transmission spectrum of an optical device at least partially able to correct the YCV 2620 (solid line). Plot 2600 illustrates a transmission spectrum of the constructed optical device 2620 having at least two passbands between 380 nm and 780 nm. Curve 2620 illustrates a minimum transmission constraint of 1% between 560 nm and 610 nm, and has a peak transmission value between 380 nm and 510 nm (2630) or between 620 nm and 780 nm (2640). A double-peak absorbing dye with peak absorptions at both 639 nm (2650) and 664 nm (2660) is used, along with one dye with peak absorptions at 582 nm (2670). The blue or cool-colored WP (tint) of the optical device and along with its set of pass-bands and stop-bands in transmission spectrum partially corrects both the WP of the YCV and/or reduces the mismatch between colors as viewed by the observer with YCV after applying the optical device and those colors as viewed by another observer with normal color vision. The construction of the corrective optical device may be in any ophthalmic form, including spectacles, sunglasses and contact lenses.

Optical glass or plastic may be used as the optical substrate for constructing spectacles or sunglasses. The substrate thickness may be 2 mm and a diameter of 68 mm. The concentrations of these dyes range between 0.1 micro-mol to 70 micro-mol for dye-infused optical substrate for molding and compounding resins.

For an optical device exhibiting the transmission curve (2620) in FIG. 26, the CPIs, tabulated in Table 11, may be evaluated using CIE LUV color space. The dyes may be coated onto the surface of the substrate using well-known coating processes, such as dip, spin, spray or vapor deposition. The transmission spectrum of the optical device may be constructed using thin film coatings to provide a transmission spectrum of curve 2620. With YCV and various illuminants, partial correction of YCV is achieved by reducing yellowness of vision while maintaining high lightness of vision and of the optical device itself for both indoor and outdoor use. The optical device controls metamerism of partially corrected color vision by restricting a lightness variation of less than 5, WP hue maintained at pastel yellow, and WPS range of less than 0.022. WPS range is less than 0.009 if CIE F2 illuminant is excluded from evaluation, for the WPS itself is only 0.008 for the partially corrected solution. The optical device may have a blue WP/tint. The optical device may control metamerism by restricting a lightness variation of less than 5, WP hue maintained at blue, and WPS range of less than 0.016 (equivalent to 26% of mean WPS).

Table 11 represents colorimetric performance for the optical device with the transmission properties shown in FIG. 26.

TABLE 11

Colorimetric Performance for the Optical Device with the Transmission Properties Shown In FIG. 26.

| | | | | | | Color Vision and Metamerism | | | | |
|---|---|---|---|---|---|---|---|---|---|---|
| Color Vision Type | Illuminant | Uncorrected Color Vision White Point Hue | Uncorrected Color Vision White Point Shift | Corrected Color Vision White Point Hue | Corrected Color Vision White Point Shift | Corrected Color Vision Lightness | Optical Device Lightness | Optical Device White Point Hue | Optical Device Cosmetic White Point Shift |
| Yellow Color Vision | CIE D65 | Yellow | 0.055 | Yellow | 0.021 | 70.0 | 74.9 | Blue | 0.058 |
| Yellow Color Vision | CIE F2 | Yellow | 0.037 | Yellow | 0.008 | 69.2 | 72.6 | Blue | 0.059 |
| Yellow Color Vision | CIE F7 | Yellow | 0.055 | Yellow | 0.021 | 70.8 | 75.9 | Blue | 0.061 |
| Yellow Color Vision | CIE F11 | Yellow | 0.041 | Yellow | 0.029 | 73.2 | 77.0 | Blue | 0.046 |

Interference-based layered film coatings may be used to create the transmission spectra described herein. Interference-based layered film coatings may be referred to as thin film coating and multilayered coating. Film coating may be used herein to refer to these interference-based layered film coatings and other ways of referring to interference-based layered film coatings. Such film coatings may include anti-reflective coatings, dichroic filters and band-pass filters.

Film coatings have a variety of geometric designs covering a wide range of possibilities, such as alternating layers of high and low refractive index materials and variable optical and/or physical thicknesses from layer to layer and within one layer as a function of distance location on film. For example, a linear variable filter (LVF) has a linearly changing optical thickness in one or more layers of the film coatings as a function of a linear distance dimension. Film coatings-based RVF may define optics where the optical or physical thickness of one or more layers is a function of the radial distance dimension from at least one center for the application of color enhancement, CVD correction and YCV correction.

Existing designs of film coatings are not robust against an increase in angle of incidence (AOI) from 0 DEG. Specifically, as AOI increases, transmission spectrum characteristics shift to shorter wavelengths. This phenomenon is known as Blue Shift. For example, a band-pass filter with pass-band centered at 600 nm at 0 DEG AOI may experience the shifting of pass-band center to <600 nms at higher AOIs.

Figure 27:
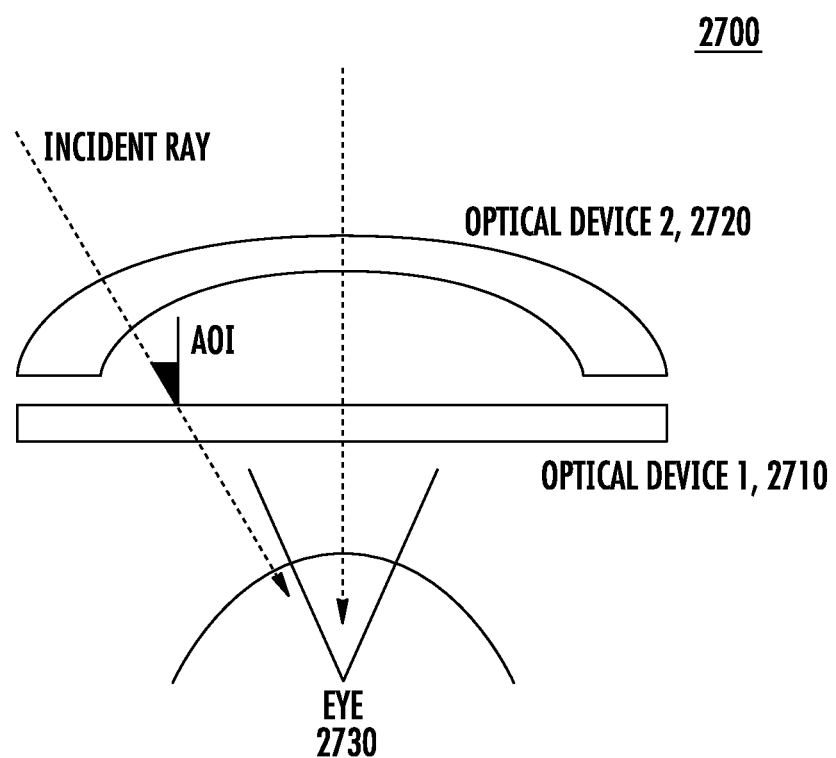
FIG. 27 illustrates the geometry of the eyewear lenses to the eye.

In applying the film coatings to eyewear, optical devices are considered fixed in front of the wearer's eyes. Due to the geometry of the lenses-eye setup the AOI is heavily dependent on the curvature of the optical device. For example, as illustrated in FIG. 27, the geometry of the lenses (optical device 1 2710 and optical device 2 2720) to the eye 2730 is depicted. FIG. 27 illustrates the eye 2730 (or another receiver) as a substantially fixed-position optical receiver relative to optical device, such as eyewear, and optical device 1 2710 and optical device 2 2720 separately serve as examples of device shapes. For optical device 1 2710, the AOI ranges from 0 DEG to more than 60 DEG from sweeping the flat or relatively flat device shape. For optical device 2 2720, the AOIs remain much closer to 0 DEG or substantially 0 DEG from sweeping the much more curved device shape. Reducing AOI via a curved device shape is one method of controlling colorimetric and spectral performance shifts from a variable AOI.

To maintain close to zero or zero blue shift, AOI may be near 0 DEG at locations on the optical device 2710, 2720. To achieve this result, the radius of curvature (ROC) of the optical device 2710, 2720 is the actual radial distance from eye 2730 to viewing location on the eyewear. As the ROC for the optical device 2710, 2720 deviates from the prescription, then a non-zero AOI is the result. This non-zero AOI results in blue shift. The AOI difference from 0 DEG may be reduced by increasing or decreasing the ROC of the optical device 2710, 2720 with the center being the eye 2730. However, if the blue shift is relatively small, such as less than 15 nm, then the wearer may notice little of or otherwise tolerate the slightly deviated performance of the CPIs of the optical device 2710, 2720.

In many cases, it is undesirable to have spherically curved lenses with a small ROC, such as for cosmetic, geometric and/or performance reasons. The RVF may be used to substantially maintain similar performance of the CPIs of the optical device across a wide range of AOIs from the perspective of the wearer of the optical device.

Figure 28:
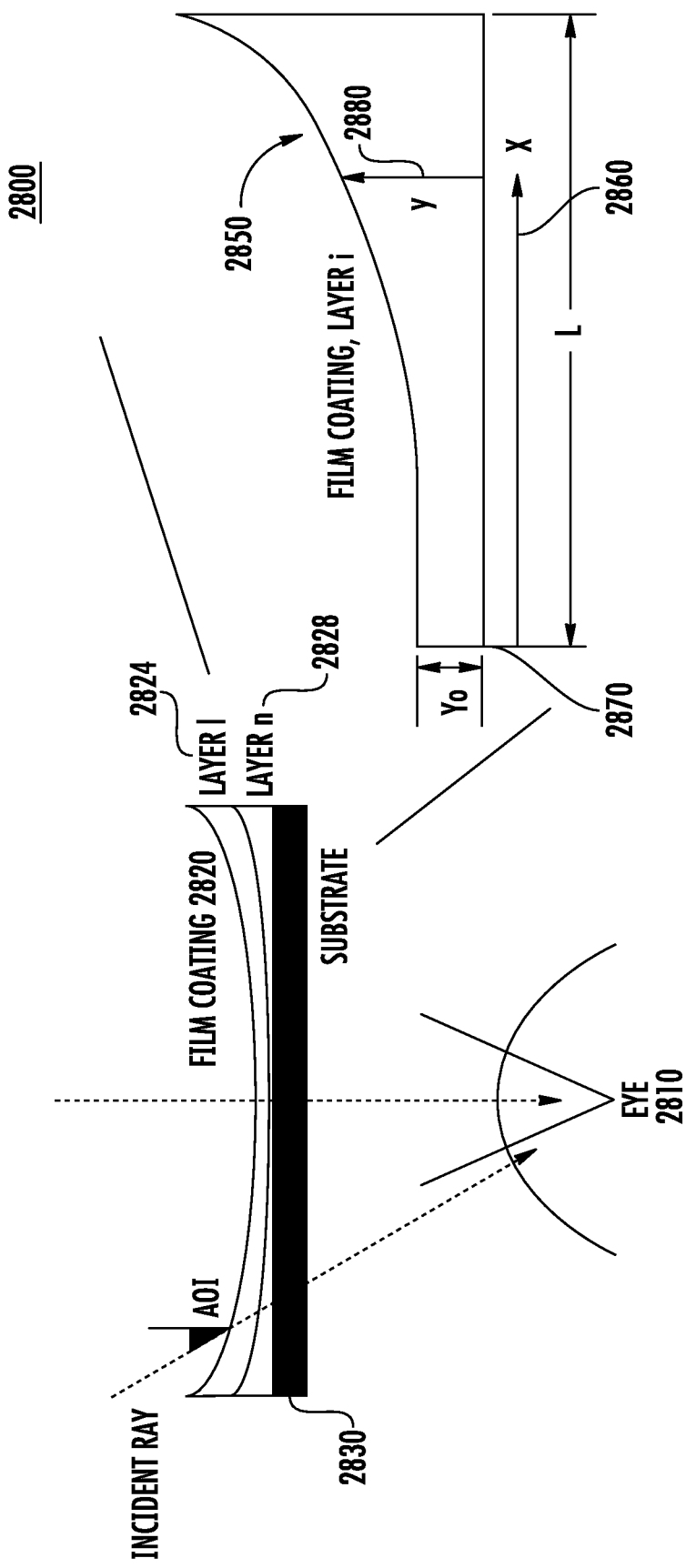
FIG. 28 illustrates the cross-sectional view of the RVF.

The RVF may be constructed by changing the optical or physical thickness of each film coating layer as a function of radial distance from the view center of optical device to substantially compensate for the performance deviations of the CPIs due to AOI variations. FIG. 28 illustrates the top-down cross-sectional view of the optical device with the RVF 2800. The eye 2810 (or another receiver) is a substantially fixed-position optical receiver relative to optical device with the RVF 2800, such as eyewear. The entire RVF 2820 may be coated onto a substrate 2830. The RVF 2820 may contain one or more layers of material (e.g. Layer 1 2824 to Layer n 2828) suitable for use as thin film layers. Layer 1 2850 being one example thin film layer, is exaggerated in the y-dimension to show its radially-variable thickness. x is the radial distance 2860 from view center of film coatings 2870, and y is the optical or physical thickness 2880 at x 2860 of layer i 2850. X 2860 may be much larger than y 2880, such as x 2860 in millimeters and y 2880 in hundreds of nanometers, by way of example. This practicality makes dy/dx≈0, i.e., the slope of y 2880 with respect to x 2860 is very small. Consequently, the AOI on any layer of RVF is approximately equal to the AOI on the substrate 2830. Although not illustrated, the substrate 2830 may be any curved shape, including a flat shape.

Figure 29:
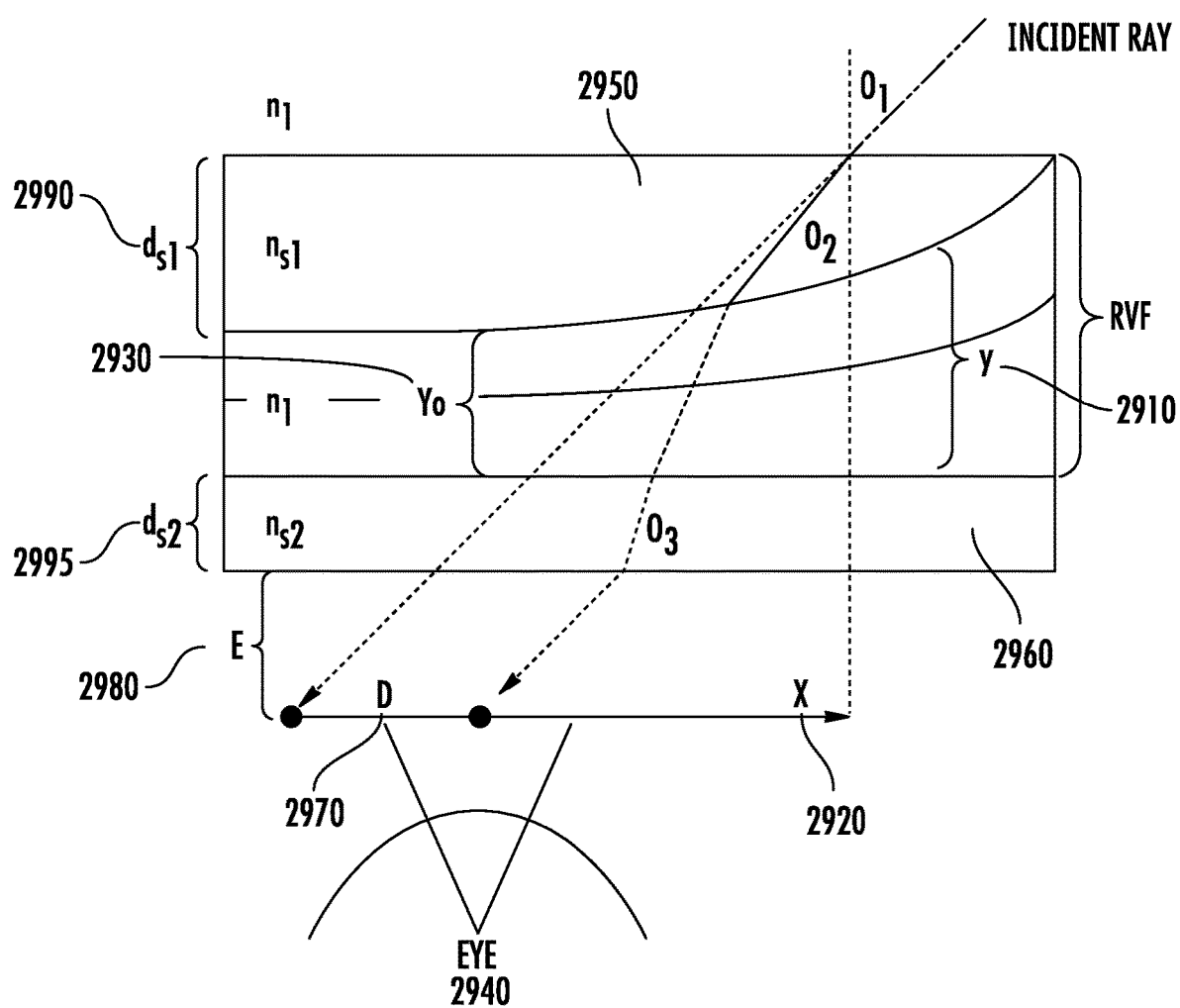
FIG. 29 illustrates the cross-sectional diagram to formulate y, optical or physical thickness of layer i of RVF, as a function of radial distance x from a viewing center, where yo is the RVF's layer i optical or physical thickness at viewing center of optical device.

FIG. 29 illustrates the top-down cross-sectional diagram of an optical device 2900 exploded to illustrate y 2910, the optical or physical thickness of layer i of an RVF, as a function of radial distance x 2920 from a viewing center, where yo 2930 is the RVF's layer i optical or physical thickness at viewing center of optical device 2900. y 2910 and yo 2930, being the thickness of points on the RVF (exaggerated in FIG. 29), and may be for the entire RVF or a combination of multiple layers of RVF, instead of only a single layer. The viewing center may be aligned with the position of the eye 2940 or other fixed-position optical receiver. The RVF may be located between a top layer 2950 and a bottom layer 2960 (both shaded). These two layers 2950, 2960 may be of any material for any purpose, e.g. anti-scratch coating and substrate. These two layers 2950, 2960 may be a preceding and succeeding coating layer of any kind. Additional distance variables include D 2970 representing the virtual distance between a conceptual non-refracted incident ray and the eye 2940, E 2980 representing the distance between optical device 2900 and the eye 2940, $d_{s1}$ 2990 representing the average thickness of the preceding layer 2950, $d_{s2}$ 2995 representing the average thickness of succeeding layer 2960. Refractive indices (RIs) are $n_1$ (external environment), $n_{s1}$ (preceding layer 2950), $n_{s2}$ (succeeding layer 2960) and $n_r$ (RVF layer or average among layers or average of entire RVF). Optical angles are $\theta_1$ (AOI), $\theta_2$ (refracted ray angle in preceding layer) and $\theta_3$ (refracted ray angle in succeeding layer).

In a configuration of the optic in FIG. 29, the dimensional and optical parameters correspond to sum of multiple RVF layers. The thickness of at least one film coating layer, y, is defined in Equation 23.

$$\frac{y}{y_o} = \sqrt{\frac{n_t^2}{n_t^2 - \sin^2\theta_1}} \quad \text{Equation 23}$$

where x is a function of θ1 (AOI), and therefore y and x are parametric functions of AOI. In the presence of distance dimensions of much larger magnitudes, y is ignored when formulaically convenient without sacrificing accuracy Equation 23 reduces to Equation 24.

$$x = \tan\theta_1(E + d_{s1} + d_{s2}) - D \quad \text{Equation 24}$$

where $D = d_{s1}(\tan\theta_1 - \tan\theta_2) + d_{s2}(\tan\theta_1 - \tan\theta_3)$, with $$\tan\theta_2 = \frac{\sin\theta_1}{\sqrt{n_{s1}^2 - \sin^2\theta_1}}$$

$$\tan\theta_3 = \frac{\sin\theta_1}{\sqrt{n_{s2}^2 - \sin^2\theta_1}}.$$

y may be monotonically nondecreasing with increasing x to reduce or negate the performance deviations of the CPIs due to increasing AOIs for optical devices, such as eyewear. y may be generally nondecreasing with increasing x, except for particular values of x, to reduce or negate the performance deviations of the CPIs, due to increasing AOIs for optical devices.

A computer system may be used to calculate the transmission spectra of thin films that are used to determine the optical or physical thickness, y, of one or more RVF thin film layers being monotonically nondecreasing or generally non-decreasing with increasing x, except for particular values of x, to reduce or negate the performance deviations of the CPIs, due to increasing AOIs for optical devices.

Figure 30:
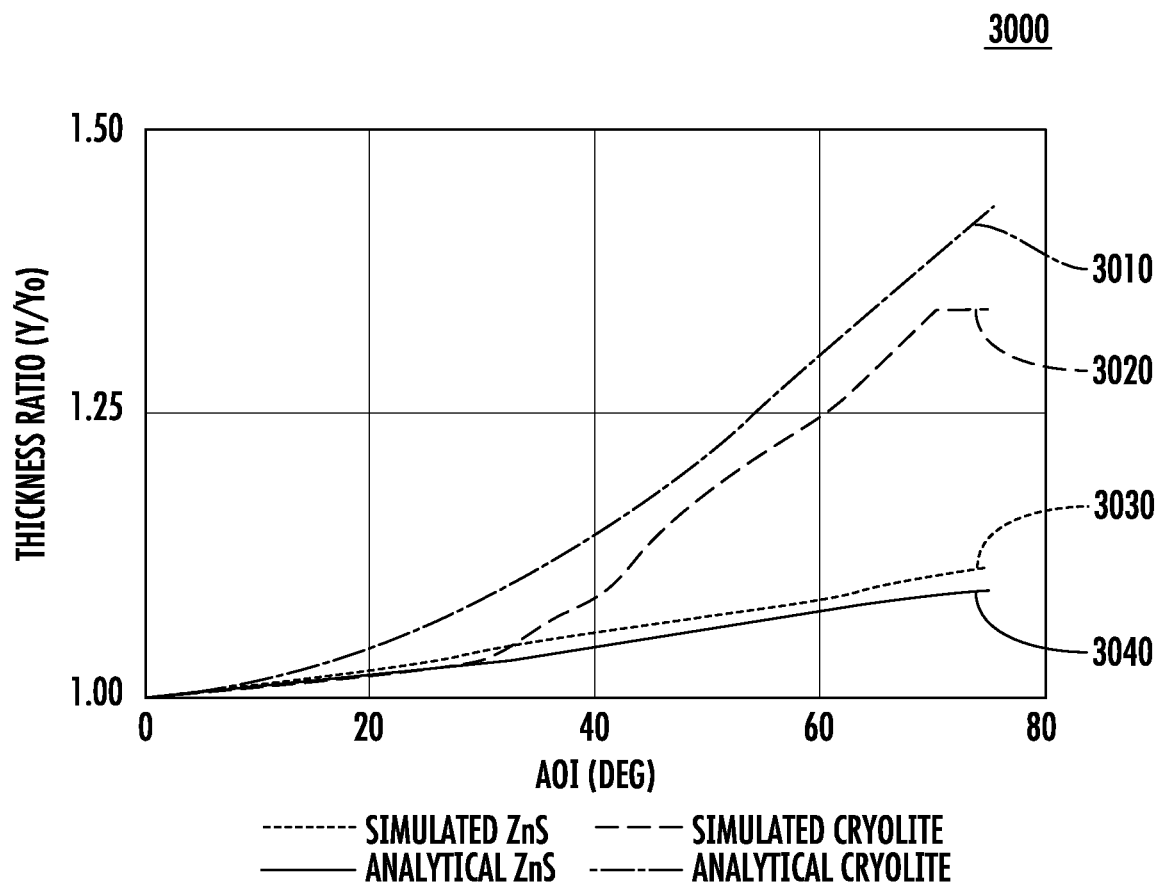
FIG. 30 illustrates multiple examples of the optical or physical thickness profiles of one or more layers of a RVF as a function of the radial distance from a viewing center for an optical device describe herein.

FIG. 30 illustrates an example of the optical or physical thickness profiles 3000 of one or more layers of a RVF as a function of the radial distance from a viewing center for an optical device describe herein. A RVF coating may include alternating layers of ZnS and Cryolite. In one example, a total of seven layers may be utilized. The analytical design requires monotonically increasing layer thickness as radial distance increases for both ZnS 3030 and Cryolite 3020 to reduce or negate the performance deviations of the CPIs, due to increasing AOIs. Since ZnS 3040 has a higher refractive index (RI) its thickness may increase at a generally slower rate than that for Cryolite 3010, which has a lower RI. There may be a design that includes nondecreasing, but not necessarily monotonically increasing, layer thickness as radial distance increases for both ZnS and Cryolite to reduce or negate the performance deviations of the CPIs due to increasing AOIs. Again since ZnS has a higher refractive index (RI) its thickness may also increase at a generally slower rate than that for Cryolite, which has a lower RI. In one example, the geometric surface curvature of the optical device substrate is less than or equal to that having a Base Curve of 8 in the application to ophthalmic lenses.

Figure 31:
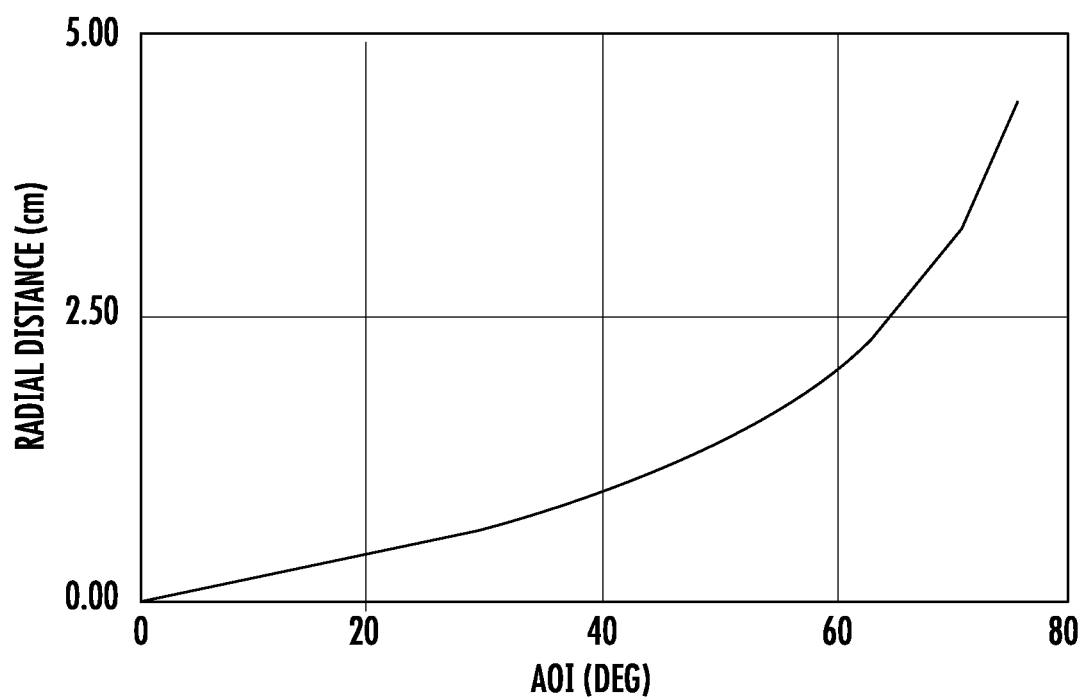
FIG. 31 illustrates for a configuration with E=1.2 (distance from optical device to eye), and ds1=ds2=0, that the direct relationship between radial distance, x, from a viewing center on the optical device, and AOI, is of strictly correlated increase.

FIG. 31 illustrates a plot 3100 of the radial distance against the AOI. Plot 3100 illustrate an example with E=1.2 cm, and $d_{s1}=d_{s2}=0$, from FIG. 29 and provides that the direct relationship between radial distance, x, from a viewing center on the optical device, and AOI, is of strictly correlated increase. That is, as the radial distance increases the AOI increases monotonically. The relationship between radial distance, x, from a viewing center on the optical device, and AOI, is of generally correlated increase. That is, as the radial distance increases the AOI increases generally, except for specific values of the radial distance measure.

As FIG. 30 illustrates four sample relationships between RVF's physical or optical thickness ratios to AOI, and FIG. 31 shows one sample relationship between AOI and radial distance from viewing center, the relationships contained in these two figures are used to directly determine the relationships between physical or optical thickness ratios and radial distance from viewing center for the RVF or its any single layer or a combination of multiple layers.

Figure 32:
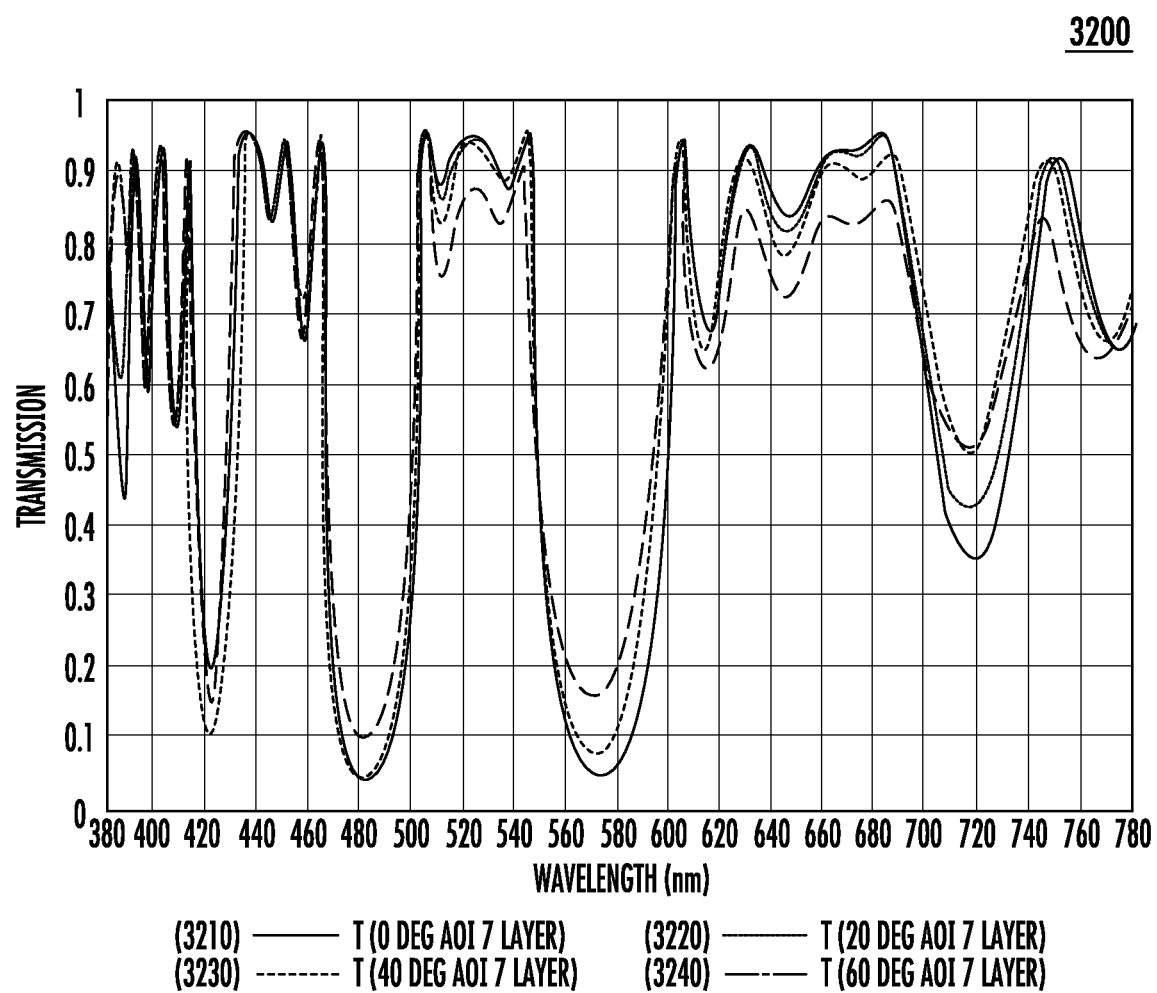
FIG. 32 illustrates the transmission spectra of a 7-layer construction for the RVF at various AOIs.

A RVF may be made from two or more layers of at least two different thin film materials. A RVF may be made from two or more alternating layers of at least two different thin film materials. FIG. 32 illustrates the transmission spectra 3200 of a 7-layer construction for the RVF at various AOIs. The transmission spectra 3200 at 0 DEG AOI (3210), 20 DEG AOI (3220), 40 DEG AOI (3230) and 60 DEG AOI (3240) are shown. Alternating layers of high RI material, e.g. ZnS and TiO2 and low RI material, e.g. SiO2 and Cryolite, are used in the construction of the optical device with physical thicknesses of each layer between 80 nm and 1400 nm. The Blue Shift of the transmission spectra from increased AOI is substantially reduced or eliminated by this construction of the RVF with optical or physical thickness profiles substantially similar to that presented in FIG. 30.

Figure 33:
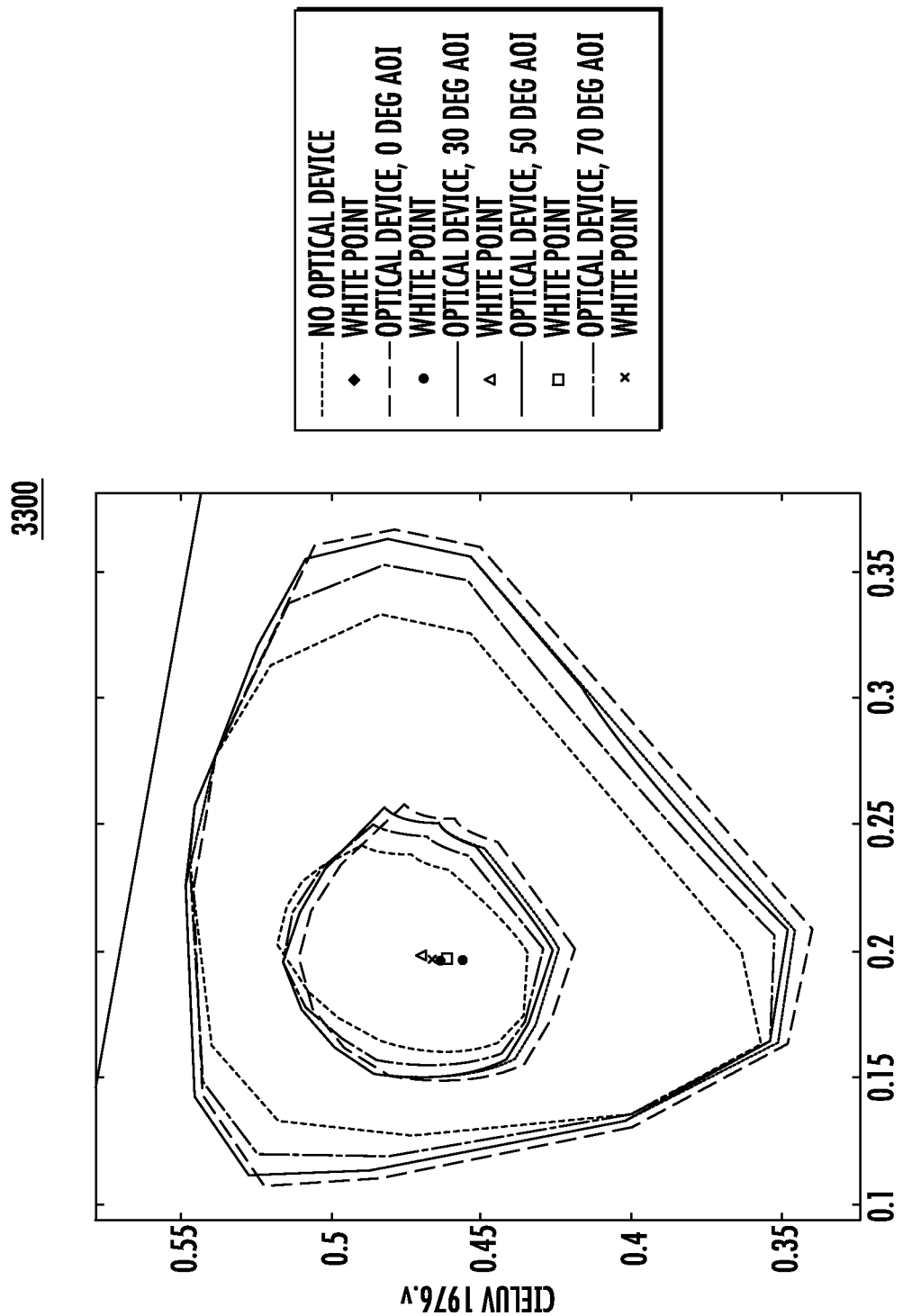
FIG. 33 illustrates the color gamuts achieved for a construction of the RVF.

FIG. 33 illustrates the color gamuts 3300 achieved for a construction of the RVF. The color gamuts 3300 are substantially invariant color gamuts encircled by representative Munsell Colors for red, green, blue, yellow and derivative colors, and substantially invariant White Points across multiple AOIs. Inner gamuts are comprised of pastel colors and outer gamuts are comprised of saturated colors. The sample RVF is comprised of alternating layers of TiO2 and SiO2 for a total of 15 layers. Every TiO2 layer is between 150 nm and 1450 nm in physical thickness, and every SiO2 layer is between 100 nm and 1340 nm in thickness. The optical or physical thickness profiles generally increases as radial distance increases from a viewing center of optical device, except for particular AOIs above 40 DEG where the corresponding layer thicknesses remain substantially constant for particular radial distance measures. On average, the optical or physical thickness profile for SiO2 grows at a rate between 1% and 30% for every 10 DEG increase in AOI. The thickness profile for TiO2 grows at a rate between 0.2% and 20% for every 10 DEG increase in AOI.

For color vision deficiency there is described a red color set that contains one or more of the Munsell colors: 2.5yr 5/4, 7.5r 5/4, 2.5r 5/4, 5rp 5/4, 10p 5/4, 10yr 5/4, 10r 5/4, 10rp 5/4, a green color set that contains one or more of the Munsell colors: 5bg 5/4, 10g 5/4, 5g 5/4, 10gy 5/4, 5gy 5/4, 10bg 5/4, a blue color set that contains one or more of the Munsell colors: 5b 5/4, 10bg 5/4, 5bg 5/4, 5p 5/4, 10b 5/4, 10p 5/4, 10pb 5/4, and a yellow color set that contains one or more of the Munsell colors: 10gy 5/4, 5gy 5/4, 5y 5/4, 10yr 5/4, 2.5yr 5/4, 10y 5/4, 10yr 5/4. Red-green color separation may be evaluated using any one or more colors in the red color set and any one or more colors in the green color set. Blue-yellow color separation may be evaluated using any one or more colors in the blue color set and any one or more colors in the yellow color set.

For optical device with lightness under 65 (when subject to illuminant CIE D65 only), using 1976 CIE LUV color space and formulas described within text, and for any two singular illuminants of CIE D55, D65 or D75 illuminants or any blend, red-green color separation of corrected/enhanced color vision may be 10% or more than that with uncorrected/unenhanced color vision, for normal, deutans and/or protans, blue-yellow color separation of corrected/enhanced color vision may be 2% or more than that with uncorrected/unenhanced color vision, for normal, deutans and/or protans, and white point shift of the optical device may be within 0.35 of neutral for normal, deutans and/or protans.

For optical device with lightness equal-to or above 65 (when subject to illuminant CIE D65 only), using 1976 CIE luv color space and formulas described within text, and for any two singular illuminants of CIE D55, D65, D75, F2, F7, F11 or L-series led illuminants or any blend, red-green color separation of corrected/enhanced color vision may be 4% or more than that with uncorrected/unenhanced color vision, for normal, deutans and/or protans, blue-yellow color separation of corrected/enhanced color vision may be 2% or more than that with uncorrected/unenhanced color vision, for normal, deutans and/or protans, white point shift of optical device may be within 0.30 of neutral for normal, deutans and/or protans.

For yellow color vision which uses 1976 CIE LUV color space and formulas described within text, and for any singular illuminants of CIE D55, D65, D75, F2, F7, F11 or L-series led illuminants or any blend, white point shift of the observer's yellow color vision with the optical device may be smaller than that without the optical device.

For wearable optical devices, e.g. ophthalmic lenses, sunglass and contacts, the white point of the optical device may be of a blue, cyan, green or purple hue, and the white point shift may be at least 0.001 when viewed from the perspective of the device wearer.

The optical device absorbs, reflects and/or scatters light between 500 nm and 650 nm. Such spectral characteristics may be designed and constructed into or onto intraocular lenses (IOLs) or other eye implants, for the colorimetric effect of reducing implant yellowness.

A radially-variable filter is described that includes an optical device where the optical thickness of at least one material layer of an interference film coating changes radially, starting from at least one center on the material layer. For at least one material layer in the optical device, the optical or physical thickness of at least one location with an angle of incidence (AOI) between 20 deg and 85 deg is more than the optical or physical thickness of at least one location with an AOI between 0 deg and 19.99 deg. The lightness of the optical device may be between 5 and 95 when evaluated with CIE D55, D65, D75, F2, F7, F11 or L-series led or any blend of these illuminants.

Generally, the optical devices described herein provide a minimum transmission of 0.5% from 575 nm to 585 nm, one or more stop bands substantially centered between 380 nm and 780 nm, with at least one stop band substantially centered between 550 nm and 605 nm, at least one additional stop band substantially centered between 450 nm and 505 nm, and/or at least one additional stop band substantially centered between 400 nm and 449 nm. For deuteranomaly, evaluation may be with peak green-cone sensitivity shift to a longer wavelength by at least 1 nm from the CIE 1931 2° standard observer (as modeled by CMF x). For protanomaly, evaluation may be with peak red-cone sensitivity shift to a shorter wavelength by at least 1 nm from the CIE 1931 2° standard observer (as modeled by CMF y).

Under any two singular illuminants of CIE D55, D65, D75, F2, F7, F11 or L-series led illuminants or any blend, at least one color in the red color set may maintain a warm-color hue of yellow, orange, red, pink or purple, and at least one color in the green color set may maintain a cool-colored hue of green, cyan, blue or purple before-and-after employing the optical device.

Methods of construction of the optical device with the desired transmission spectra include colorants infused into substrate, or colorants laminated onto substrate, and/or colorants coated onto substrate. The substrate may have a thickness between 0.1 mm and 10 cm in total thickness.

Methods of construction of the optical device with the desired transmission spectra include thin-film deposition with at least three film layers, of two film material, with at least one layer having an optical or physical thickness of less than 1500 nm.

The metamerism control of the optical devices including those external to the eye and internal implants, when evaluated with any two of the listed illuminants, is constrained by the difference in white point shift is less than 0.1, and the difference in lightness is less than 30.

Although features and elements are described above in particular combinations, one of ordinary skill in the art will appreciate that each feature or element can be used alone or in any combination with or without the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A transmissive optical device for enhancing human color vision, said device comprising:
   a substrate; and
   one or more colorant layers applied at least one of onto and into the substrate, the one or more colorant layers comprising at least one colorant, the colorant created based on colorant-specific absorption spectra as defined by selected concentrations,
   wherein the colorant-specific absorption and substrate cooperate to produce a static transmission spectrum with at least one stop band substantially centered between 550 nm and 605 nm, the transmissive optical device exhibiting color shift control such that a cosmetic tint has a white point shift within 0.35 in 1976 CIE UCS diagram and has a lightness difference within 30 in 1976 CIE LUV color space when an illuminant changes (1) from CIE D65 to CIE D75, and (2) from CIE D65 to CIE D55.

2. The device of claim 1, wherein the optical device exhibits color shift control such that the cosmetic tint has a white point shift within 0.35 in 1976 CIE UCS diagram and has a lightness difference within 30 in 1976 CIE LUV color space when the illuminant changes from CIE D65 to CIE F11.

3. The device of claim 1, wherein the optical device exhibits color shift control such that the cosmetic tint has a white point shift of less than 0.1 in 1976 CIE UCS diagram.

4. The device of claim 1, wherein the optical device exhibits color shift control such that the cosmetic tint has a lightness variation of less than 10, in 1976 CIE LUV color space.

5. The device of claim 1, further comprising another stop band substantially centered between 450 nm and 505 nm.

6. The device of claim 1, the device configured to provide a red-green color separation of at least 7% more than that of unassisted color vision in 1976 CIE UCS diagram.

7. The device of claim 6, the device configured to provide a red-green color separation of between 20% and 60% more than that of unassisted color vision in 1976 CIE UCS diagram.

8. The device of claim 6 wherein red-green color separation is evaluated using any one or more colors in the red color set, selected from the Munsell Colors of: 2.5YR 5/4, 7.5R 5/4, 2.5R 5/4, 5RP 5/4, 10P 5/4, 10YR 5/4, 10R 5/4, 10RP 5/4, and any one or more colors in the green color set, selected from the Munsell Colors of: 5BG 5/4, 10G 5/4, 5G 5/4, 10GY 5/4, 5GY 5/4, 10BG 5/4.

9. The device of claim 1, wherein the device is at least one of a lens, glass, sunglass, spectacles, contact lens, optical filter, display, windshield, intraocular lens, and window.

10. The device of claim 1, comprising a dye with peak absorbance at approximately 570 nm.

11. The device of claim 1, comprising a dye with peak absorbance at approximately 575 nm.

12. The device of claim 1, comprising a dye with peak absorbance at approximately 590 nm.

13. The device of claim 1, comprising a dye with peak absorbance at approximately 595 nm.

14. The device of claim 1, comprising a dye with peak absorbance at approximately 610 nm.

15. The device of claim 1, comprising a dye with peak absorbance at approximately 465 nm.

16. The device of claim 1, comprising a dye with peak absorbance at approximately 470 nm.

17. The device of claim 1, comprising a dye with peak absorbance at approximately 490 nm.

18. The device of claim 1, comprising a dye with peak absorbance at approximately 500 nm.

19. A transmissive optical device for enhancing human color vision, said device comprising:
   a substrate; and
   one or more colorant layers applied at least one of onto and into the substrate, the one or more colorant layers comprising at least two colorants with one colorant having a peak absorbance at approximately 575 nm, the colorants created based on colorant-specific absorption spectra as defined by selected concentrations,
   wherein the colorant-specific absorption and substrate cooperate to produce a static transmission spectrum with at least one stop band substantially centered between 550 nm and 605 nm, the transmissive optical device exhibiting color shift control such that a cosmetic tint has a white point shift within 0.1 in 1976 CIE UCS diagram when an illuminant changes (1) from CIE D65 to CIE D75, and (2) from CIE D65 to CIE D55.

20. A transmissive optical device for enhancing human color vision, said device comprising:
   a substrate; and
   one or more colorant layers applied at least one of onto and into the substrate, the one or more colorant layers comprising at least two colorants with one colorant having a peak absorbance at approximately 595 nm, the colorants created based on colorant-specific absorption spectra as defined by selected concentrations,
   wherein the colorant-specific absorption and substrate cooperate to produce a static transmission spectrum with at least one stop band substantially centered between 550 nm and 605 nm, the transmissive optical device exhibiting color shift control such that a cosmetic tint has a white point shift within 0.1 in 1976 CIE UCS diagram when an illuminant changes (1) from CIE D65 to CIE D75, and (2) from CIE D65 to CIE D55.

* * * * *